US 9,203,330 B2

(12) United States Patent
Suzuki

(10) Patent No.: US 9,203,330 B2
(45) Date of Patent: Dec. 1, 2015

(54) MOTOR CONTROL DEVICE AND AIR CONDITIONER

(71) Applicant: KABUSHIKI KAISHA TOSHIBA, Minato-ku (JP)

(72) Inventor: Nobuyuki Suzuki, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/471,391

(22) Filed: Aug. 28, 2014

(65) Prior Publication Data

US 2015/0075195 A1      Mar. 19, 2015

(30) Foreign Application Priority Data

Sep. 17, 2013   (JP) ................. 2013-192060

(51) Int. Cl.
| | |
|---|---|
| *H02P 6/00* | (2006.01) |
| *F25B 13/00* | (2006.01) |
| *F25B 49/02* | (2006.01) |
| *H02P 6/18* | (2006.01) |

(52) U.S. Cl.
CPC ............. *H02P 6/002* (2013.01); *F25B 13/00* (2013.01); *F25B 49/025* (2013.01); *H02P 6/18* (2013.01)

(58) Field of Classification Search
CPC .............. H02M 2001/0009; H02M 7/5395; H02P 27/08; H02P 6/18; H02P 21/14; H02P 27/085
USPC .............. 318/400.13, 400.17, 400.36, 599; 62/157
See application file for complete search history.

(56) References Cited

U.S. PATENT DOCUMENTS

| | | | | |
|---|---|---|---|---|
| 7,804,266 | B2 * | 9/2010 | Tomigashi | H02P 21/14 318/599 |
| 8,674,652 | B2 * | 3/2014 | Maekawa | H02P 6/18 180/443 |
| 2008/0061727 | A1 * | 3/2008 | Tomigashi | H02P 21/14 318/768 |
| 2012/0074888 | A1 * | 3/2012 | Maekawa | H02P 6/18 318/400.36 |
| 2014/0225543 | A1 * | 8/2014 | Maekawa | H02P 27/085 318/400.17 |
| 2014/0292241 | A1 * | 10/2014 | Maekawa | H02P 6/18 318/400.17 |

FOREIGN PATENT DOCUMENTS

| | | |
|---|---|---|
| JP | 2012-70591 A | 4/2012 |
| JP | 5178799 B2 | 4/2013 |

OTHER PUBLICATIONS

U.S. Appl. No. 14/633,712, filed Feb. 27, 2015, Suzuki, et al.

* cited by examiner

*Primary Examiner* — Paul Ip
(74) *Attorney, Agent, or Firm* — Oblon, McClelland, Maier & Neustadt, L.L.P.

(57) ABSTRACT

A motor control device includes a PWM signal generation unit generating a signal pattern of two of three phases so that the pattern follows a rotor position, and a timing adjusting unit. The signal generation unit increases/decreases duty in both directions of lag side and lead side based on any phase of a carrier-wave period regarding a first phase. The signal generation unit increases/decreases duty in one direction regarding a second phase. The signal generation unit increases/decreases duty in a direction opposite to the second phase regarding a third phase. The timing adjusting unit adjusts detection timing so that a current detection unit detects current in fixed timing with respect to one phase and current in another fixed timing with respect to the other phase or the current detection unit is capable of detecting current in variable timing according to magnitude of output voltage to an inverter circuit.

11 Claims, 50 Drawing Sheets

Ptns (1) to (11)
| 1 | U phase ≧ minimum width and ≦ maximum width and V or W phase ≧ maximum width | |
|---|---|---|
| 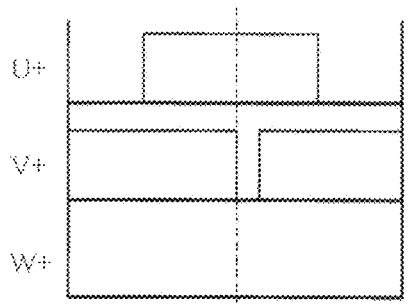 | | 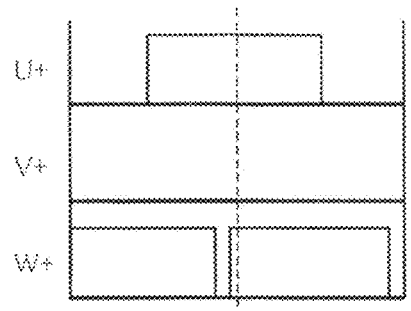 |
| 2 U phase = 0, V phase ≧ maximum width and W phase ≧ maximum width | 3 U phase = 0, W phase ≧ minimum width and V phase ≧ maximum width |
|---|---|
| 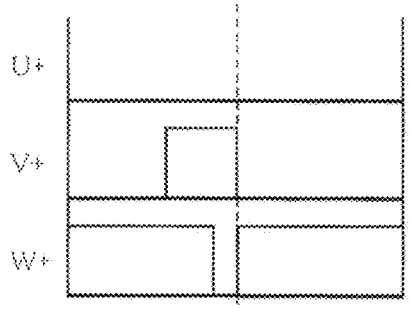 | 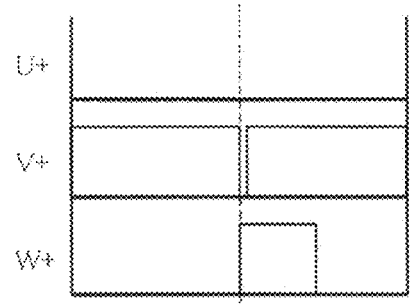 |
| 4 U and V phases ≧ maximum width | 5 U phase = 0 and V and W phases ≧ maximum width |
|---|---|
| 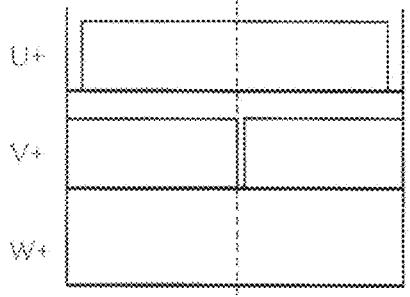 | 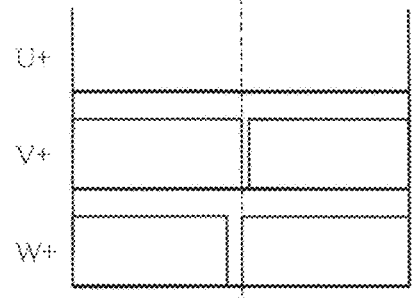 |
FIG. 7A Ptns (1) to (11)
| 6 U and W phases ≥ maximum width | 7 U phase ≥ 0 and V or W ≤ minimum width |
|---|---|
| 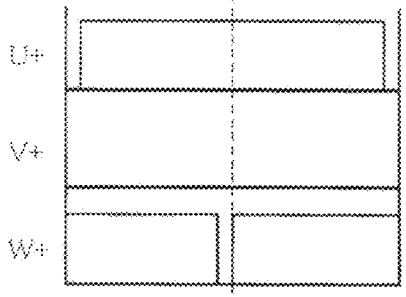 | 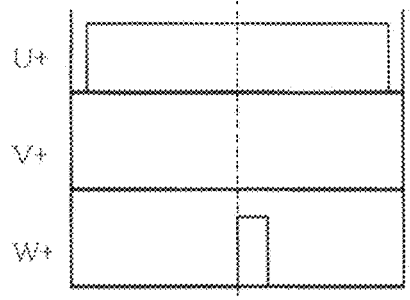 |
| 8 U phase = 0 and W phase ≥ 0 and ≤ minimum width | 9 U phase = 0 and V phase ≥ 0 and ≤ minimum width |
| 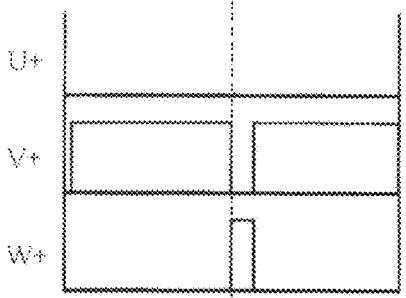 | 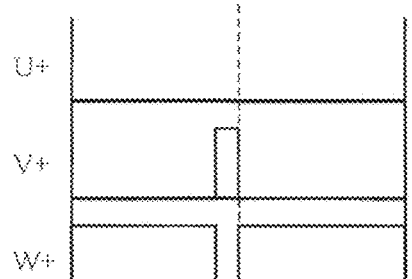 |
| 10 U phase ≥ 0 and ≤ minimum width and V phase ≥ 0 | 11 U phase ≥ 0 and ≤ minimum width and W phase ≥ 0 |
| 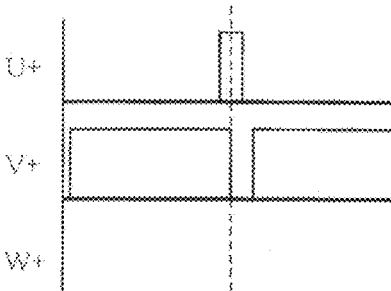 | 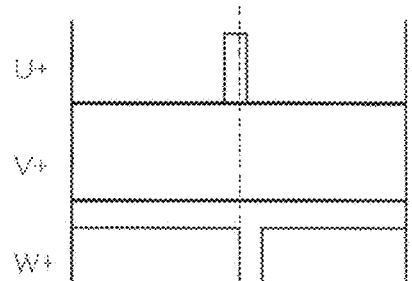 |
FIG. 7B

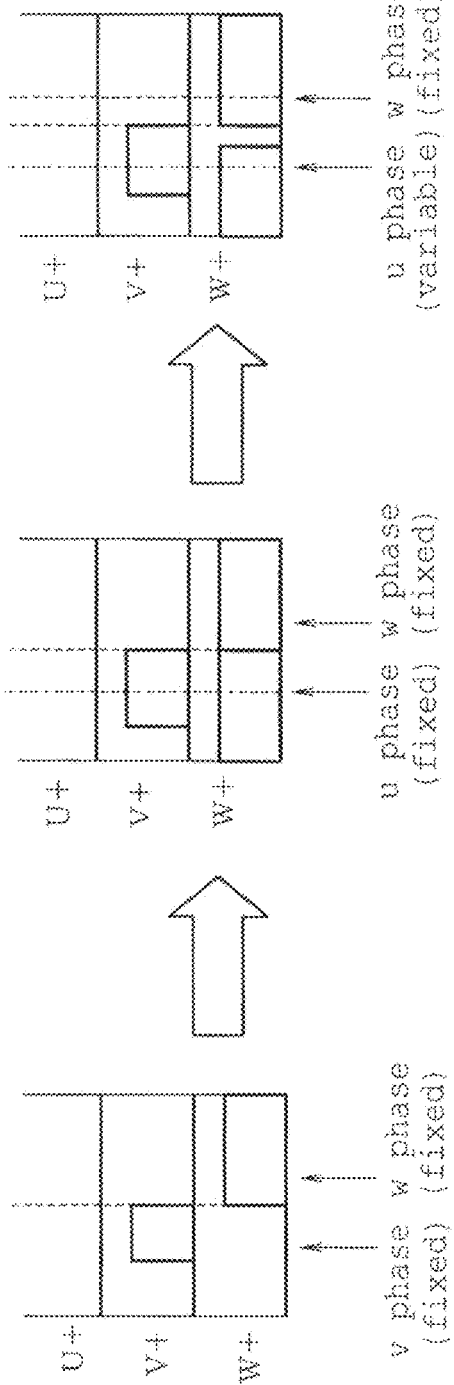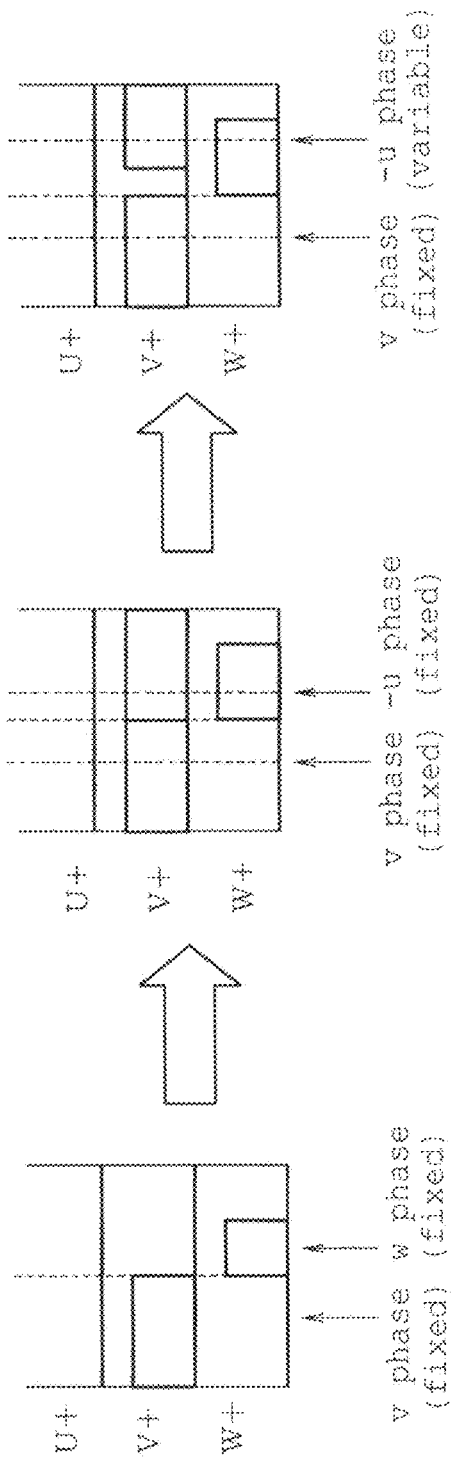
FIG. 24A
FIG. 24B

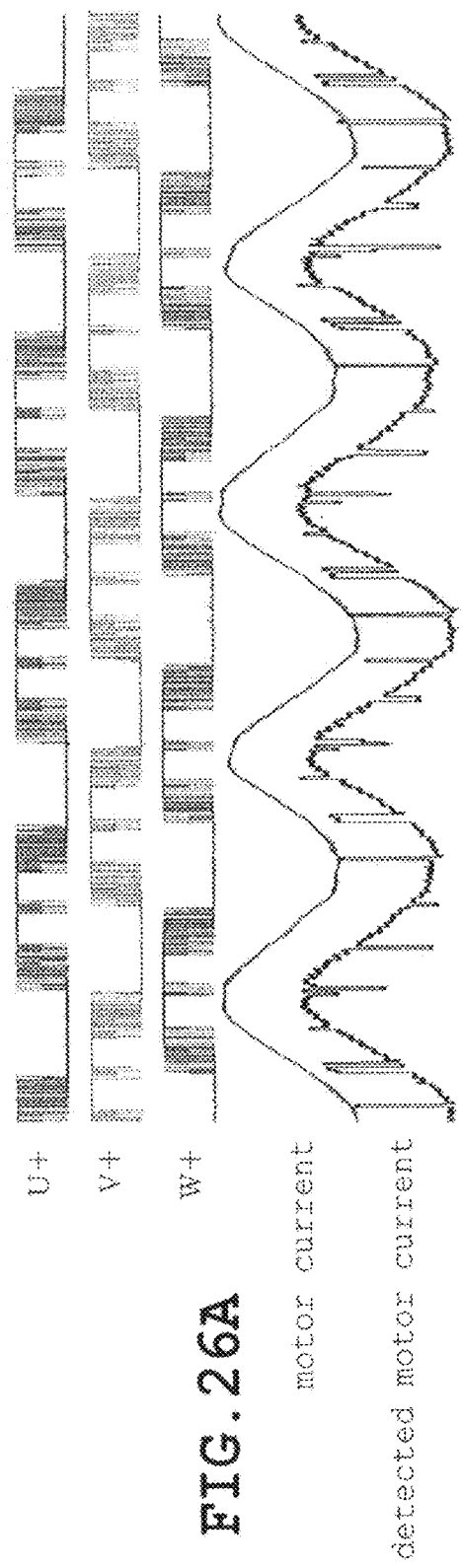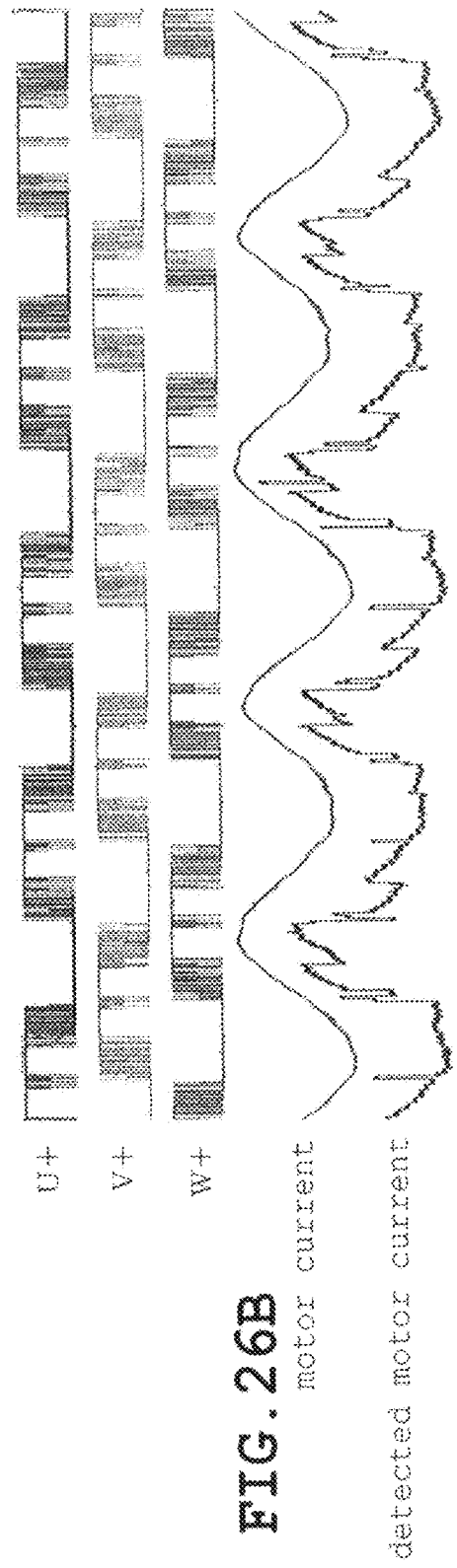

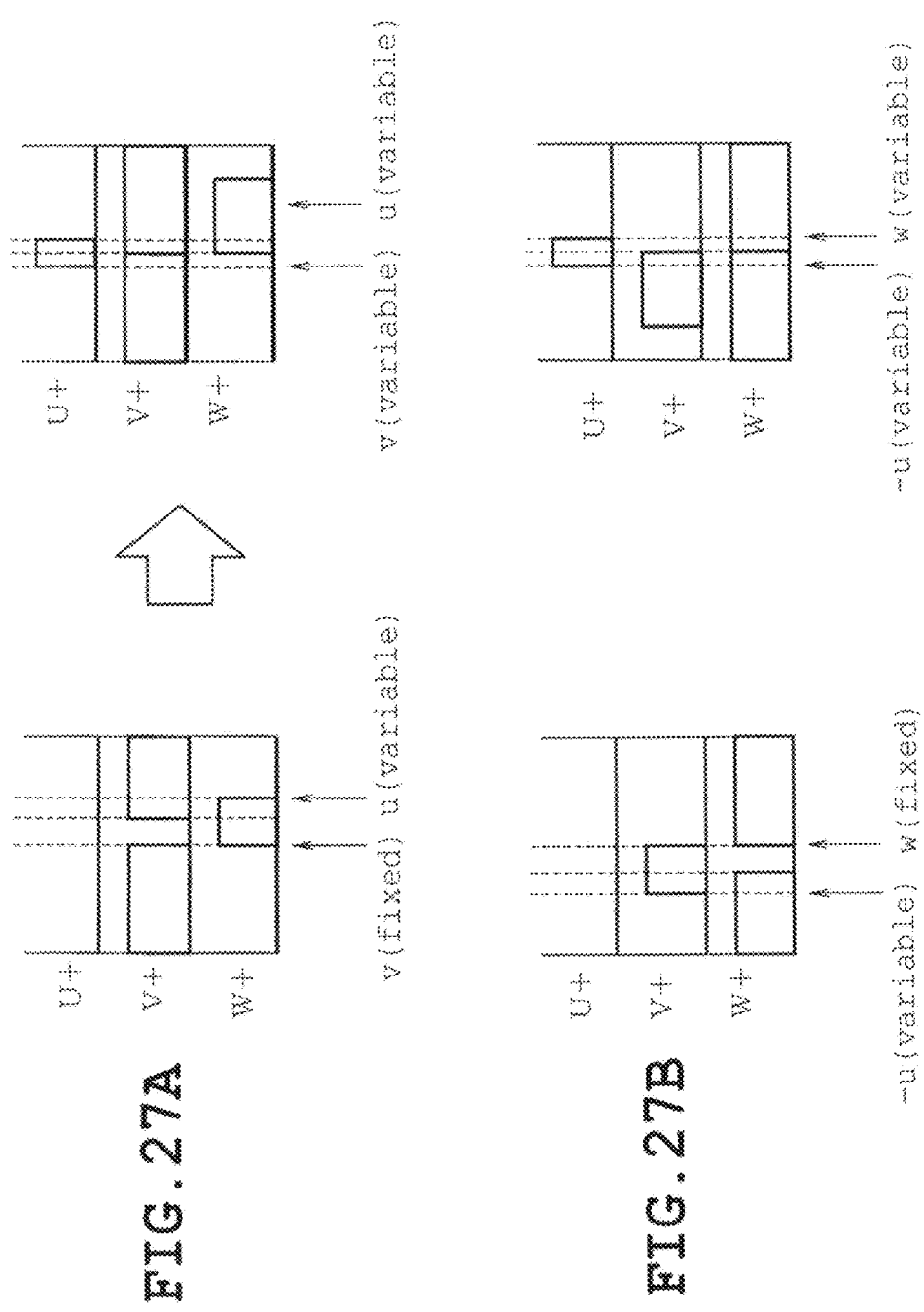

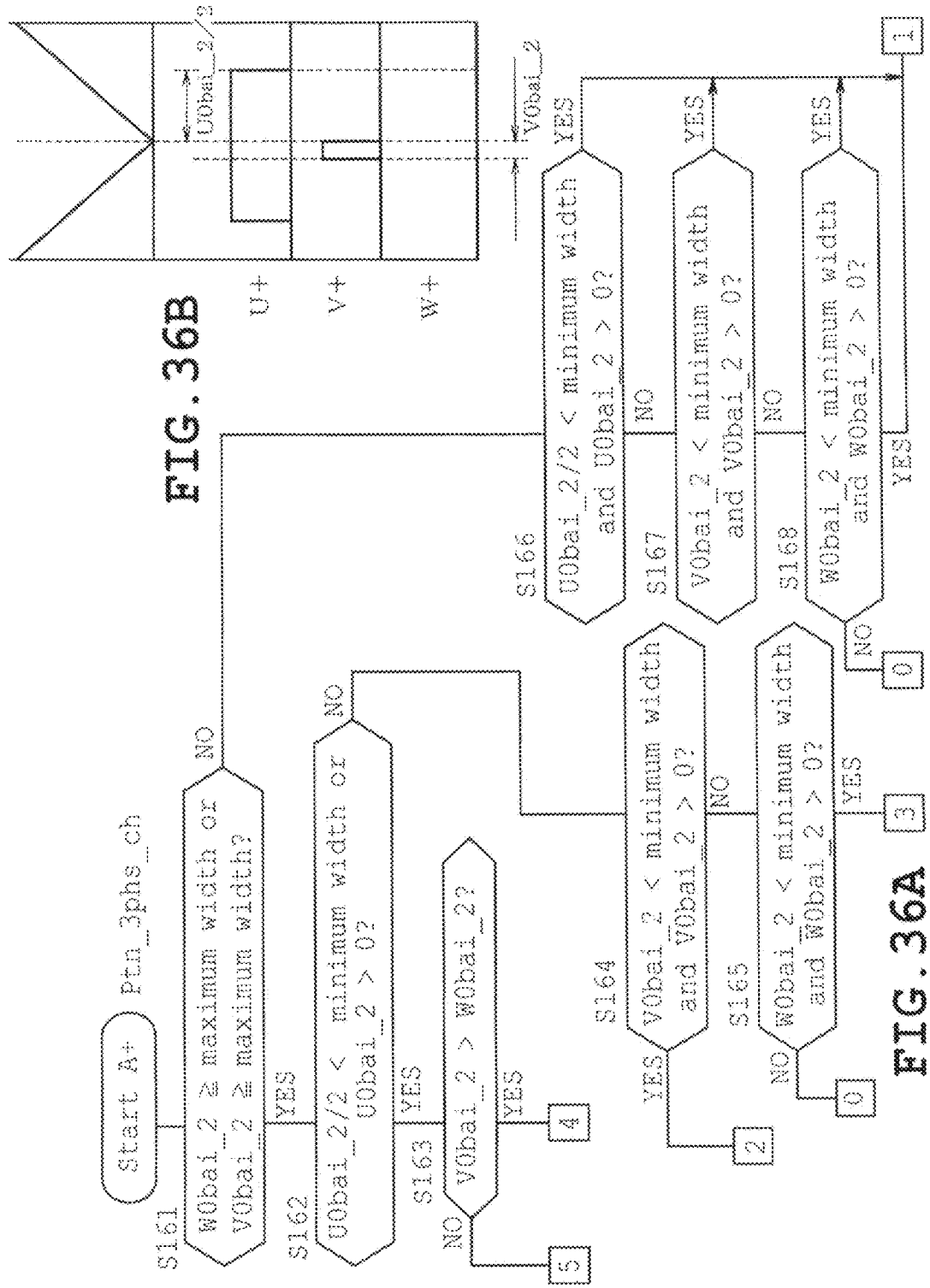

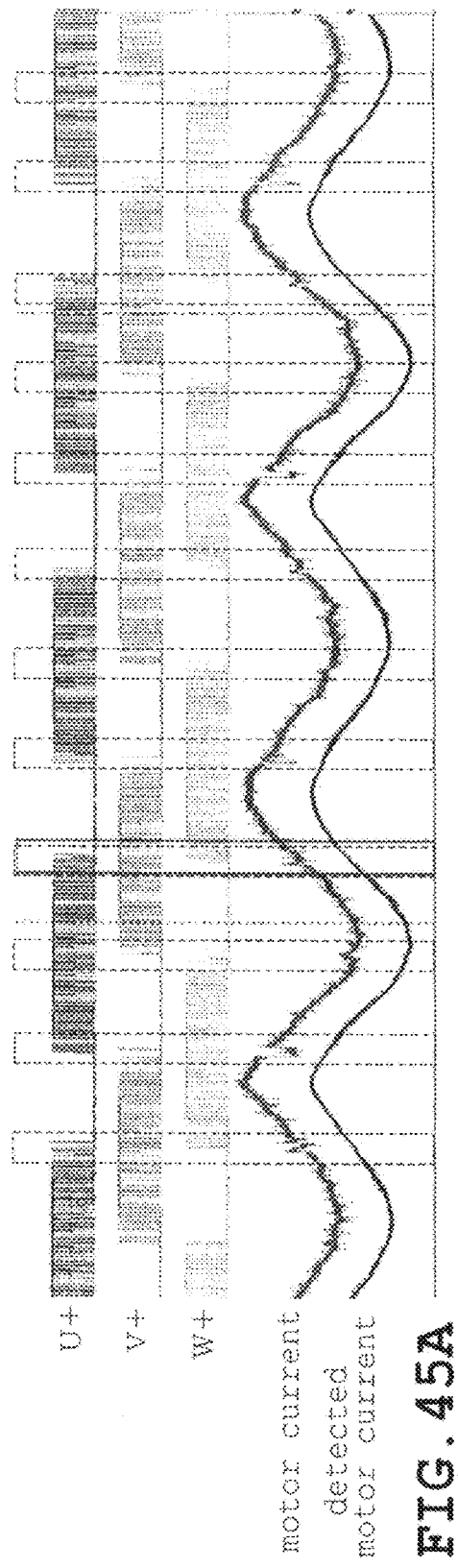
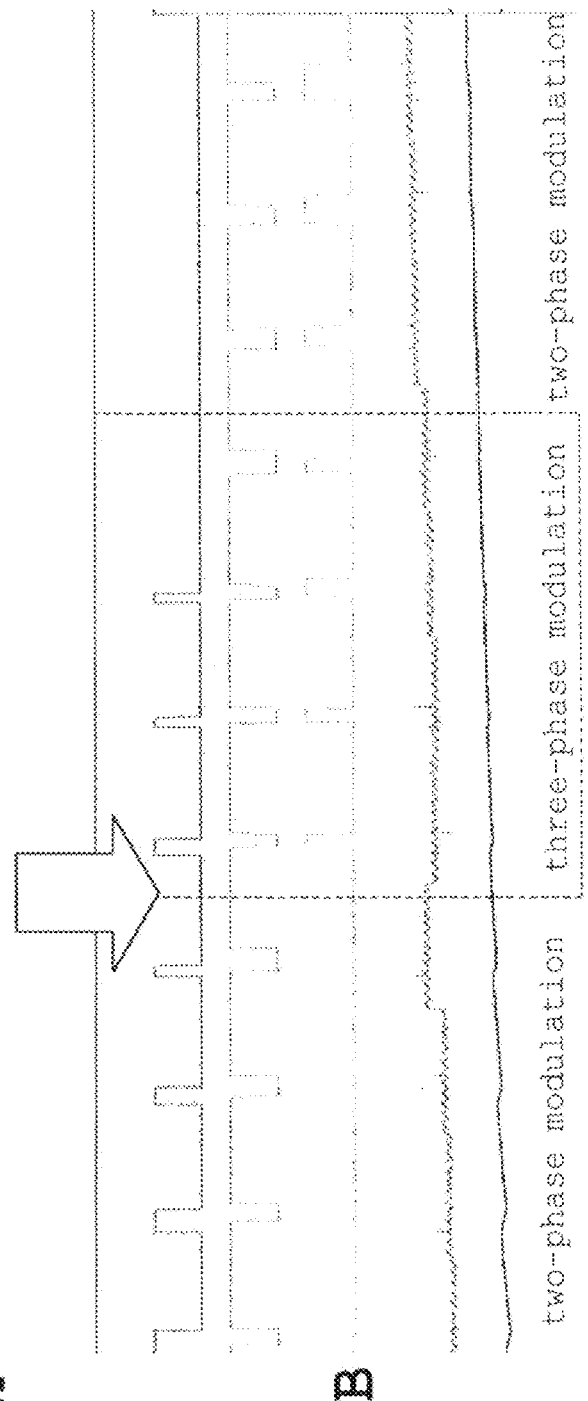
FIG. 45A
FIG. 45B

MOTOR CONTROL DEVICE AND AIR CONDITIONER

CROSS-REFERENCE TO RELATED APPLICATIONS

This application is based upon and claims the benefit of priority from the prior Japanese Patent Application No. 2013-192060 filed on Sep. 17, 2013, the entire contents of which are incorporated herein by reference.

FIELD

Embodiments described herein relate to a motor control device and an air conditioner provided with the motor control device.

BACKGROUND

A technique has conventionally been known that an electric current is detected using one shunt resistance inserted into a direct-current part of an inverter circuit when U-, V- and W-phase currents are detected for the purpose of controlling an electric motor. In order that all the three-phase currents may be detected in the above-mentioned manner, a three-phase PWM (pulse width modulation) signal pattern needs to be generated in one period of a PWM carrier so that two or more phase currents can be detected. For this purpose, a motor control device has been conventionally proposed which can normally detect two or more phase currents by shifting a phase of the PWM signal in one period, without increase in noise. See Japanese Patent No. 5178799, the contents of which are incorporated herein by reference.

Further, the PWM control of the three-phase motor includes a three-phase modulation manner and a two-phase modulation manner. The three-phase modulation manner increases switching loss in an inverter circuit. Hence, some products use the two-phase modulation manner with emphasis on reducing switching loss. However, when the above-described conventional current detection manner is applied to the two-phase modulation, there results in a problem that only one phase current can be detected in two occurrences of current detection timing in a region where a modulation factor is increased.

BRIEF DESCRIPTION OF THE DRAWINGS

FIGS. 7A and 7B show examples of two-phase PWM pulse waveforms corresponding to patterns 1 to 11 divided by the processing of FIGS. 6A and 6B respectively;

FIGS. 24A and 24B show examples of modifications of detection timings in pattern (2) or (3);

FIGS. 26A and 26B show motor current waveforms detected by a first embodiment and the Japanese Patent No. 5178799 when the modification factor is 1.0;

FIGS. 27A and 27B exemplifies characteristic PWM signal patterns, showing a second embodiment;

FIGS. 36A and 36B show processing executed subsequent to the processing as shown in FIGS. 6A and 6B;

FIGS. 45A and 45B show detected motor current wave form.

DETAILED DESCRIPTION

Figure 1:
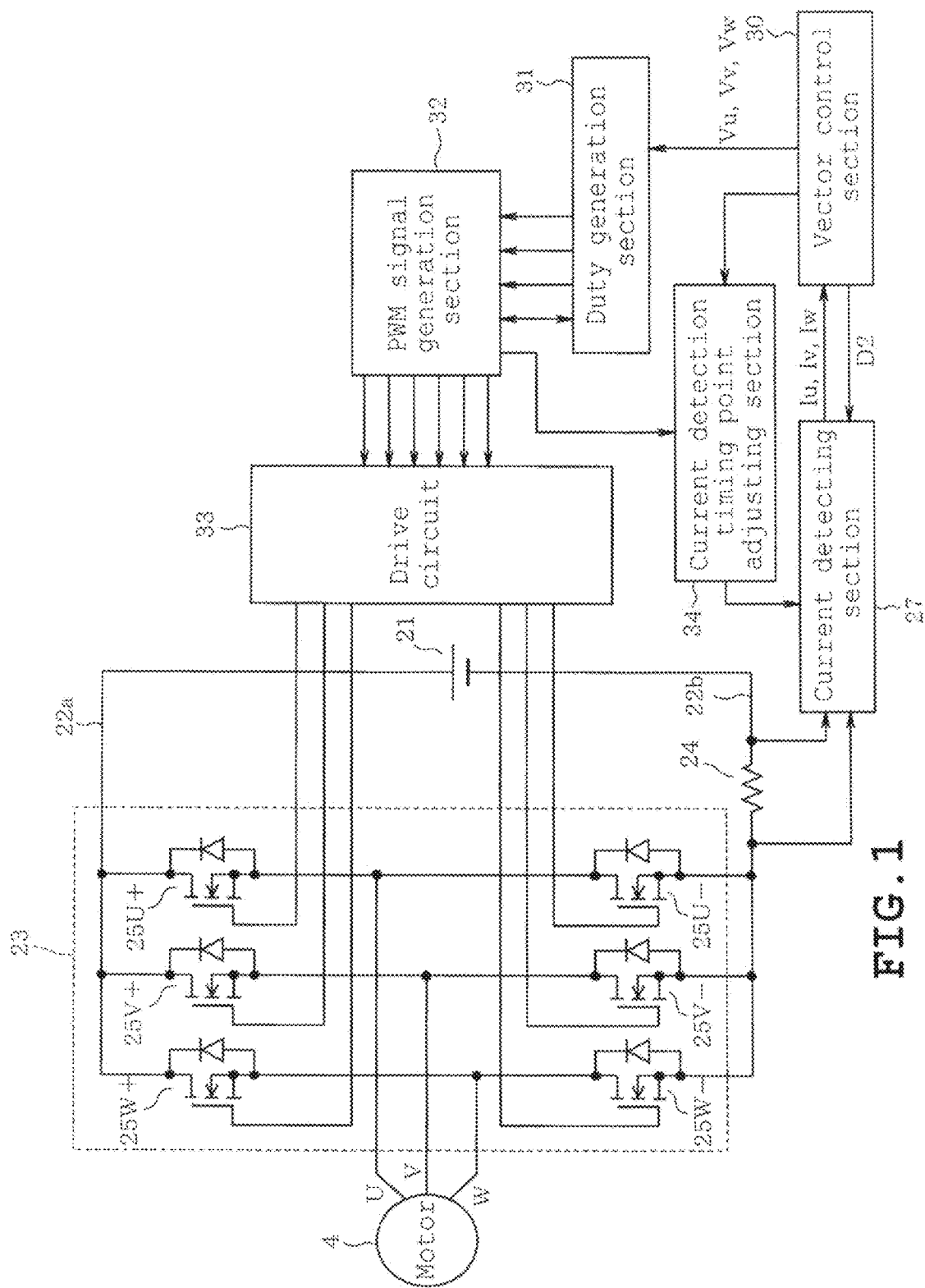
FIG. 1 is a block diagram showing an electrical arrangement of the motor control device of a first embodiment.

In general, according to one embodiment, a motor control device includes an inverter circuit including a plurality of switching elements connected into a three-phase bridge configuration. The switching elements are configured to be on-off controlled according to a predetermined PWM signal pattern so that the inverter circuit converts direct current to three-phase alternating current thereby to drive an electric motor. A current detecting element is connected to a direct current side of the inverter circuit to generate a signal corresponding to a current value. A rotor position determination unit is configured to determine a rotor position based on phase currents of the motor. A PWM signal generation unit is configured to generate a signal pattern of two of three phases so that the pattern follows the rotor position. A current detection unit is configured to detect the phase currents based on a signal generated by the current detecting element and the PWM signal pattern. The PWM signal generation unit is configured to increase/decrease a duty in both directions of phase lag side and phase lead side based on any phase of the carrier-wave period regarding a first phase of the three-phase PWM signal pattern. The PWM signal generation unit is also configured to increase/decrease a duty in one of the directions of phase lag side and phase lead side based on any phase of the carrier-wave period regarding a second phase of the three-phase PWM signal pattern. The PWM signal generation unit is further configured to increase/decrease a duty in a direction opposite to the direction of the second phase based on any phase of the carrier-wave period regarding a third phase of the three-phase PWM signal pattern. The motor control device further includes a timing point adjusting unit configured to adjust a detection timing so that the current detection unit detects the current at a fixed timing point with respect to one phase and the current at another fixed timing point with respect to the other phase or so that the current detection unit is capable of detecting the current in a variable timing according to a magnitude of an output voltage supplied to the inverter circuit.

A first embodiment will be described with reference to FIGS. 1 to 26. The first embodiment is directed to an air conditioner employing a heat pump system and including a compressor motor. Referring to FIG. 2, a compressor (a load) 2 composing a heat pump system 1 includes a compression part 3 and an electric motor 4 housed in a single iron closed container 5. The motor 4 includes a rotor shaft connected to the compression part 3. The compressor 2, a four-way valve 6, an indoor heat exchanger 7, a decompressor 8 and an outdoor heat exchanger 9 are connected to one another by pipes serving as heat-transfer medium flow passage into a closed loop. The compressor 2 is of a rotary type and the motor 4 is a three-phase IPM (interior permanent magnet) motor (a brushless DC motor, for example. An air conditioner E incorporates the above-described heat pump system 1.

The four-way valve 6 is shown by a solid line in FIG. 2 in air heating. A high-temperature refrigerant compressed by the compression part 3 of the compressor 2 is supplied via the four-way valve 6 to the indoor heat exchanger 7 thereby to be condensed. The condensed refrigerant is subsequently decompressed by the decompressor 8 into the low-temperature refrigerant, flowing into the outdoor heat exchanger 9, in which the refrigerant is evaporated and returned to the compressor 2. On the other hand, the four-way valve 6 is switched to the state as shown by broken line in FIG. 2 in cooling. As a result, the high-temperature refrigerant compressed by the compression part 3 is supplied via the four-way valve 6 to the outdoor heat exchanger 9 to be condensed. The condensed refrigerant is subsequently decompressed by the decompressor 8 into the low-temperature refrigerant, flowing into the indoor heat exchanger 7, in which the refrigerant is evaporated and returned to the compressor 2. Fans 10 and 11 are driven to supply air into the indoor and outdoor heat exchangers 7 and 9 respectively. Heat exchange between the heat exchangers 7 and 9 and indoor air and outdoor air is efficiently carried out by the blowing operations of the fans 10 and 11.

Figure 2:
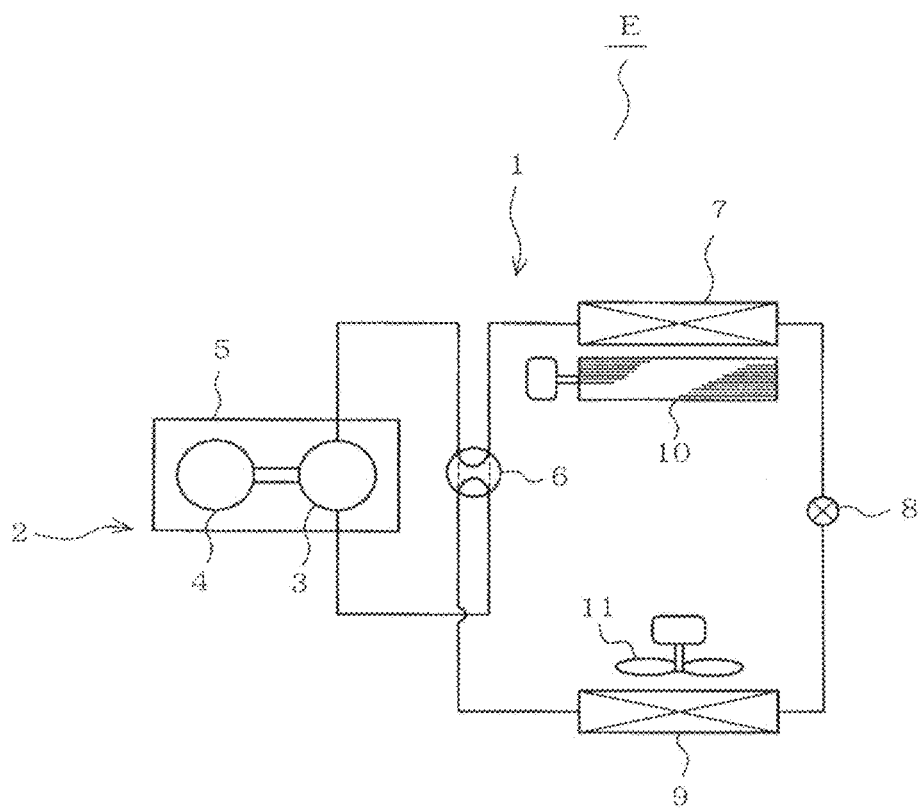
FIG. 2 is a schematic diagram showing an arrangement of heat pump system.

Referring to FIG. 1, an electrical arrangement of the motor control device is shown. Although a DC power supply 21 is designated by a symbol of DC power supply, the DC power supply 21 includes a rectifier circuit, a smoothing capacitor and the like when a DC power supply is generated from a commercial AC power supply. An inverter circuit (a DC-AC converter) 23 is connected via a positive bus bar 22a and a negative bus bar 22b to the DC power supply 21. A shunt resistance 24 serving as a current detecting element is inserted to the negative bus bar 22b side. The inverter circuit 23 includes N-channel type power MOSFETs 25 (U+, V+, W+, U−, V−, W−) which serve as switching elements and are connected into a three-phase bridge configuration. Output terminals of the phases are connected to phase windings of the motor 4 respectively.

A terminal voltage (a signal corresponding to a current value) of the shunt resistance (the current detecting element) 24 is detected by the current detecting section (a current detecting unit) 27. When A/D converting and then reading the terminal voltage, the current detecting section 27 detects U-phase, V-phase and W-phase currents Iu, Iv and Iw based on a two-phase or three-phase PWM signal pattern delivered to the inverter circuit 3. The phase currents detected by the current detecting section 27 are supplied to a vector control section (a rotor position determining unit and a PWM signal generating unit).

When a rotating speed command ωref of the motor 4 is supplied from a function section such as a microcomputer setting control conditions, a vector control section 30 generates a torque current command Iqref, based on a difference between the rotating speed command ωref and an estimated actual rotating speed of the motor 4. A rotor position of the motor 4 depends upon the phase currents Iu, Iv and Iw of the motor 4. A torque current Iq and an excitation current $I_d$ are calculated by vector operation using a rotor position θ. A voltage command Vq is generated by proportional-integral (PI) control operation of the difference between the torque current command Iqref and the torque current Iq, for example. A voltage command Vd is generated by the same processing as applied to the excitation current $I_d$. The voltage commands Vq and Vd are converted to three-phase voltages Vu, Vv and Vw using the rotor position θ. The three-phase voltages Vu, Vv and Vw are supplied to a DUTY generating section (a PWM signal generating unit) 31, so that duties U_DUTY, V_DUTY and W_DUTY to generate respective phase PWM signals are determined.

The phase duties U_DUTY, V_DUTY and W_DUTY are supplied to a PWM signal generating section (a PWM signal generating unit) 32 to be compared with a level of carrier, so that two-phase or three-phase PWM signals are generated. Further, lower arm side signals are also generated by inverting the two-phase or three-phase PWM signals. Dead time is added to the generated signals if necessary, and the signals are supplied to a drive circuit 33.

According to the supplied PWM signals, the drive circuit 33 supplies gate signals to gates of the six power MOSFETs 25 (U+, V+, W+, U−, V− and W−) composing the inverter circuit 23 (gate signals boosted by a necessary level are supplied to an upper arm side). A manner of the PWM signal generating section 32 generating the three-phase PWM signals is disclosed as a manner of a fourth embodiment in the above-mentioned Japanese Patent No. 5178799.

In the embodiment, the motor 4 is driven by a two-phase modulation manner in which any two of three phases are simultaneously switched with respect to either one of the upper and lower arms composing the inverter circuit 23. Further, a current detection timing point adjusting section 34 is disposed between the PWM signal generating section 32 and the current detecting section 27.

The current detection timing point adjusting section 34 determines timing points for the current detecting section 27 to detect two-phase currents within a carrier period, supplying the timing points to the current detecting section 27. The current detecting section 27 performs A/D conversion of the terminal voltage of the shunt resistance 24 at the timing points supplied from the current detection timing point adjusting section 34. In the foregoing description, functions of the configurations 27, 30 to 32 and 34 are realized by hardware and software of the microcomputer including a CPU.

Figure 3:
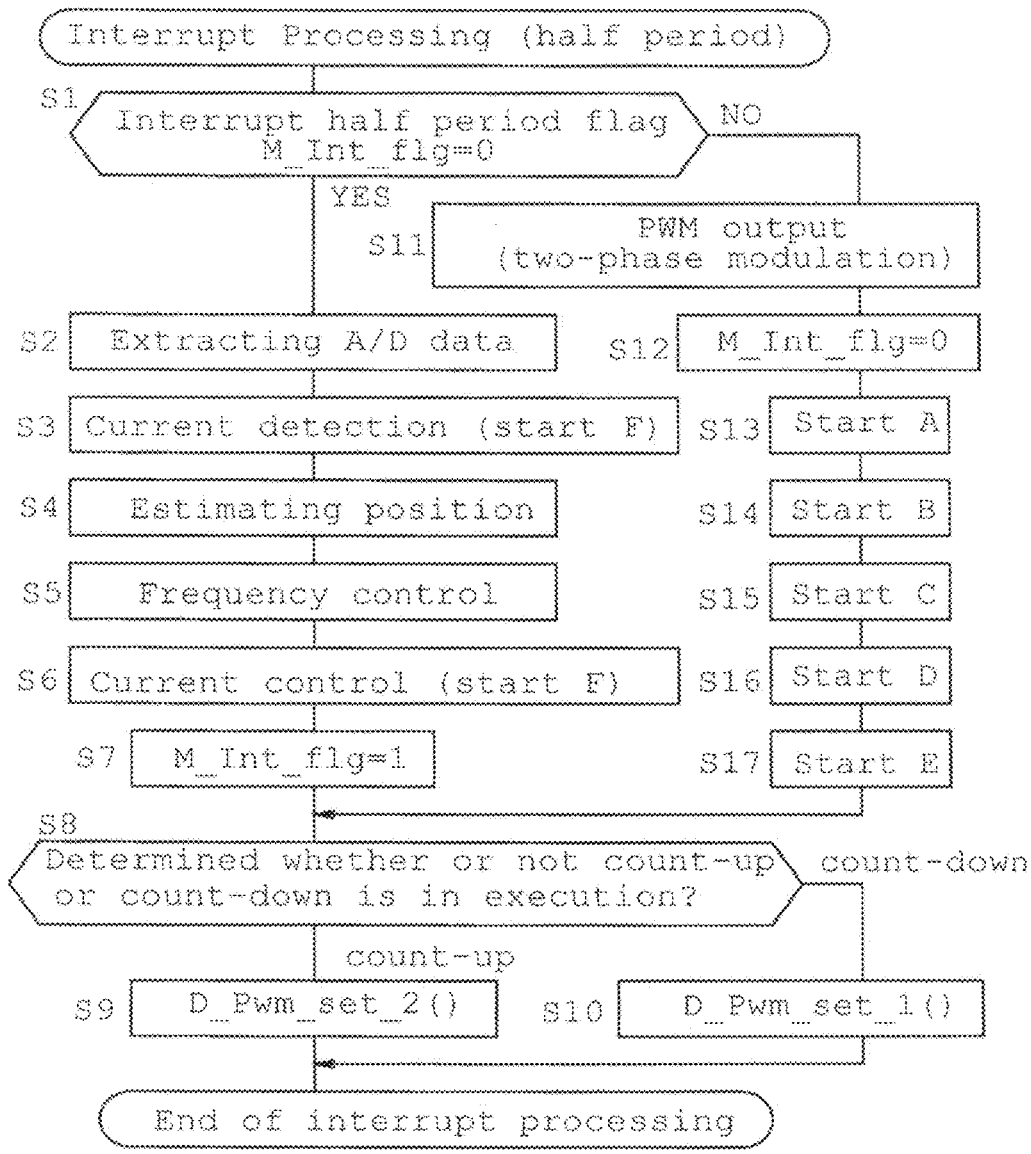
FIG. 3 is a flowchart showing interrupt processing executed at intervals of half period of the carrier.

The operation of the embodiment will now be described with reference to FIGS. 3 to 26. FIG. 3 shows interrupt processing executed in every half period of carrier. More specifically, PWM interrupt takes place at peak and bottom of a carrier or triangular amplitude. Firstly, it is determined whether or not the flag M_INT_flg=0 (reset; S1). When the flag is 0, data A/D converted in the current detecting section 27 is extracted (S2). Three-phase currents are detected based on the extracted data (S3). "Start F" processing which will be described later is executed at step S3.

A/D conversion of the terminal voltage of the shunt resistance 24 in the current detecting section 27 is executed twice within one carrier period independent of the processing shown in FIG. 3 (execution timing will be described later). The A/D converted data is stored in a register or the like. Accordingly, data stored in the register is read in the processing at step S2.

Subsequently, a rotor position (θ) of the motor 4 is estimated from the three-phase currents by a vector-controlled calculation (S4), and frequency control (speed control, S5) and current control (PI control or the like) are executed (S6). The flag M_INT_flg is set to 1 (S7). Processing at subsequent steps S8 to S10 is executed by the DUTY generating section 31. The DUTY generating section 31 refers to a value of a carrier counter supplied from the PWM signal generating section 32 to determine whether or not count-up or count-down is in execution (S8). When count-up is in execution, an index D_Pwm_set_2( ) is set (S9). When count-down is in execution, an index D_Pwm_set_1( ) is set (S10). These indexes will be described later with reference to FIGS. 4 and 5.

Further, when the flag M_INT_flg is set to 1 at step S1 (NO), two-phase PWM signals are supplied (S11) and the flag M_INT_flg is set to 0 (S12). When processing of start A to start E is carried out (S13 to S17), the control sequence proceeds to step S8. More specifically, in the above-described PWM interrupt processing, steps S2 to S8 and S10 are executed in a first half of the period and steps S11 to S17, S8 and S9 are executed in a latter half of the period.

Figures 4A, 4B:
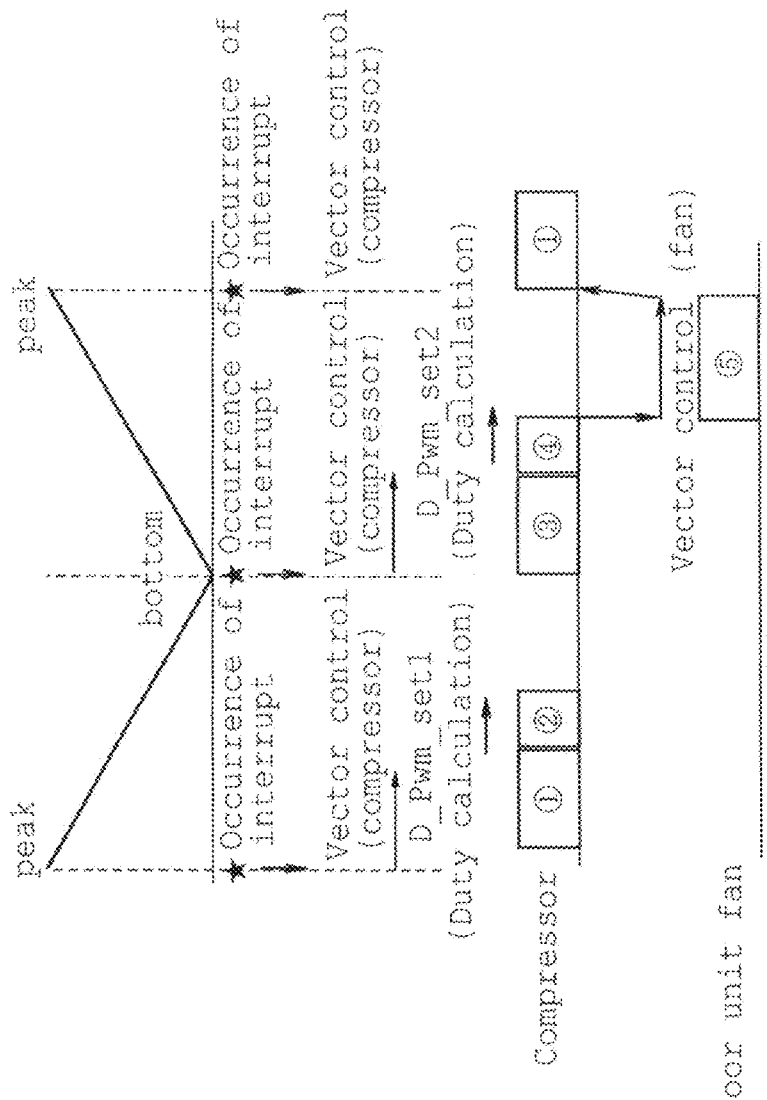
FIGS. 4A and 4B show lapse of execution time of the processing as shown in FIG. 3 together with a PWM carrier wave.

FIGS. 4A and 4B show an execution time image of the interrupt processing in the two-phase modulation together with the PWM carrier waveform. In the air conditioner, a single control circuit (microcomputer) controls an electric motor driving the fan 11 of the heat exchanger 9 corresponding to outdoor equipment in parallel with the compressor 2 (an electric motor driving a fan 10 of the heat exchanger 7 corresponding to indoor equipment) is controlled by another control circuit, driver IC or the like.

FIGS. 4A and 4B show, in part (a), processing times (1) to (4) regarding control of the motor of the compressor 2 as shown in FIG. 3 and, in part (b), a processing time (5) regarding control of the motor (fan motor) of the above-described fan 11. More specifically, when the PWM interrupt takes place at the bottom of the triangular wave amplitude, motor current is detected and vector control is carried out regarding the fan motor after execution of the processing shown in FIG. 3. FIG. 4 shows processes (1) to (4) designated by encircled numbers. Processes (1) and (3) correspond to steps S2 to S8, and processes (2) and (4) correspond to steps S9 and S10 respectively. In this case, the fan motor control (5) is carried out after execution of process (4).

Figure 5:
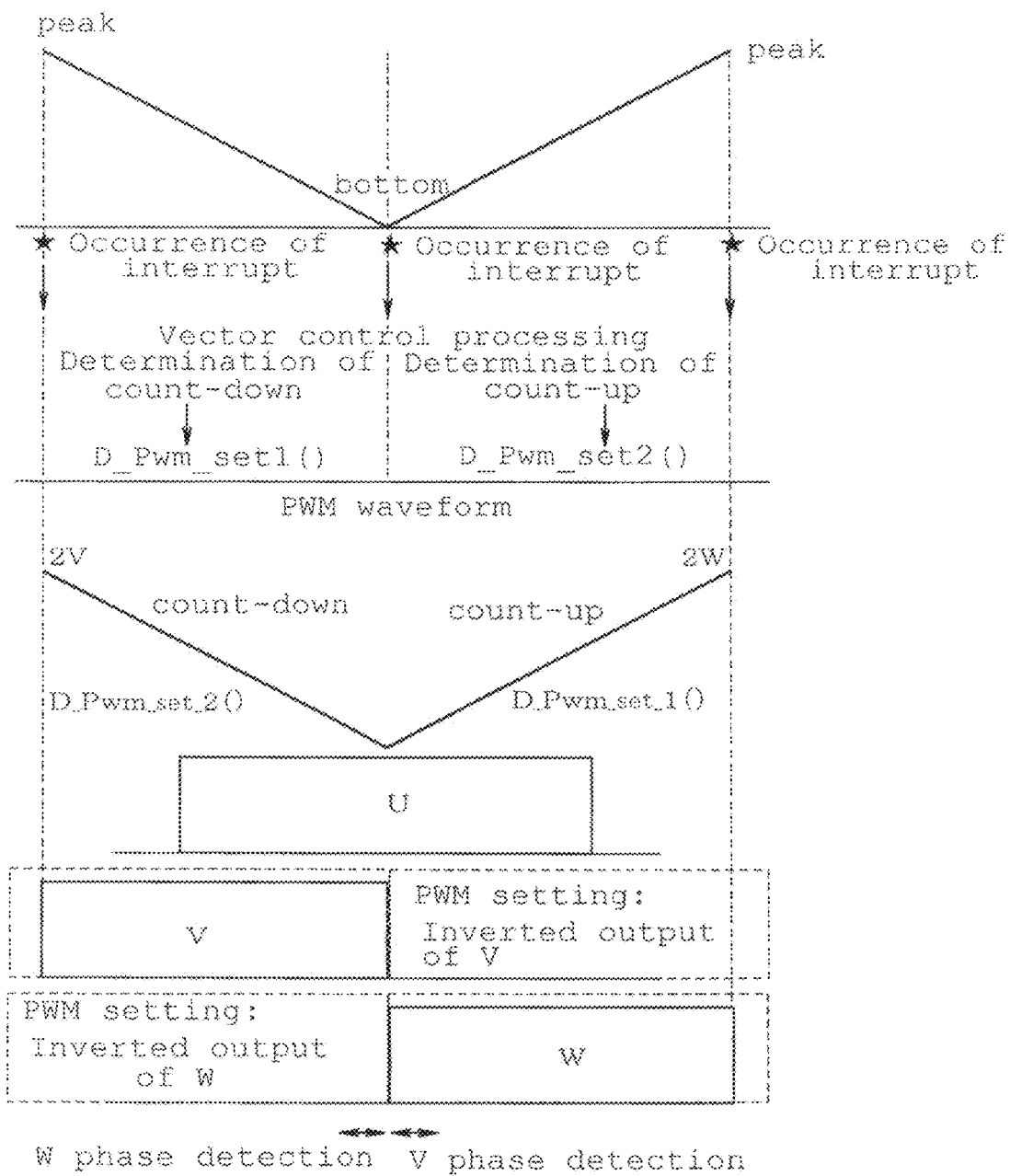
FIG. 5 shows an output phase of three-phase PWM duty pulse.

FIG. 5 shows output phases of respective phase PWM duty pulses. A control manner as disclosed by Japanese Patent No. 5178799, the contents of which are incorporated herein by reference, is employed as described above. More specifically, regarding a first one of three phases, the duty is increased/decreased in both directions of phase lag side and phase lead side based on the bottom of the triangular wave amplitude. Regarding a second phase, the duty is increased/decreased, for example, to the phase lead side based on the aforesaid bottom. Regarding a third phase, the duty is increased/decreased to the phase lag side based on the aforesaid bottom. Although the first, second and third phases correspond to U, V and W phases respectively in the example, the correspondence relationship is optional. The carrier counter is under down-counting operation when an interrupt takes place at a peak of the triangular wave amplitude. As a result, duty pulses for a first half of the current carrier period are output by D_Pwm_set_2( ). Duty values of the U, V and W phases are obtained by doubling the values (U0, V0 and W0 as will be described later) calculated at step S11.

Regarding the U phase, pulses of half duty are delivered in a period starting from the time after the interrupt at the peak of the triangular wave amplitude to the bottom. Regarding the V phase, when duty is less than 50%, the pulses are output in a period starting from the time after the interrupt at the peak of the triangular wave amplitude to the bottom in the same manner with respect to the U phase. Further, regarding the W phase, when duty exceeds 50%, pulses of an excess are output in a period starting from the timing of interrupt at the peak to the bottom. Accordingly, these pulses are output by D_Pwm_set_2( ).

On the other hand, the carrier counter is under up-counting operation when an interrupt takes place at a bottom of the triangular wave amplitude. As a result, duty pulses for a latter half of the current carrier period are output by D_Pwm_set_1( ). Regarding the U phase, pulses of half duty are output in a period starting from the time after the interrupt at the bottom of the triangular wave amplitude to the peak in the same manner as in the first half period. Regarding the V phase, when duty exceeds 50%, the pulses corresponding to the excess are output in a period starting from the time after the interrupt at the bottom of the triangular wave amplitude to the peak. Further, regarding the W phase, when duty is less than 50%, pulses are output in a period starting from the timing of interrupt at the bottom to the peak. Accordingly, these pulses are output by D_Pwm_set_1( ).

FIG. 5 shows three-phase duty pulses. However, since two-phase modulation is employed as the actual drive manner, only two-phase of the three-phase duty pulses are output.

Next, processing (Start A) at step S13 will be described with reference to FIGS. 6 and 7. In the processing, two-phase duty pulses are divided into patterns (0) to (11) depending upon a magnitude relation of respective phase duty pulses in the two-phase modulated PWM signals. These patterns will be shown as variables ptns in the processing which will be described later. The pattern division is based on the following conditions.

In the current detecting section 27, a minimum width refers to a current-detectable minimum duty, and a maximum width refers to a result of subtraction of the minimum width from maximum duty (100%). For example, when the current-detectable minimum time is 10 μs and the carrier frequency is 4 kHz, the minimum width is set to 4% and the maximum width is set to 96%. Further, when duty less than the maximum width and exceeding the minimum width refers to an intermediate width, a two-phase PWM signal output pattern is divided into the following combinations of U-, V- and W-phase duties:

(1) a case where the U phase has the intermediate width and a width of V or W phase is equal to or larger than the maximum width;

(2, 3) a case where either the V or W phase has the intermediate width and the other phase has a width equal to or larger than the maximum width;

(4, 6) a case where the U phase and the V or W phase have respective widths equal to or larger than the maximum width;

(5) a case where both of the V and W phases have respective widths equal to or larger than the maximum width;

(7) a case where the U phase has a width equal to or larger than 0 and the V or W phase has a width smaller than the minimum width;

(8, 9) a case where either the V or W phase has a width equal to or larger than 0 and the other has a width smaller than the minimum width;

(10, 11) a case where the U phase has a width smaller than the minimum width and the V or W phase has a width equal to or larger than 0; and (0) any case other than the cases (1) to (10).

Figure 6A:
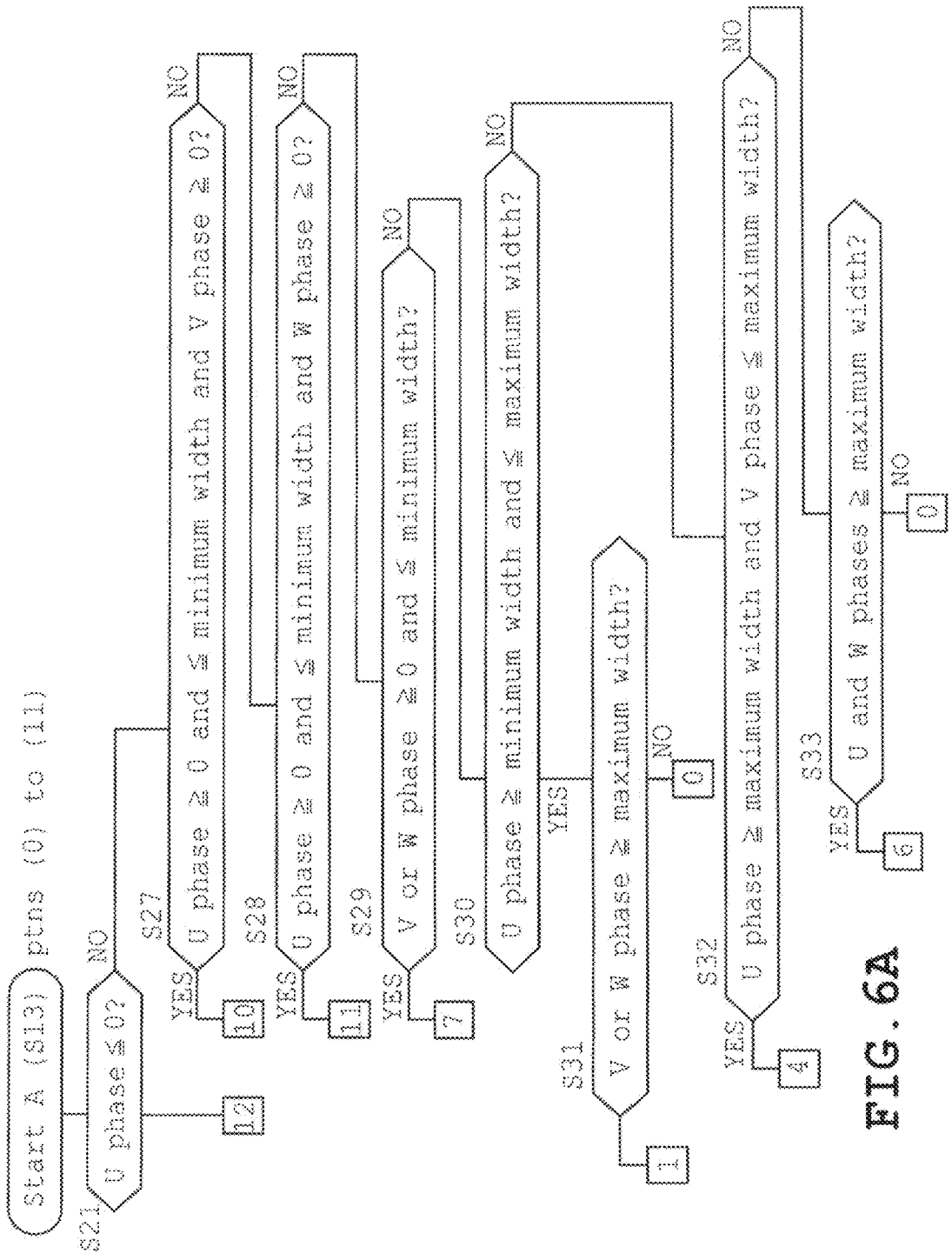
FIGS. 6A and 6B are flowcharts showing contents of processing at step S13 in FIG. 3.
Figure 6B:
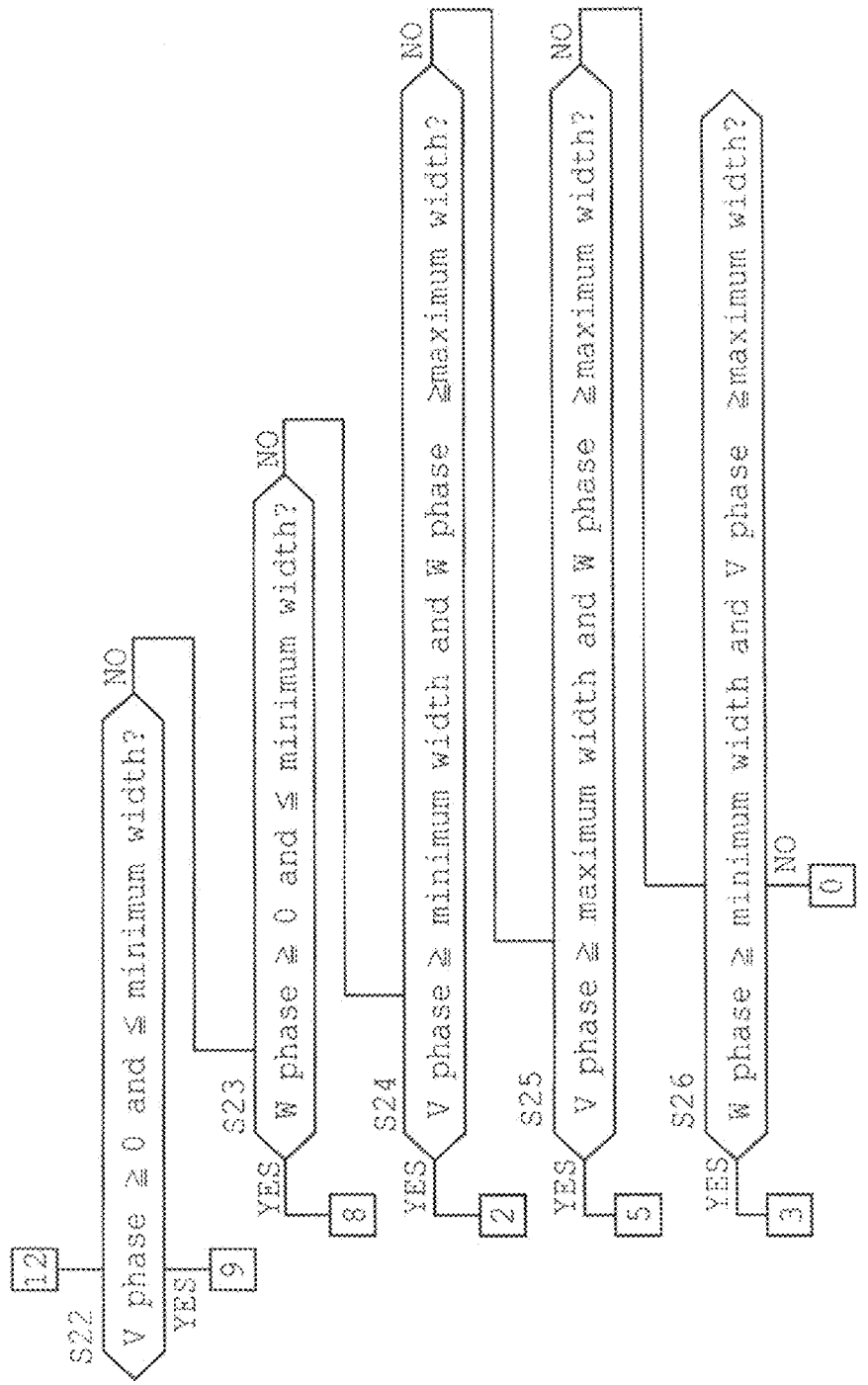

At steps S21 to S33 shown in FIGS. 6A and 6B, patterns (variables ptns) (0) to (11) are distinguished according to the above-described conditions. FIG. 7 shows two-phase PWM signal patterns corresponding to the aforementioned patterns (1) to (11). Of these patterns, patterns (4) to (11) represent an overmodulation state where an output voltage is extremely large. Pattern (7) shows a case where W-phase duty is equal to or smaller than the minimum width.

Processing (start B) at step S14 will be described with reference to FIG. 8. In the processing, a two-phase PWM signal output pattern is distinguished into the following sectors (0) to (5) based on a magnitude relationship among respective phase duty pulses in the two-phase modulated PWM signals. The sectors will be shown as variables "sectors" in the processing which will be described later. The sector distinction is based on the following conditions:

(0) where the U phase is maximum and the V phase is larger than the W phase;

(1) where the U phase is maximum and the V phase is smaller than the W phase;

(2) where the V phase is maximum, and the U phase is larger than the W phase;

(3) where the V phase is maximum and the U phase is smaller than the W phase;

(4) where the W phase is maximum and the U phase is larger than the V phase; and (5) where the W phase is maximum and the U phase is smaller than the V phase.

Figure 8:
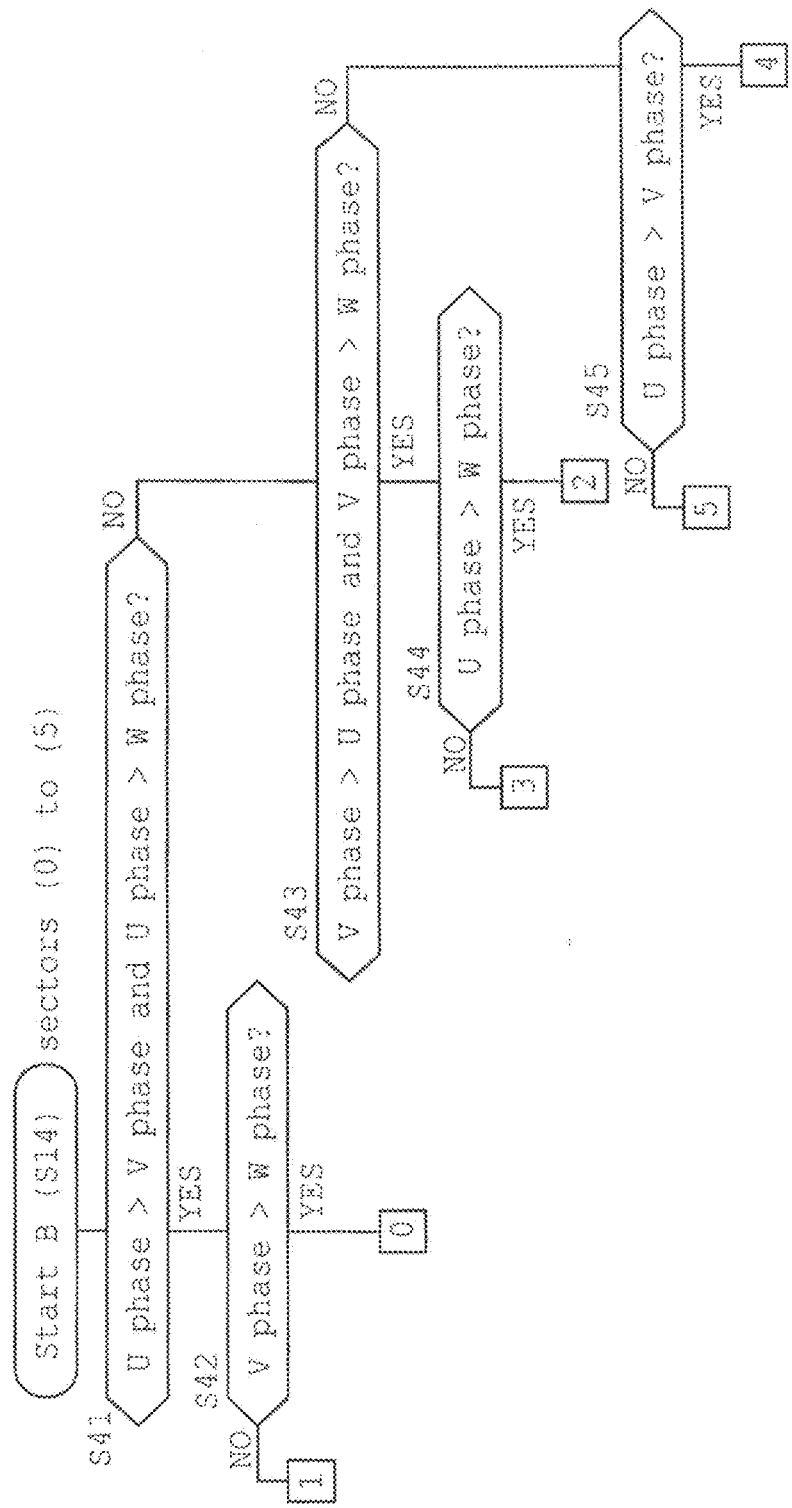
FIG. 8 is a flowchart showing contents of processing at step S14 in FIG. 3.
Figure 9A:
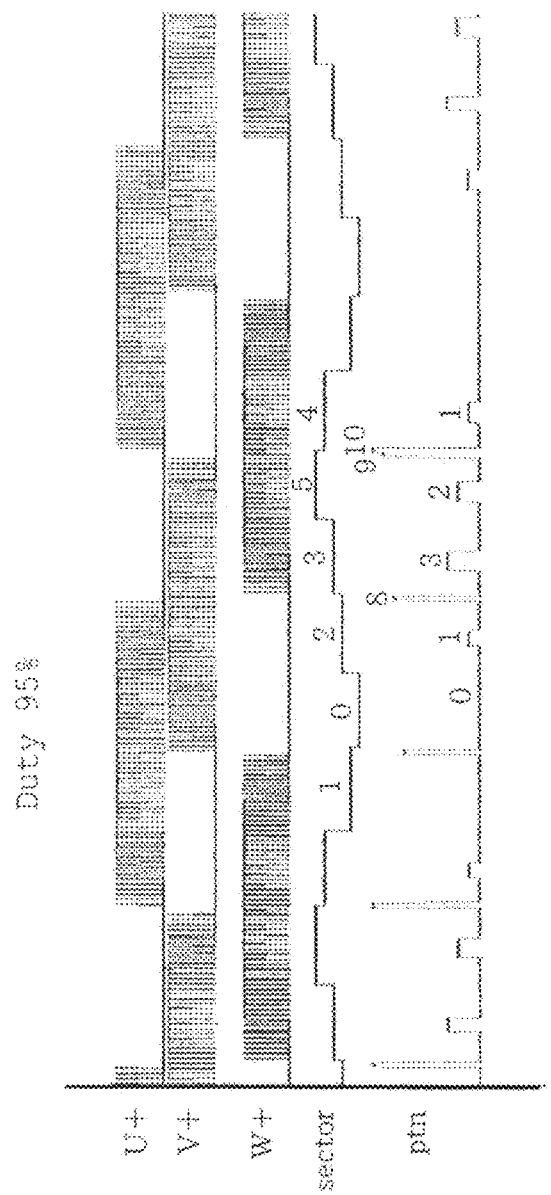
FIGS. 9A and 9B are graphs showing three-phase PWM signals and corresponding sectors and patterns when the maximum duty is 95% and 105% respectively.
Figure 9B:
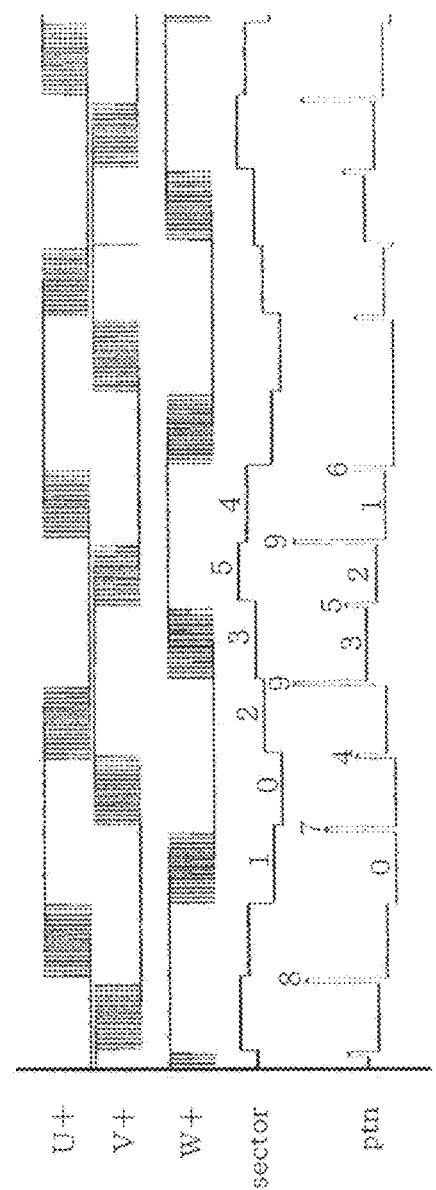

Sectors (0) to (5) are distinguished according to the above-described conditions at steps S41 to S45 in FIG. 8. FIGS. 9A and 9B show sectors and patterns changed according to cases where PWM signals are actually output. FIG. 9A shows the case where the maximum duty is 95% and accordingly in the neighborhood of the maximum width. In this case, the sector changes in a range from (0) to (5), and the pattern changes in a range from (0) to (3) and from (8) to (10). FIG. 9B show the case where the maximum duty is 105% (an overmodulated state) and accordingly in excess of the maximum width. In this case, the sector changes in a range from (0) to (5), and the pattern changes in a range from (0) to (9). More specifically, durations of the patterns (0) to (3) become longer as the output voltage is high, and the number of sections where patterns (4) to (11) take place in the boundaries between the patterns (0) to (3) is increased.

Processing (start C) at step S15 will be described with reference to FIG. 10. In the processing, the current detecting section 27 determines timing points for A/D conversion of the terminal voltage of the shunt resistance 24 within the carrier period according to a combination of the pattern and the sector. Symbol "α" is set in consideration of the above-mentioned current-detectable time, a current detection accuracy and the like (duty 5% to 10%, for example). Symbol "PWM_MAX" denotes the maximum value of duty (100%).

Figure 10:
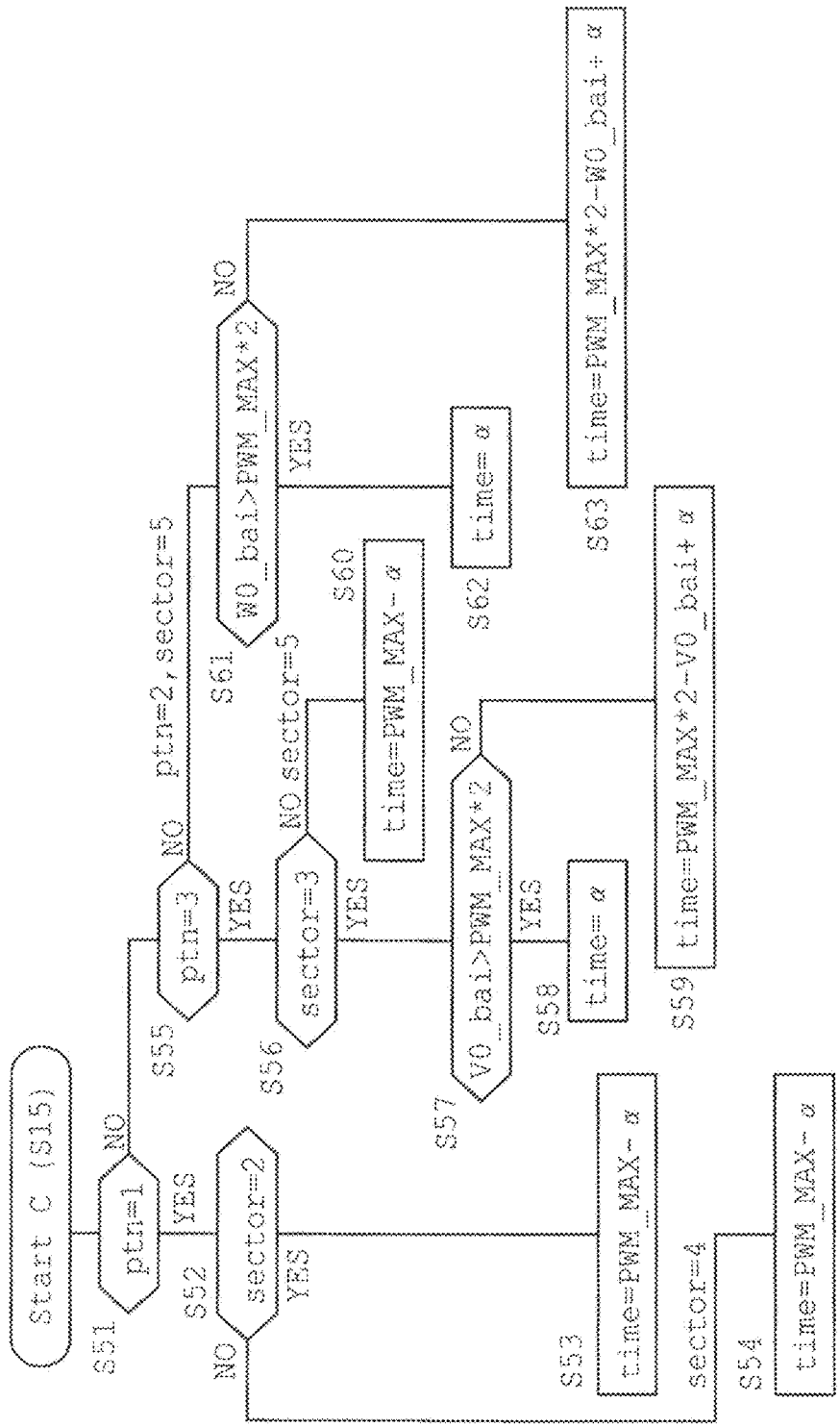
FIG. 10 is a flowchart showing contents of processing at step S15 in FIG. 3.
Figure 11B:
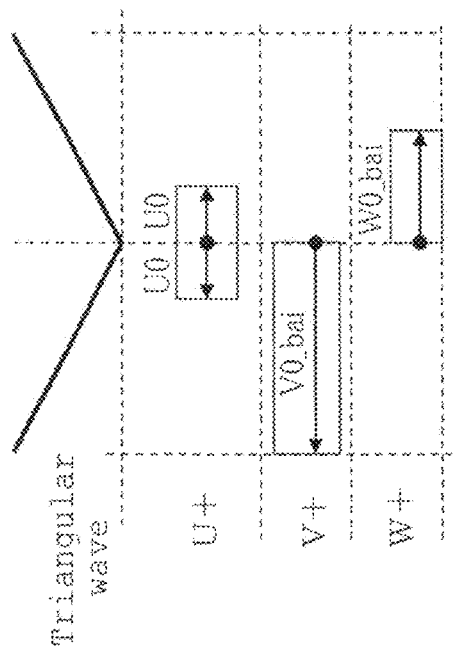
FIGS. 11A and 11B shows definitions of U0, V0 and W0 and V0_bai and W0_bai.
Figure 11A:
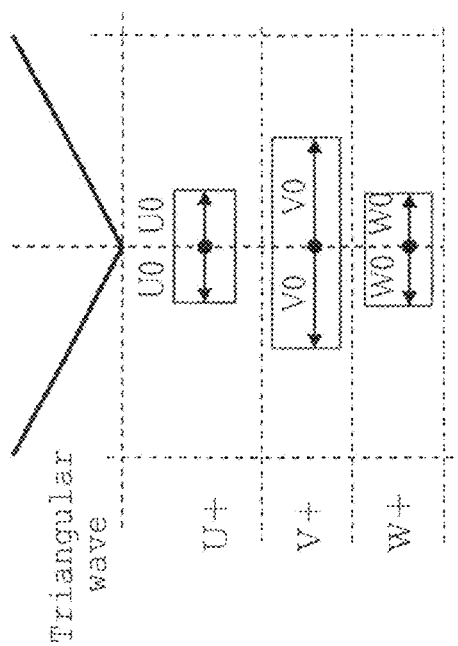

Further, in FIG. 10, symbols "U0," "V0" and "W0" denote time lengths corresponding to halves of U-, V- and W-phase duties initially determined on the basis of intermediate point (bottom) of the carrier period respectively, as shown in FIG. 11A. As shown in FIG. 11B, symbols "V0_bai" and "W0_bai" correspond to pulse lengths on the basis of the intermediate point of the carrier period when V- and W-phase duty pulses are shifted in order that three-phase PWM signals may be output in the pattern shown in FIG. 5. "Time" denotes a variable indicative of the A/D conversion timing point of each of U-, V- and W-phases.

Step S53 is directed to a combination of pattern (1) and sector (2) and in this case, the A/D conversion timing point is set to (PWM_MAX-a). Step S54 is directed to a combination of pattern (1) and sector (4) and in this case, the A/D conversion timing point is set to (PWM_MAX−α). Step S58 is directed to a combination of pattern (3) and sector (3) and this is a case of overmodulation (YES at step S57) in which V0_bai exceeds (PWM_MAX×2) and in this case, the A/D conversion timing point is set to α. Step S59 is directed to the case where determination is negative at step S57 and in this case, the A/D conversion timing point is set to (PWM_MAX× 2−V0_bai+α).

Step S62 is directed to a combination of pattern (2) and sector (5) and this is a case of overmodulation (YES at step S61) in which W0_bai exceeds (PWM_MAX×2) and in this case, the A/D conversion timing point is set to α. Further, step S63 is directed to the case where determination is negative at step S61 and in this case, the A/D conversion timing point is set to (PWM_MAX×2−W0_bai+α).

Processing (start D) at step S16 will be described with reference to FIGS. 12 and 13. In the processing, the current detecting section 27 determines timing points for A/D conversion within the carrier period in a down-count period from the start of the carrier period (peak) to a half period (bottom) and in an up-count period from the half period to the end of the carrier period, respectively. The former serves as a first detected timing point and the latter serves as a second detected timing point.

The flow of start C corresponds to the flow of start D in case division by a combination of pattern and sector. Accordingly, the variable "time" for setting each timing point uses a combination corresponding to that in start C. In the case of pattern (0) (YES at step S71) which is other than patterns (1) to (11) shown in FIG. 7, two phase currents are detectable at the respective fixed timing points. Accordingly, A/D timing points of down-count and up-count are set to α (S72). More specifically, the A/D conversion is carried out both at the timing of or in synchronization with the count value reaching α from the start of carrier period and at the timing of or in synchronization with elapse of time α from half of carrier period.

In a combination of pattern (1) and sector (2) (YES at S74), the A/D conversion timing is set to "time" in the up-count period, that is, to (PWM_MAX−α) determined at step S53. The A/D conversion timing point is also set to α in the down-count period (S75).

In a combination of pattern (1) and sector (4) (YES at step S76), the A/D conversion timing set is set to α in the up-count period and to "time", that is, to (PWM_MAX−α) determined at step S54 (S77). Further, in any combination other than a combination of pattern (1) and sector (2, 3 or 4) (NO at step S76), the A/D conversion timing point is set to α in both up-count and down-count periods (S78).

In a combination of pattern (3) and sector (3) (YES at step S80), the A/D conversion timing point is set to "time," that is α determined at step S58 or (PWM_MAX×2−V0_bai+α) determined at step S59 in the up-count period. On the other hand, the A/D conversion timing point is set to α in the down-count period (S81).

In a combination of pattern (3) and sector (5) (YES at step S82), the A/D conversion timing point is set to α in the up-count period. The A/D conversion timing point is set to "time" in the up-count period and to "time," that is, (PWM_MAX−α) determined at step S60 in the down-count period (S83). Further, in any combination other than the combination of pattern (3) and sector (3 or 5) (NO at step S82), the A/D conversion timing point is set to α both in the up-count period and in the down-count period (S84).

Figure 13:
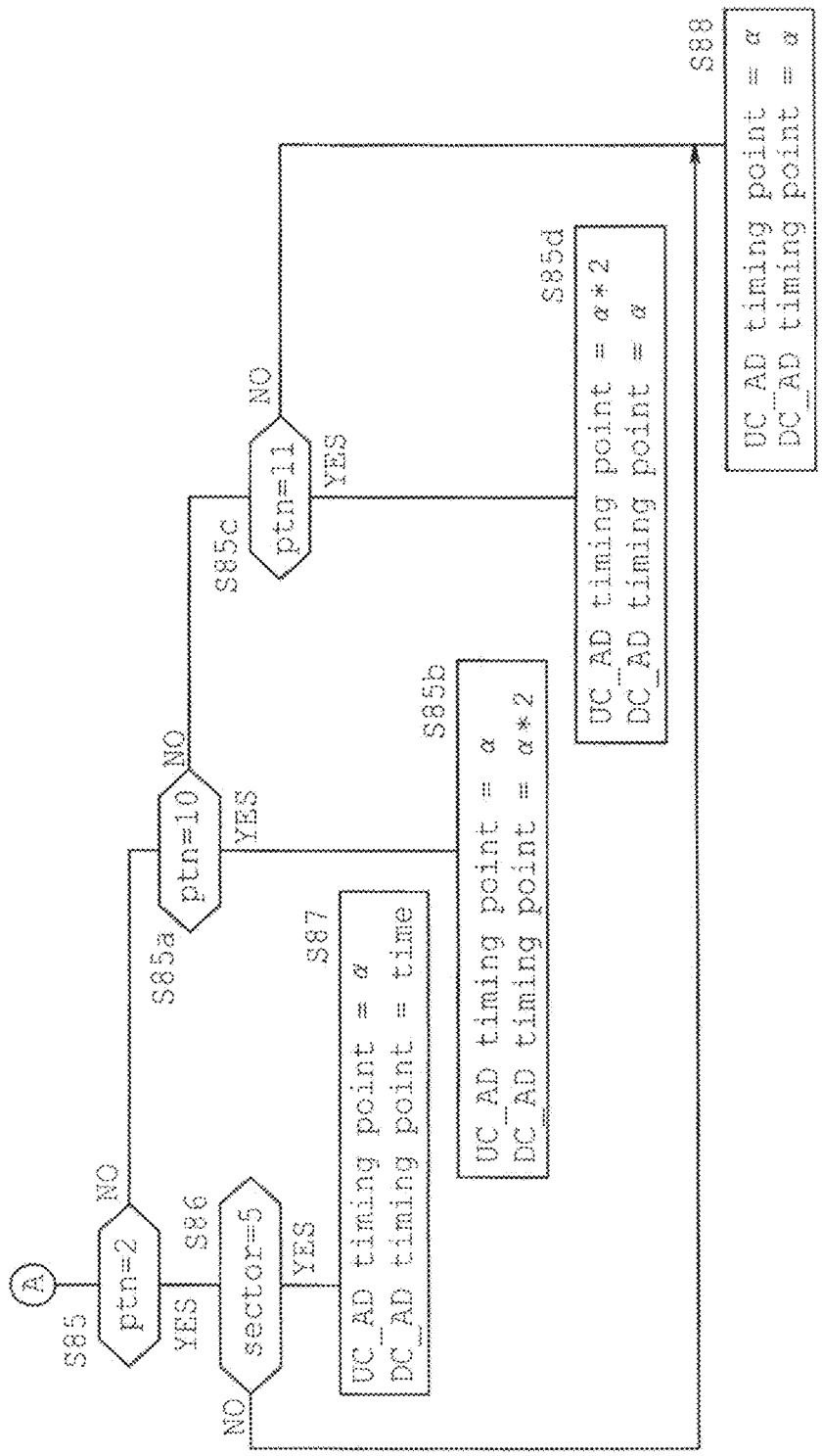
FIG. 13 is a flowchart showing contents of processing at step S16 (No. 2)

In FIG. 13, in a combination of pattern (2) and sector (5) (YES at step S86), the A/D conversion timing point is set to α in the up-count period and to "time," that is, α determined at step S62 or (PWM_MAX×2−W0_bai+α) determined at step S63 (S87).

Further, when a combination does not include pattern (2) (NO at step S85), it is determined whether or not a combination includes pattern (10) or (11) (S85a, S85c). When the combination includes pattern (10) (YES at step S85a), the A/D conversion timing point is set to α in the up-count period and to (α×2) in the down-count period (S85b). When the combination includes pattern (11) (YES at step S85c), the A/D conversion timing point is set to α in the down-count period (S85d). When the combination includes pattern (2) and does not include sector (5) (NO at step S86) or when the combination does not include pattern (11) (NO at step S85c), the A/D conversion timing point is set to α in the up-count and down-count periods (S88).

Figure 14:
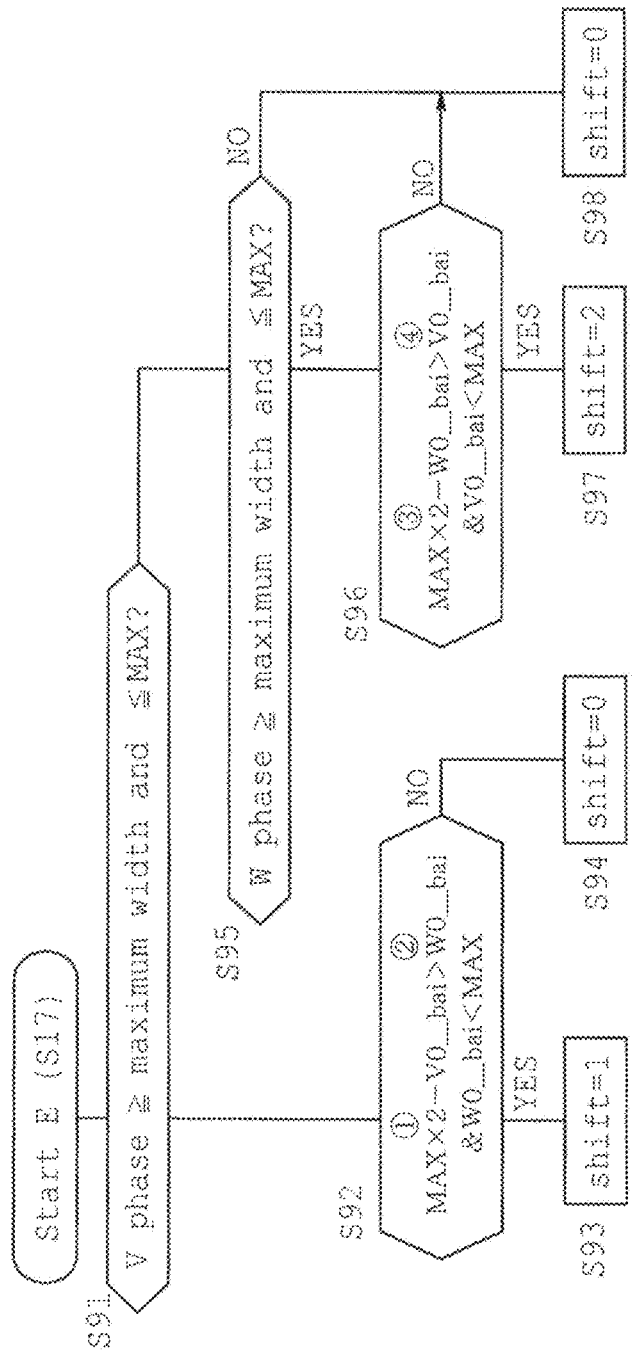
FIG. 14 is a flowchart showing contents of processing at step S17.

Next, processing (start E) at step S17 will be described with reference to FIGS. 14 and 15. In the processing, a variable "shift" used to change the increase/decrease direction of duty pulse is set to any one of 0, 1 and 2 regarding either the second phase (V) or the third phase (W). Firstly, when the V-phase duty is equal to or larger than maximum width and less than 100% (YES at step S91), it is determined whether or not "W0_bai" is smaller than a value obtained by adding minimum width to the difference obtained by subtracting "V0_bai" from "PWM_MAX×2" (MAX in FIG. 14) and whether or not "W0_bai" is less than 100% (=W-phase duty <50%) (S92). When the conditions are met (YES), variable-"shift" is set to 1 (S93). When the conditions are not met (NO), variable "shift" is set to 0 (S94).

On the other hand, when it is determined in the negative at step S91 (NO) and W-phase duty is equal to or larger than the maximum width and less than 100% (YES at step S95), it is determined whether or not "V0_bai" is smaller than a value obtained by adding minimum width to the difference obtained by subtracting "V0_bai" from "PWM_MAX×2" and whether or not "V0_bai" is less than 100% (=V-phase duty <50%) (S96). When the conditions are met (YES), variable "shift" is set to 2 (S97). When the conditions are not met (NO), variable "shift" is set to 0 (S98).

Figure 15A:
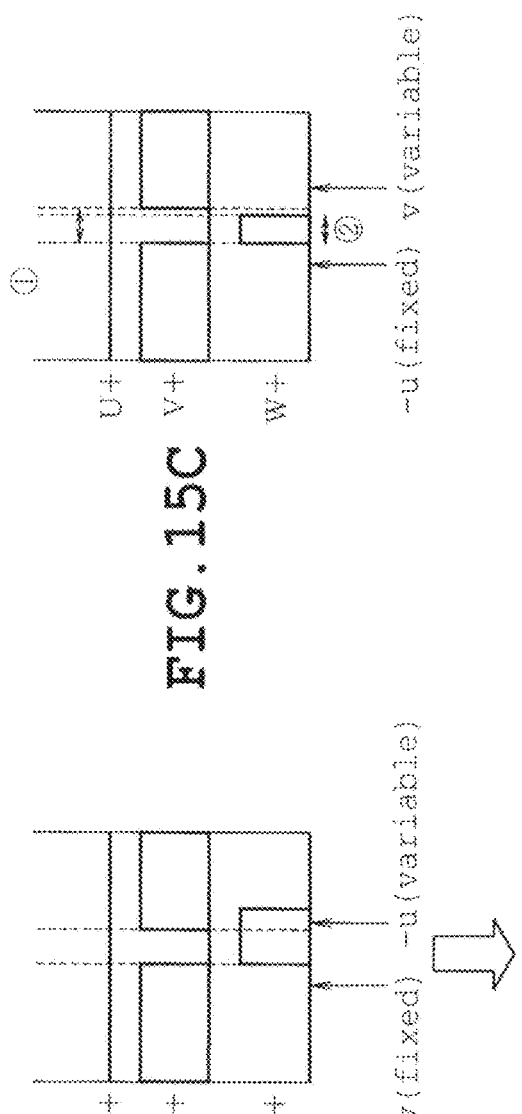
FIGS. 15A to 15D show examples of modifications of two-phase PWM signal corresponding to the processing in FIG. 14.
Figure 15B:
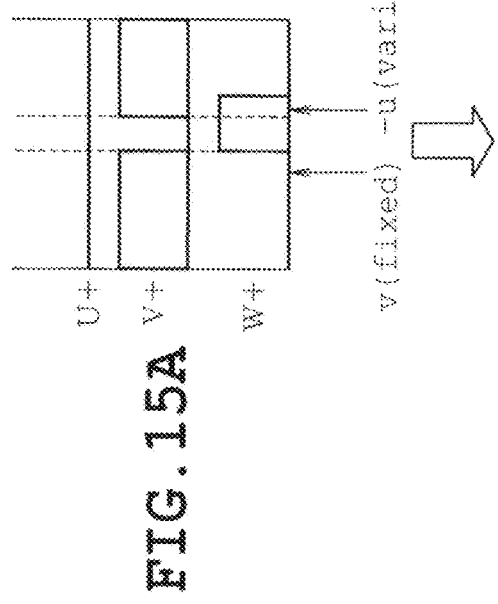

FIGS. 15A and 15B exemplify the case of pattern (3). In pattern (3), the V-phase duty is equal to or larger than maximum width and the W-phase duty is equal to or larger than the minimum width. A V-phase current is detected at a fixed first detection timing point and a negative U-phase current is detected at a variable second detection timing point, as shown in FIG. 15A. However, when at least one of the V-phase and W-phase duties changes in such a direction as to be decreased from the above-described state, a period in which V-phase and W-phase duty pulses overlap disappears at the second detection timing point, whereupon the negative U-phase current is not detected and the V-phase or W-phase current is detected in the same manner as at the first detection timing point.

In view of the above-described drawback, the direction in which the W-phase duty is increased is changed to the same direction as the V-phase duty, as shown in FIG. 15B. As a result, the negative U-phase current is detected at the fixed first detection timing point, and the V-phase current is detected at the variable second detection timing point. Accordingly, when the V-phase duty is decreased, the second detection timing point is shifted accordingly rightward. Further, the W-phase current is detectable at the fixed first detection timing point even when the W-phase duty is decreased but is equal to or larger than the minimum width.

Figure 15C:
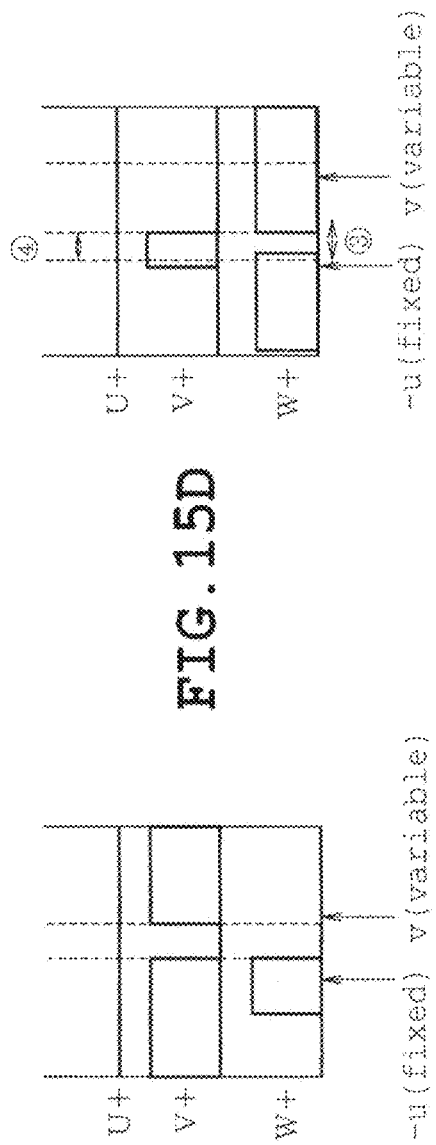

Further, FIG. 15C shows a case where variable "shift" is set to 1 in the case of pattern (3). An arrow designated by encircled number "1" in FIG. 15C denotes the value obtained by adding the minimum width to the difference obtained by subtracting "V0_bai" from "MAX×2" in the determination of conditions at step S92. An arrow designated by encircled number "2" denotes "W0_bai." The variable "shift" is set to "1" in the case where a left end (variable end) side of the V-phase duty in the up-count section overlaps with a right end (variable end) side of the W-phase duty.

Figure 15D:
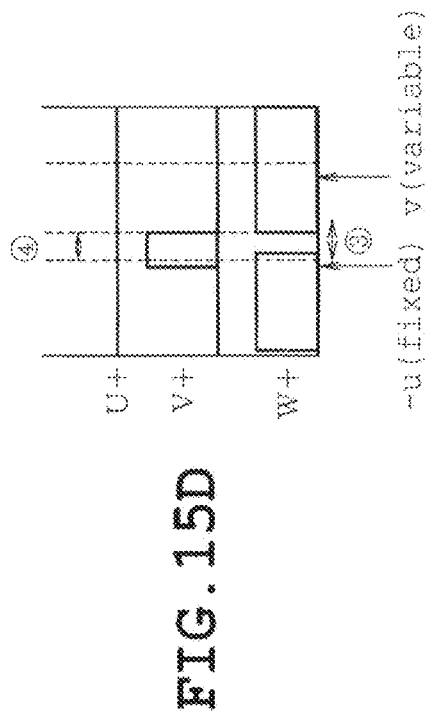

Further, FIG. 15D shows a case where variable "shift" is set to 2 in the pattern (2). An arrow designated by encircled number "3" in FIG. 15D denotes the value obtained by adding the minimum width to the difference obtained by subtracting "W0_bai" from "MAX×2" in the determination of conditions at step S96. An arrow designated by encircled number "4" denotes "V0_bai." The variable "shift" is set to "2" in the case where a left end (variable end) side of the V-phase duty in the down-count section overlaps with a right end (variable end) side of the W-phase duty in the same manner as in FIG. 15C.

Processing (start F) at step S3 will be described with reference to FIGS. 16 to 18. In the processing, two-phase currents are detected within the carrier period (A/D conversion)

based on the combinations of patterns and sectors determined by the above-described processing and the first and second detection timing points of phase currents determined by the combinations. Three-phase currents are obtained from the detected two-phase currents.

Figure 16A:
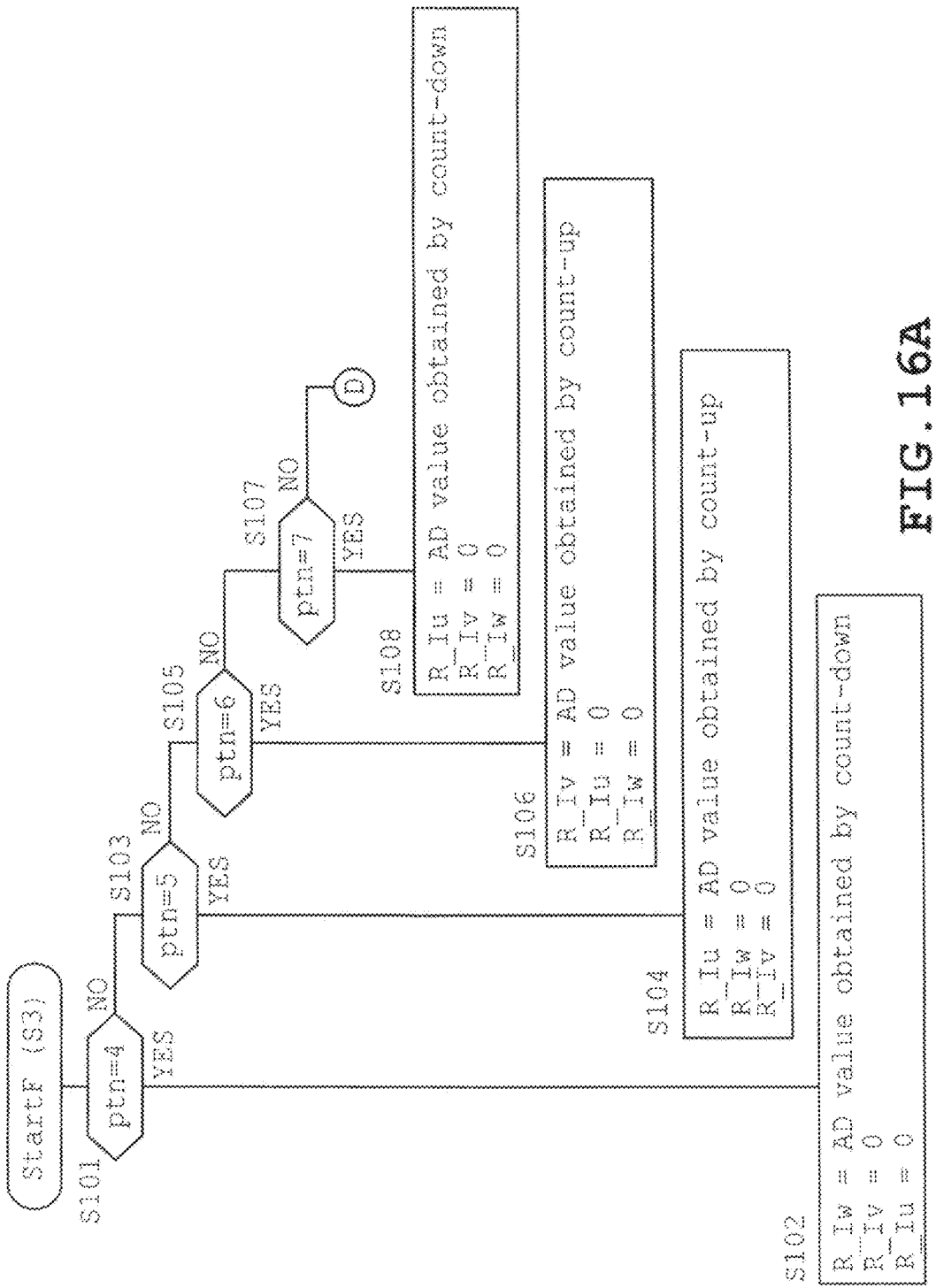
FIGS. 16A and 16B are flowcharts showing contents of processing at step S3 in FIG. 3 (No. 1)
Figure 16B:
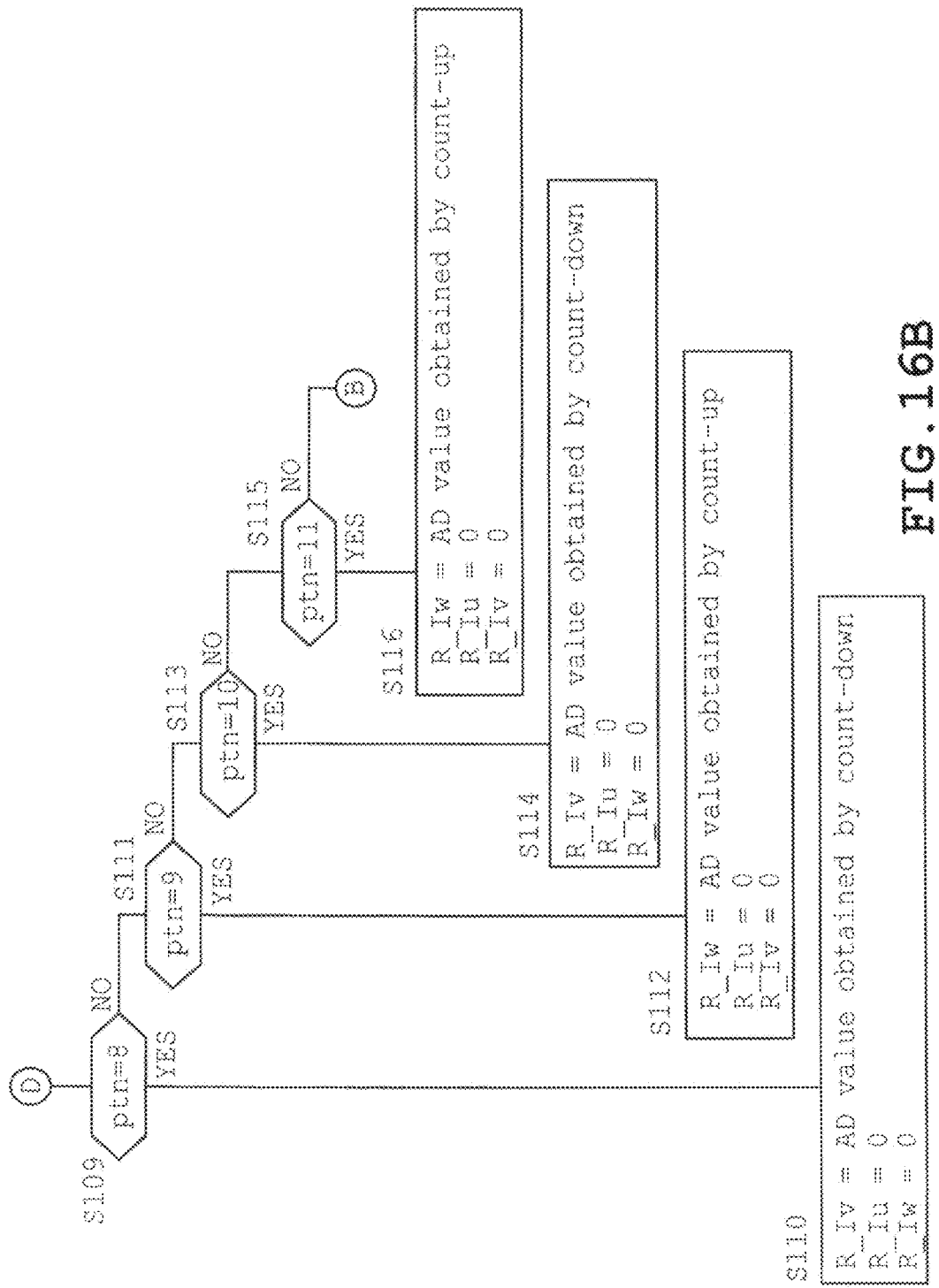

Patterns (4) to (11) shown in FIGS. 16A and 16B are directed to overmodulated states in which output voltage of any one or more phases is excessively large, as shown in FIG. 7. Since it is difficult to detect two-phase output within the carrier period in these cases, only a single-phase current is detected. W-phase (S102), U-phase (S104), V-phase (S106), U-phase (S108), V-phase (S110), W-phase (S112), V-phase (S114) and W-phase S116) currents are obtained at the down-count timing points in the patterns (4), (7), (8) and (10) and at the up-count timing points in the patterns (5), (6), (9) and (11). The current detection timing point is α×2 in the patterns (10) and (11) in each of which the U-phase duty is equal to or smaller than minimum width.

Figure 17A:
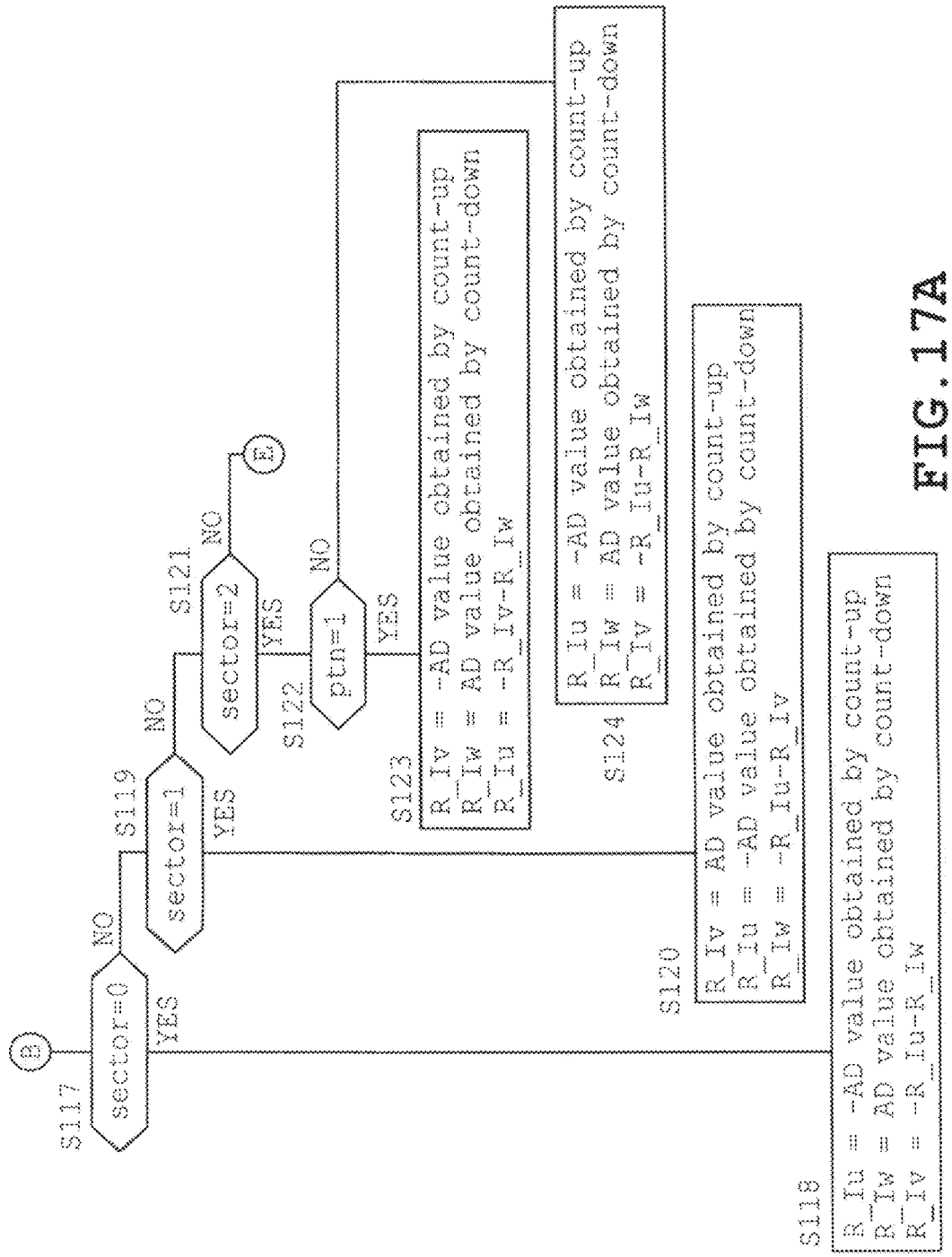
FIGS. 17A and 17B are flowcharts showing contents of processing at step S3 in FIG. 3 (No. 2)

In the case of sector (0) in FIG. 17A, W- and U-phase currents are detected by the first detection timing point (during the down-count) and the second detection timing point (during the up-count), and the V-phase current is obtained from the detected two-phase currents by calculation (S118). A minus sign is attached to an A/D converted value (right side) stored in variable "R_Iu" in FIGS. 17 and 18. The reason for this is that inverting amplification is carried out at the input side of the A/D converter. Since a W-phase current to be detected is negative, no minus sign is attached to the W-phase current when the W-phase current is stored in the "R_Iw." The presence or absence of the minus sign will not be mentioned in the following description for the sake of simplicity in the description.

In the case of sector (1), U-phase and V-phase currents are detected at the first and second detection timing points, and a W-phase current is obtained by calculation (S120). In the sector (2), it is determined whether or not pattern (1) is used (step S122). When pattern (1) is used (YES), the W-phase and V-phase currents are detected at the first and second detection timing points (S123). On the other hand, when pattern (1) is not used (NO), W-phase and U-phase currents are detected at the first and second detection timing points, and V-phase current is obtained by calculation (S124).

In the case of sector (3) (YES at step S125), it is determined whether or not the variable "shift" is 1 (S126). When the variable "shift" is 1 (YES), U-phase and V-phase currents are detected at the first and second detection timing points (S127). On the other hand, when the variable "shift" is not 1 (NO), it is determined whether or not the pattern (1) is used (S128). When the pattern (1) is used (YES), V-phase and U-phase currents are detected at the first and second detection timing points (S129). On the other hand, when the pattern (1) is not used (NO), V-phase and W-phase currents are detected at the first and second detection timing points (S130).

Figure 18:
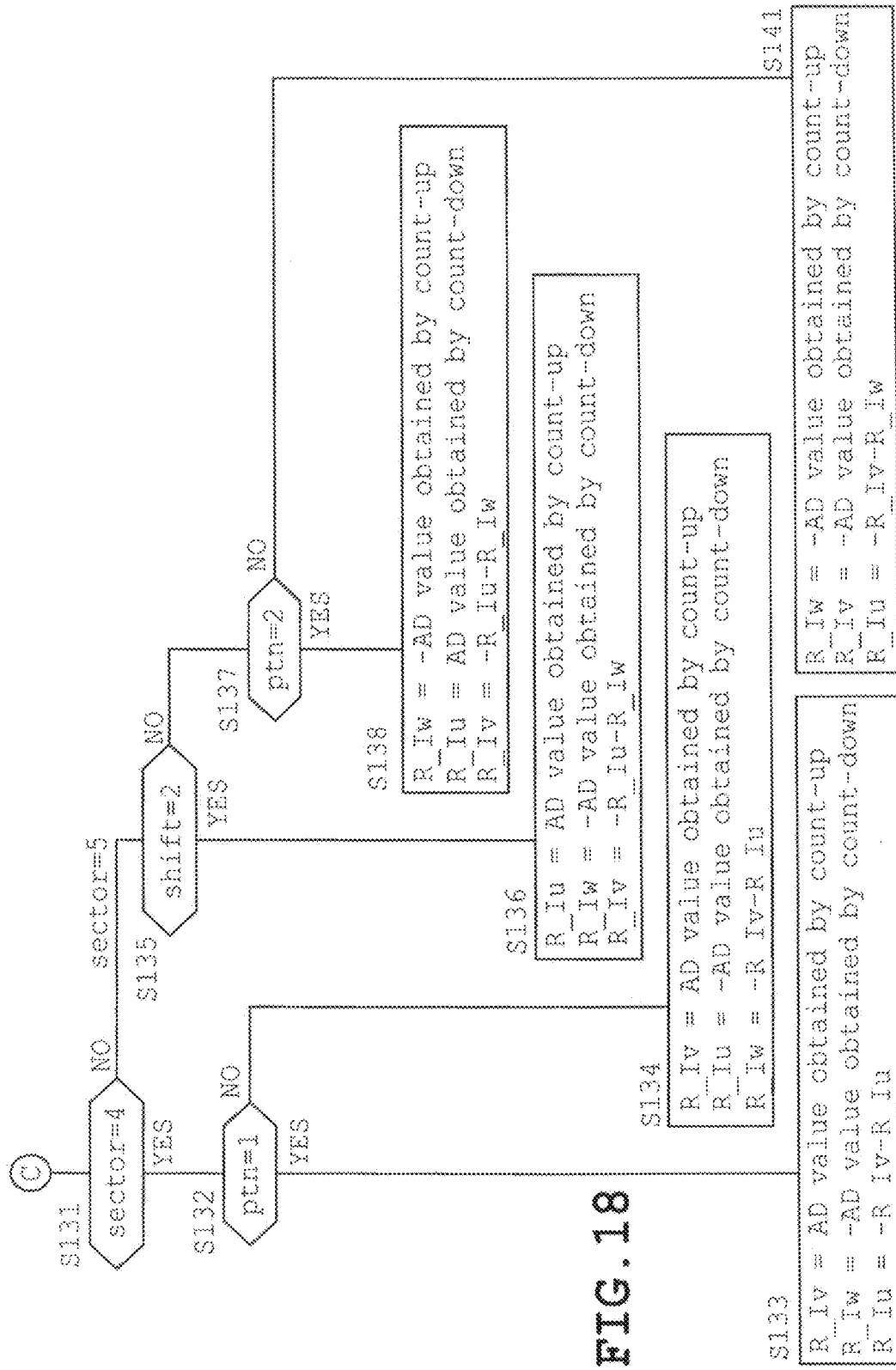
FIG. 18 is a flowchart showing contents of processing at step S3 in FIG. 3 (No. 3)
Figure 19A:
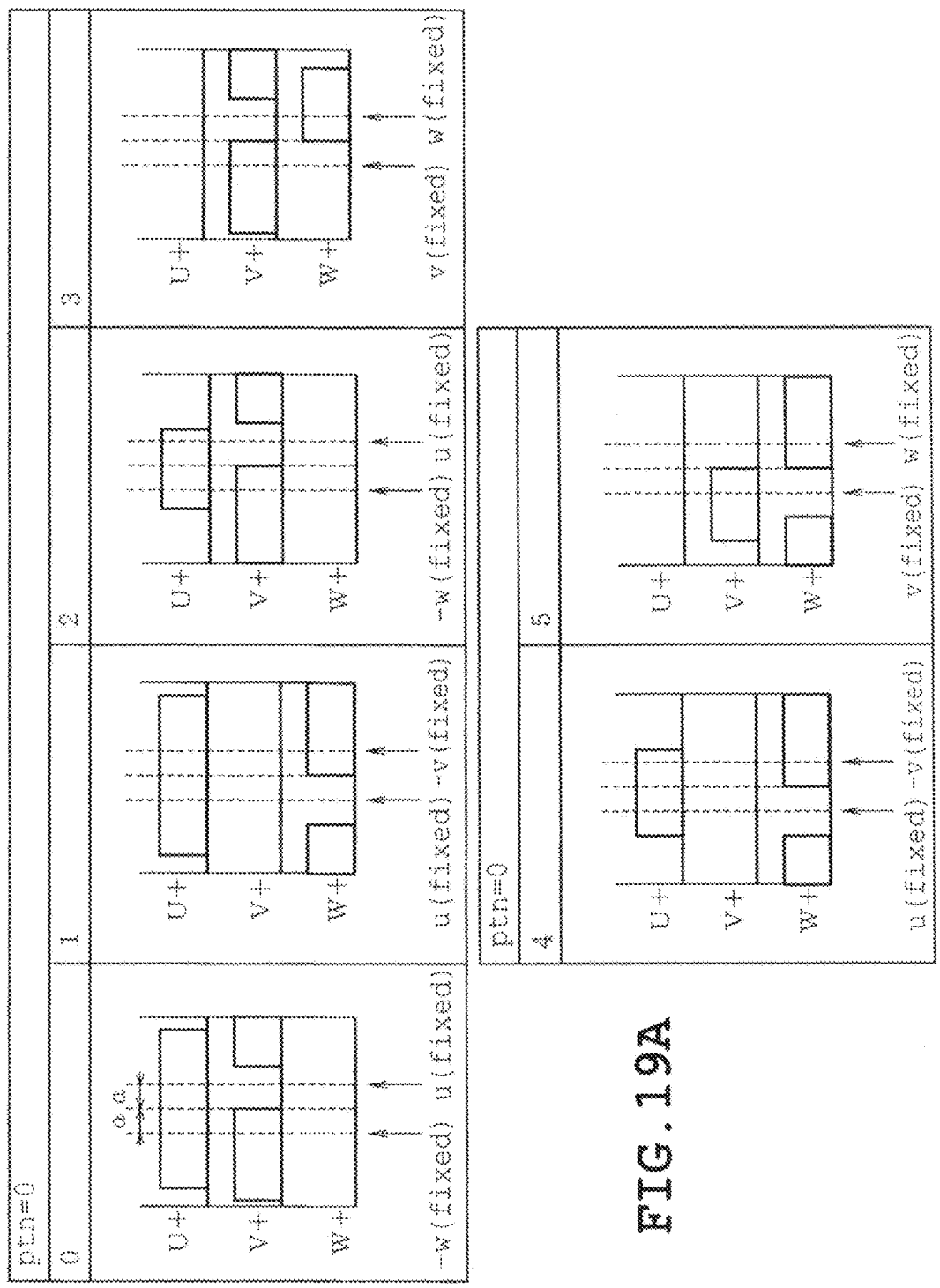
FIGS. 19A and 19B are two-phase modulation PWM signals corresponding to combination of pattern and sector and first and second current detection timings, and PWM signal waveforms in an actual control state and the corresponding combination of pattern and sector, respectively (No. 1)
Figure 19B:
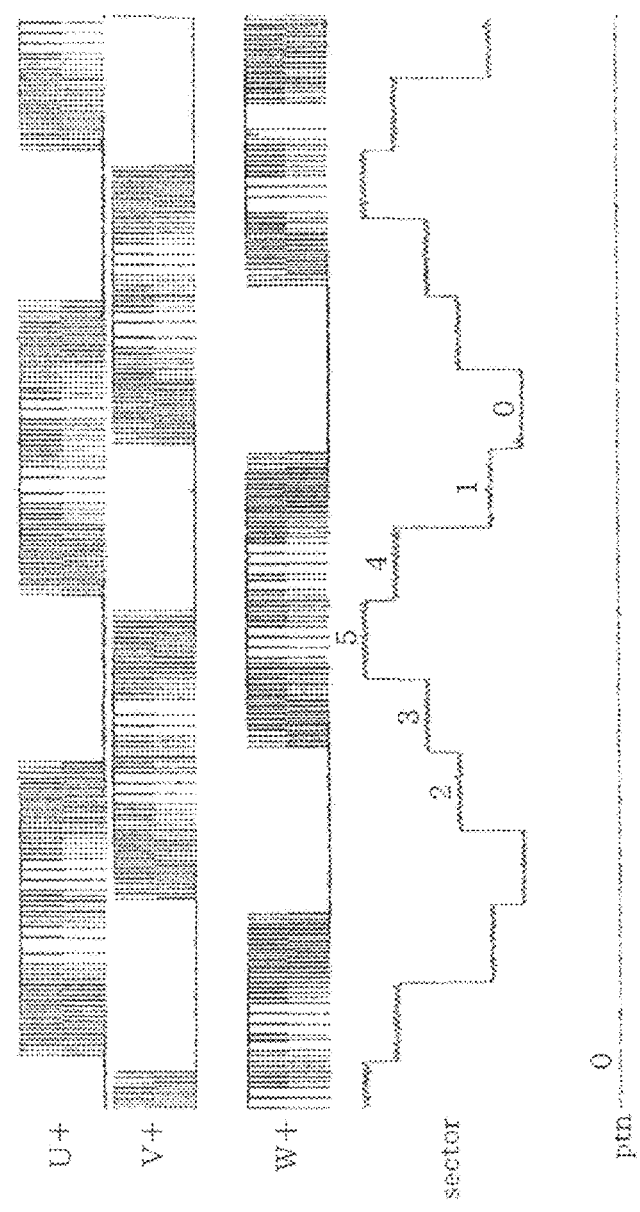

On the other hand, when it is determined at step S125 that the sector (3) is not used (NO), it is determined whether or not the combination includes sector (4) (S131) and whether or not the combination includes pattern (1) (S132), as shown in FIG. 18. When the combination includes sector (4) and pattern (1) (YES at step S132), W-phase and V-phase currents are detected at the first and second detection timing points (S133). Further, when the combination does not include pattern (1) (NO at step 132), U-phase and V-phase currents are detected at the first and second detection timing points (S134).

Further, when the combination does not include sector (4) (NO at step S131), the combination includes sector (5). In this case, it is determined whether or not variable "shift" is 2 (S135). When the variable "shift" is 2 (YES), W-phase and U-phase currents are detected at the first and second detection timing points (S136). When it is determined at step S135 that variable "shift" is not 2 (NO), it is determined at step S137 whether or not the combination includes pattern (2). When it is determined that the combination includes pattern (2) (YES at step S137), U-phase and W-phase currents are detected at the first and second detection timing points (S138). When it is determined that the combination does not include pattern (2) (NO at step S137), V-phase and W-phase currents are detected at the first and second detection timing points (S141).

FIGS. 19 to 23 show how the first and second detection timing points are finally determined according to the above-described combination of pattern and sector. FIG. 19A shows combinations including pattern (0) and all sectors (0) to (5). FIG. 19B shows actual two-phase modulated PWM signal waveforms and corresponding combinations of patterns and sectors. Although the phase to be detected differs depending upon the sector, the first and second detection timing points are fixed (both down-count and up-count are α).

Figure 20A:
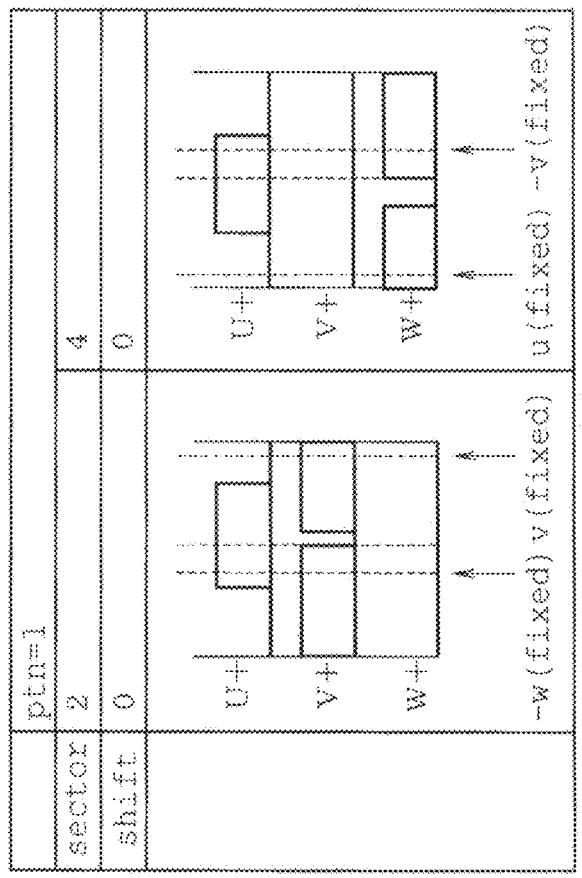
FIGS. 20A and 20B are similar to FIGS. 19A and 19B respectively (No. 2)
Figure 20B:
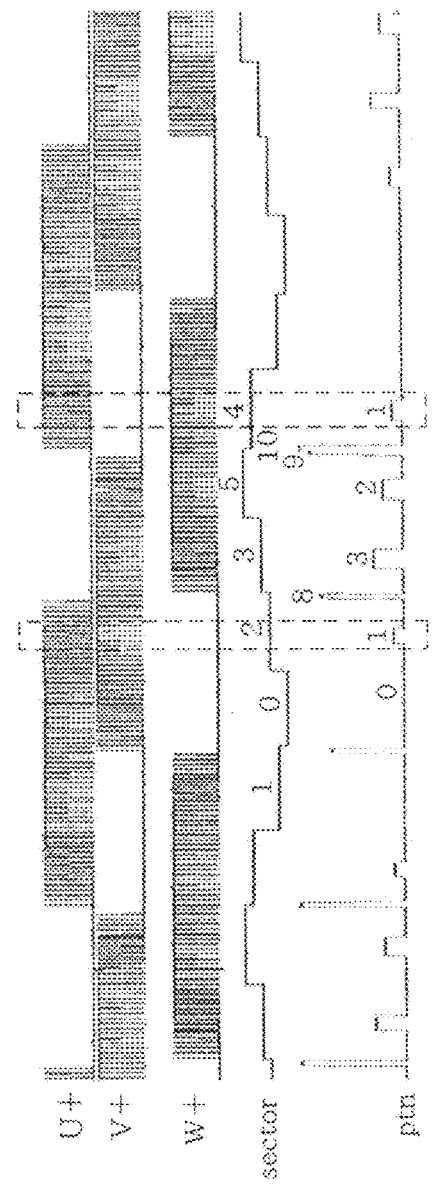

FIGS. 20A and 20B show combinations including pattern (1) and sectors (2) and (4). In these cases, first and second detection timing points are also fixed. However, one of the timing points is a and the other is (PWM_MAX−α).

Figures 21A, 21B:
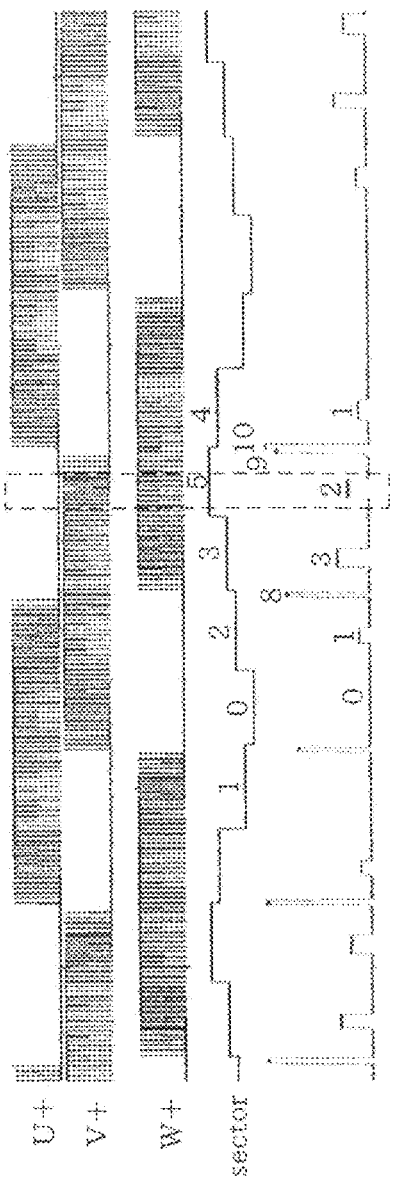
FIGS. 21A and 21B are similar to FIGS. 19A and 19B respectively (No. 3)

FIGS. 21A and 21B show combinations of pattern (2) and sector (5). Three cases arise depending upon whether or not "W0_bai" exceeds "PWM_MAX×2" and whether or not "shift" (2) is set. When "W0_bai" exceeds "PWM_MAX×2," both first and second detection timing points are fixed. When "W0_bai" does not exceed "PWM_MAX×2," the first detection timing point is variable. In this case, when "shift" (2) is set, the V-phase duty increase/decrease direction is rendered identical with the W-phase duty increase/decrease direction. As a result, the phases to be detected are changed from U-phase and W-phase to W-phase and U-phase.

Figures 22A, 22B:
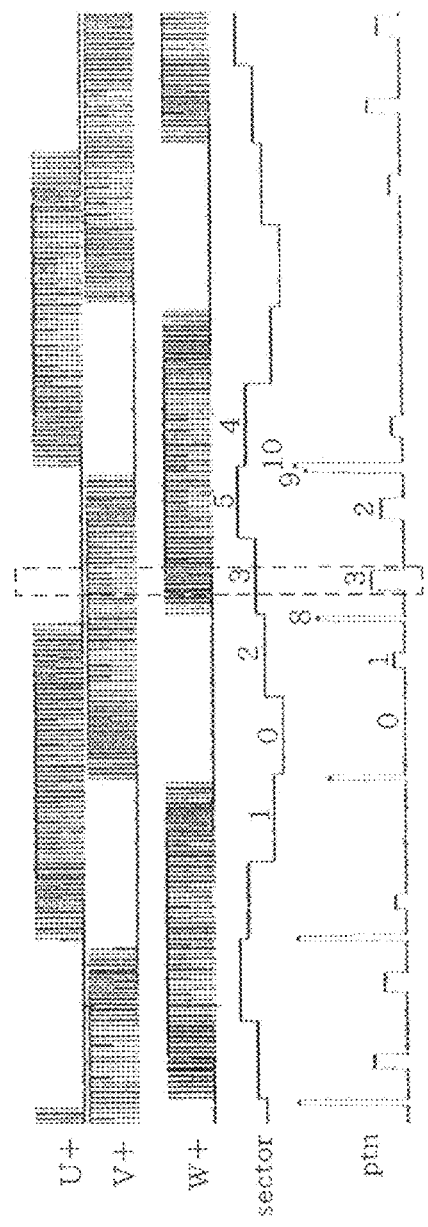
FIGS. 22A and 22B are similar to FIGS. 19A and 19B respectively (No. 4)
Figure 23:
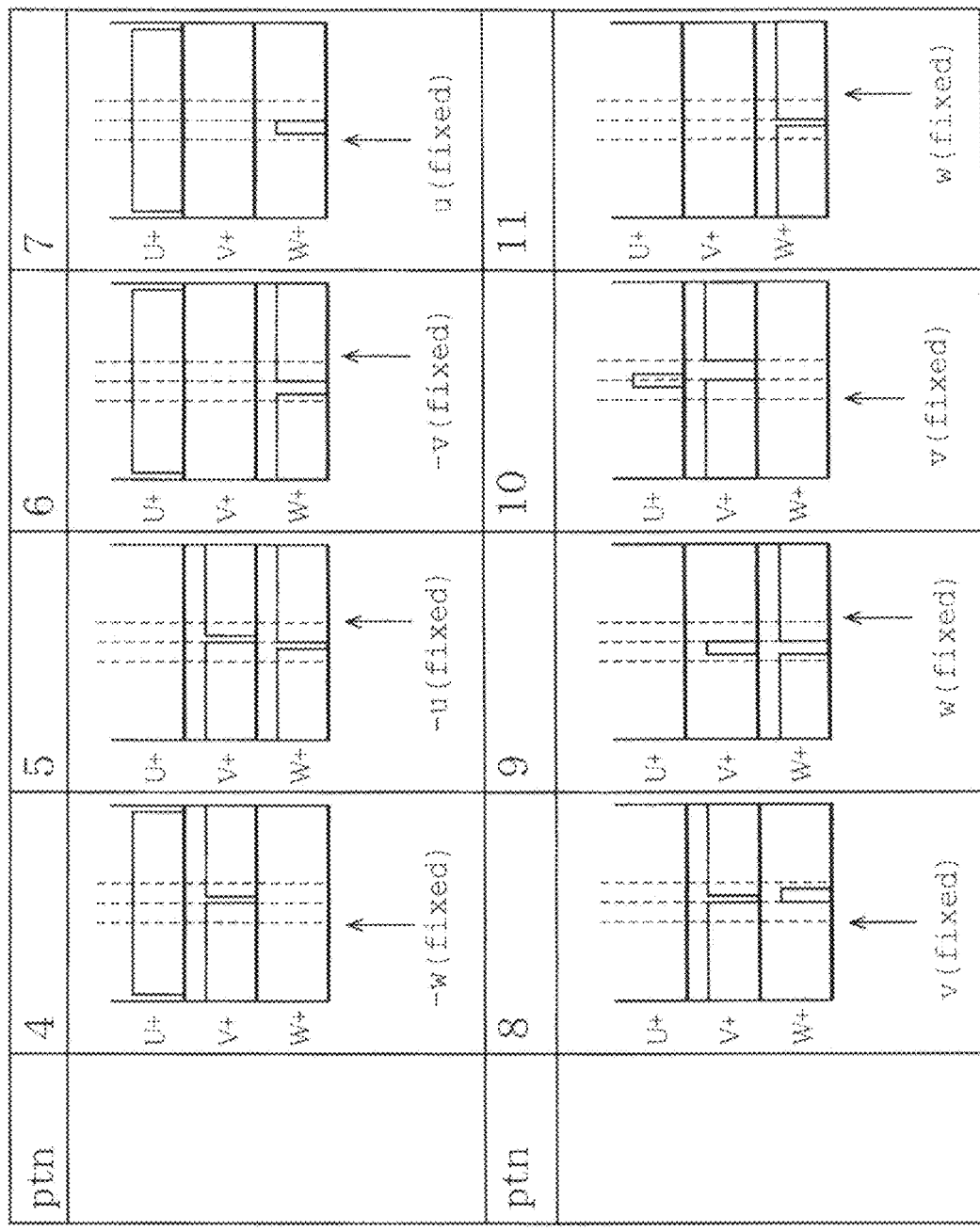
FIG. 23 is similar to FIG. 19A, showing patterns 4 to 11.

FIGS. 22A and 22B show combinations of pattern (3) and sector (3). Three cases arise depending upon whether or not "V0_bai" exceeds "PWM_MAX×2" and whether or not "shift" (1) is set. When "V0_bai" exceeds "PWM_MAX×2," both first and second detection timing points are fixed. When "V0_bai" does not exceed "PWM_MAX×2," the second detection timing point is variable. In this case, when "shift" (1) is set, the W-phase duty increase/decrease direction is rendered identical with the V-phase duty increase/decrease direction. As a result, the phases to be detected are changed from V-phase and U-phase to U-phase and V-phase. FIG. 23 shows patterns (4) to (11) and corresponds to FIGS. 16A and 16B.

FIGS. 24A and 24B show examples of characteristic changes of the detection timing points in the case of pattern (2) or (3) respectively. As shown in FIG. 24A, V-phase and W-phase duty pulses are output without overlapping. A period in which V-phase and W-phase duty pulses overlap takes place in a first half of carrier period when W-phase duty exceeds 96% while V-phase and W-phase currents are being detected at the first and second detection timing points. In this case, the phase of the current detected at the first detection timing point is changed to U-phase (−).

When V-phase or W-phase duty is decreased in the above-mentioned state and the first detection timing point is still fixed, there is a possibility that V-phase and W-phase currents may deviate from the overlapping period with the result that U-phase current may become undetectable. In view of this, the first detection timing point is rendered variable so that U-phase current is continuously detected within the overlapping period of the V-phase and W-phase duty pulses.

FIG. 24B shows a case where V-phase duty exceeds 96% and a period in which V-phase and W-phase duty pulses overlap takes place in a latter half of the carrier period. In this case, the phase of the current detected at the second detection timing point is changed to U-phase (−). When V-phase or W-phase duty is decreased in the above-mentioned state and the first detection timing point is still fixed, there is a possibility that V-phase and W-phase currents may deviate from the overlapping period with the result that U-phase current may become undetectable. In view of this, the second detection timing is rendered variable so that U-phase current is continuously detected within the overlapping period of the V-phase and W-phase duty pulses.

Figure 25A:
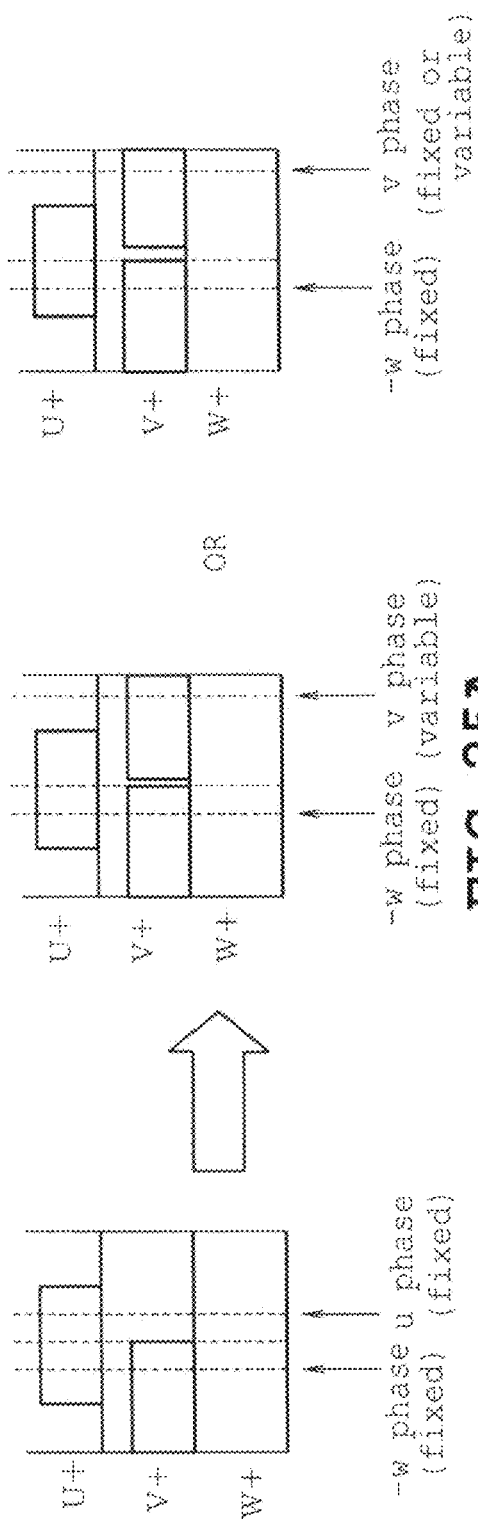
FIGS. 25A and 25B show examples of modifications of detection timings in pattern (1)
Figure 25B:
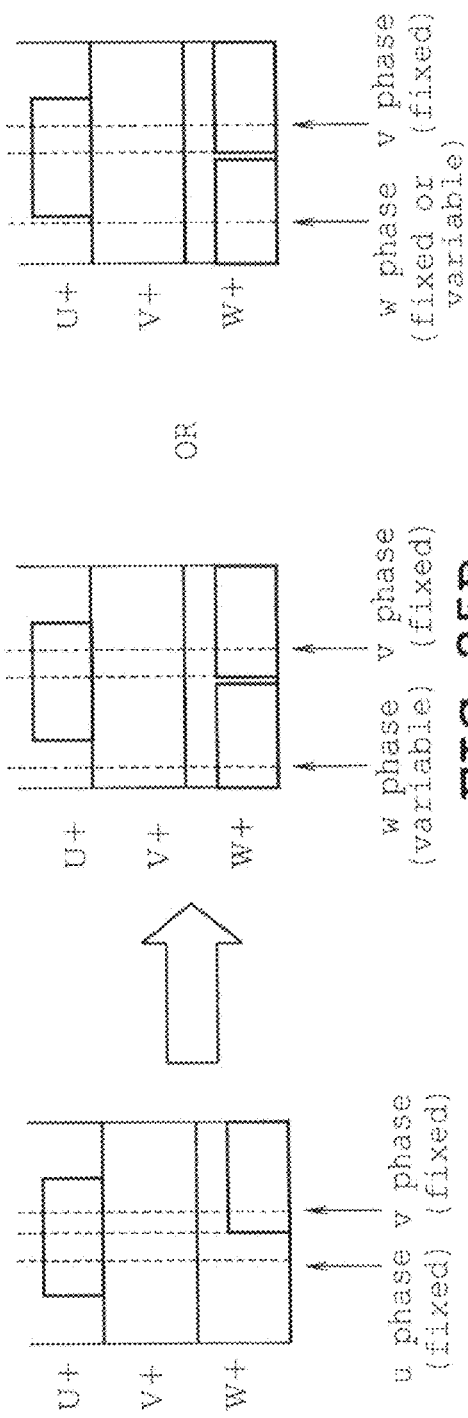
Figures 28A, 28B:
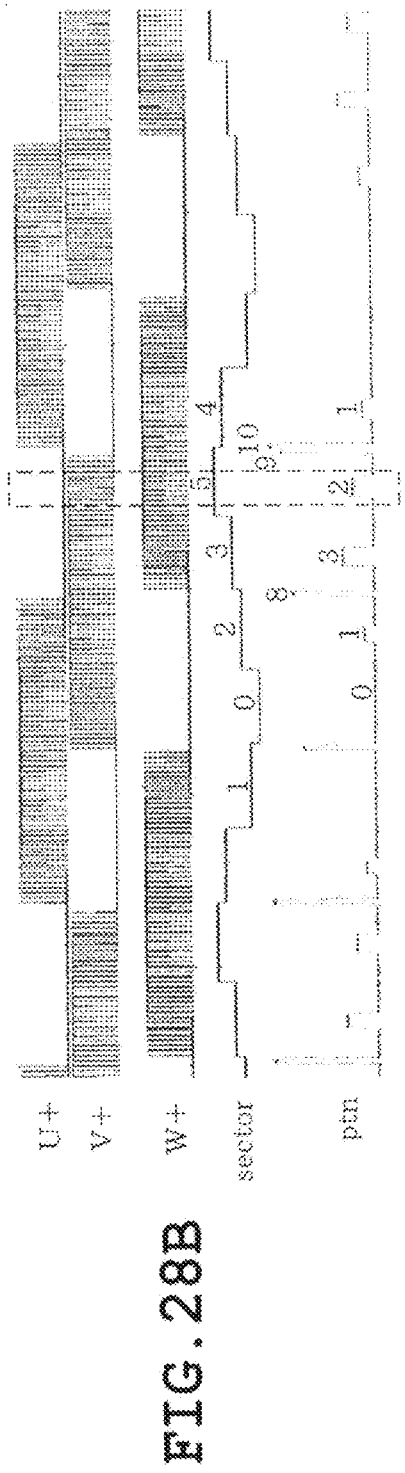
FIGS. 28A and 28B are views similar to FIGS. 21A and 21B respectively.
Figures 29A, 29B:
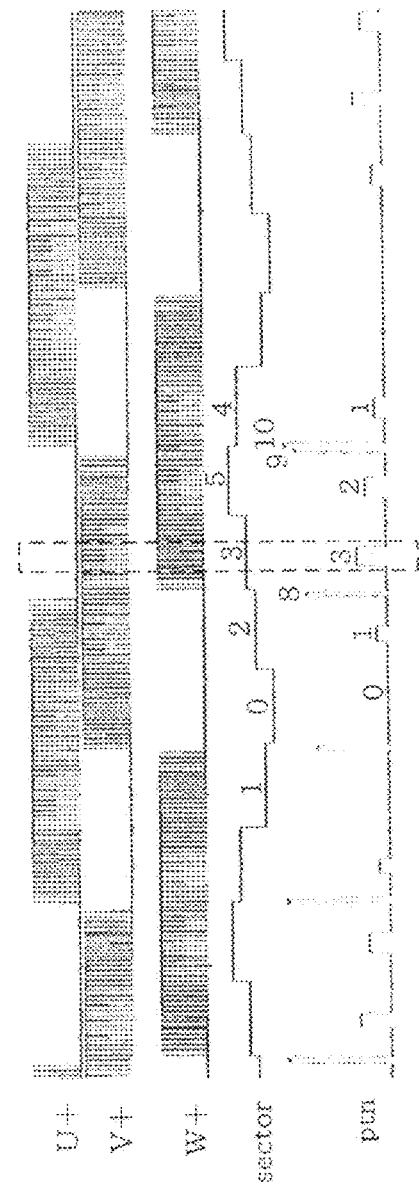
FIGS. 29A and 29B are views similar to FIGS. 22A and 22B respectively.

FIGS. 25A and 25B show examples of characteristic changes of the detection timing points in the case of pattern (1). As shown in FIG. 25A, a period in which U-phase and V-phase duty pulses overlap takes place only in a first half of carrier period while W-phase current (−) and U-phase current are being detected at the first and second detection timing points. In this case, when the V-phase duty exceeds 96%, an overlapping period also takes place in the latter half of the carrier period. As a result, W-phase current (−) is also detected at the second detection timing point. Accordingly, the second detection timing point is changed so that V-phase current is detected in the period in which only the V-phase duty pulses are generated. In order that this detection state may be maintained, the timing point changed from the second detection timing is fixed (however, the timing may be variable depending upon changes in the V-phase duty).

FIG. 25B shows a case where W-phase duty exceeds 96% and a period in which U-phase and W-phase duty pulses overlap takes place in a first half of the carrier period. In this case, the first detection timing point is changed so that W-phase current is detected in the period in which only the W-phase duty pulses are generated. In order that this detection state may be maintained, the timing point changed from the first detection timing point is fixed (however, the timing point may be variable depending upon changes in the W-phase duty).

FIGS. 26A and 26B show (A) a waveform of motor current detected by the manner of the embodiment and (B) a waveform of motor current detected by a manner disclosed in Japanese Patent No. 5178799 in the case where a modulation factor is approximately 1.0. As understood from the figures, since a current detection rate is improved more in the embodiment, the current waveform has less distortion and is more approximate to a sinusoidal wave.

According to the above-described embodiment, the current detecting section 27 detects phase currents Iu, Iv and Iw of the motor 4 based on the PWM signal pattern and the signals generated according to the current value by the shunt resistance 24 connected to the DC side of the inverter circuit 23. The vector control section 30 determines the rotor position 9 based on the phase currents and generates, together with the PWM signal generating section 32, generates the PWM signal pattern of two of three phases so that the PWM signal pattern follows the rotor position θ. In this case, regarding the U-phase of the three-phase PWM signal pattern, the PWM signal generating section 32 increases/decreases the duty in both directions of phase lag side and phase lead side on the basis of the bottom of carrier period. Regarding the V-phase, the PWM signal generating section 32 increases/decreases the duty in one of the directions of phase lag side and phase lead side on the basis of the bottom of carrier period. Regarding the W-phase, the PWM signal generating section 32 increases/decreases the duty in the direction opposite to the direction regarding the V-phase.

The current detection timing point adjusting section 34 detects current by the use of the fixed timing regarding one of phases in two-phase modulation. Regarding the other phase, the current detection timing point adjusting section 34 detects current at the fixed timing point or adjusts the detection timing point so that current is detectable at a variable timing point according to the magnitude of output voltage supplied to the inverter circuit 23. Accordingly, the current detection rate can also be improved in a region where an output voltage is high and which easily becomes overmodulated, with the result that the control accuracy can be improved while switching loss is reduced.

Further, the current detection timing point adjusting section 34 determines whether or not the predetermined fixed timing point or the timing point obtained by changing the fixed timing point is used for current detection regarding the aforesaid other phase, according to the two-phase PWM signal pattern. More specifically, the current detecting section 27 determines current-detectable minimum duty as the minimum width and further determines the maximum width and the intermediate width based on the minimum width. The current detecting section 27 further divides the two-phase PWM signal output pattern into patterns (0) to (11) of combinations of three-phase duties each of which corresponds to any one of the aforementioned widths and further divides into sectors (0) to (5) depending upon magnitude relationship of three-phase duties. The current detection timing point adjusting section 34 determines whether or not the predetermined fixing timing point or the changed timing point is used for current detection regarding the aforesaid other phase, according to the combination of one of patterns (0) to (11) and one of sectors (0) to (5).

Consequently, whether or not the other current detection timing point is rendered variable can be appropriately determined according to each combination of PWM signals in two-phase modulation. Further, even when only a single phase current can be substantially detected in the overmodulated state in which the output voltage is excessively high, the current detection can reliably be carried out and used for motor control as much as possible.

When the period in which V-phase or W-phase duty pulses overlap fluctuates after one of the phases to be detected has been changed to the U-phase, the current detection timing point adjusting section 34 changes the current detection timing point within a range allowing the detection of U-phase. As a result, the changed phase to be detected is maintained with the result that re-change of the phase at many times can be prevented as much as possible.

When two phases regarding which duty pulses are being output within the carrier period are the U-phase and the V- or W-phase and the state in which U phase and V or W phase currents detected by the use of the fixed timing points is changed to the state in which U-phase cannot be detected, the current detection timing point adjusting section 34 renders the timing point for current detection variable regarding the other phase and changes the one of the phases to be detected from U-phase to V-phase or W-phase. Accordingly, in this case, too, the two-phase current can reliably be detected. After having changed the current detection timing once regarding the other phase, the current detection timing point adjusting section 34 fixes the changed timing point to detect V-phase or W-phase current. In this case, too, the target phase after the timing point change is maintained with the result that re-change of the phase at many times can be prevented as much as possible.

Further, the current detection timing point adjusting section 34 changes the duty increase/decrease direction of the phase having a smaller duty into the same direction as the other phase when two phases regarding which duty pulses are being output within the carrier period are the V-phase and the W-phase and duty of one of the phases is decreased with the result two-phase currents are undetectable. As a result, a period in which two-phase duty pulses overlap takes place, whereupon the two-phase currents become detectable.

The air conditioner E includes the heat pump system 1 further including the compressor 2, the outdoor heat exchanger 9, the decompressor 8 and the inside heat exchanger 7. Since the motor 4 constructing the compressor 2 is an object to be controlled, operating efficiencies of the heat pump system 1 and the air conditioner E can be improved.

FIGS. 27A to 33 illustrate a second embodiment. Identical or similar parts in the second embodiment are labeled by the same reference symbols as those in the first embodiment, and the description of these parts will be eliminated. Only the differences between the first and second embodiments will be described in the following. In the first embodiment, for example, as shown in FIGS. 22A and 22B, when variable "shift" becomes "1" in the combination of pattern (3) and sector (3), the W-phase duty increase/decrease direction is changed to the same direction as the V-phase. Different measures are taken for the same case in the second embodiment.

More specifically, U-phase duty pulses are also output as shown in FIG. 27A. V-phase and W-phase duty pulses are increased by the duty pulses, so that the two-phase modulation is temporarily changed to a three-phase modulated state. Since interphase voltages among the U-phase, V-phase and W-phase do not change in this case, output voltage does not change. Further, the first current detection timing point is also rendered variable in this case. As a result, the current detection rate can be improved without change in the phase to be detected at the second detection timing point.

FIG. 27B shows a case corresponding to the case where the combination includes pattern (2) and sector (5) and variable "shift" is "2" as shown in FIGS. 20A and 20B in the first embodiment. In this case, too, U-phase duty pulses are also output, and V-phase and W-phase duty pulses are increased by the duty pulses, so that the two-phase modulation is temporarily changed to a three-phase modulated state. FIGS. 28A to 29B corresponding to FIGS. 21A to 22B in the first embodiment show lists including these processing patterns.

Figure 12:
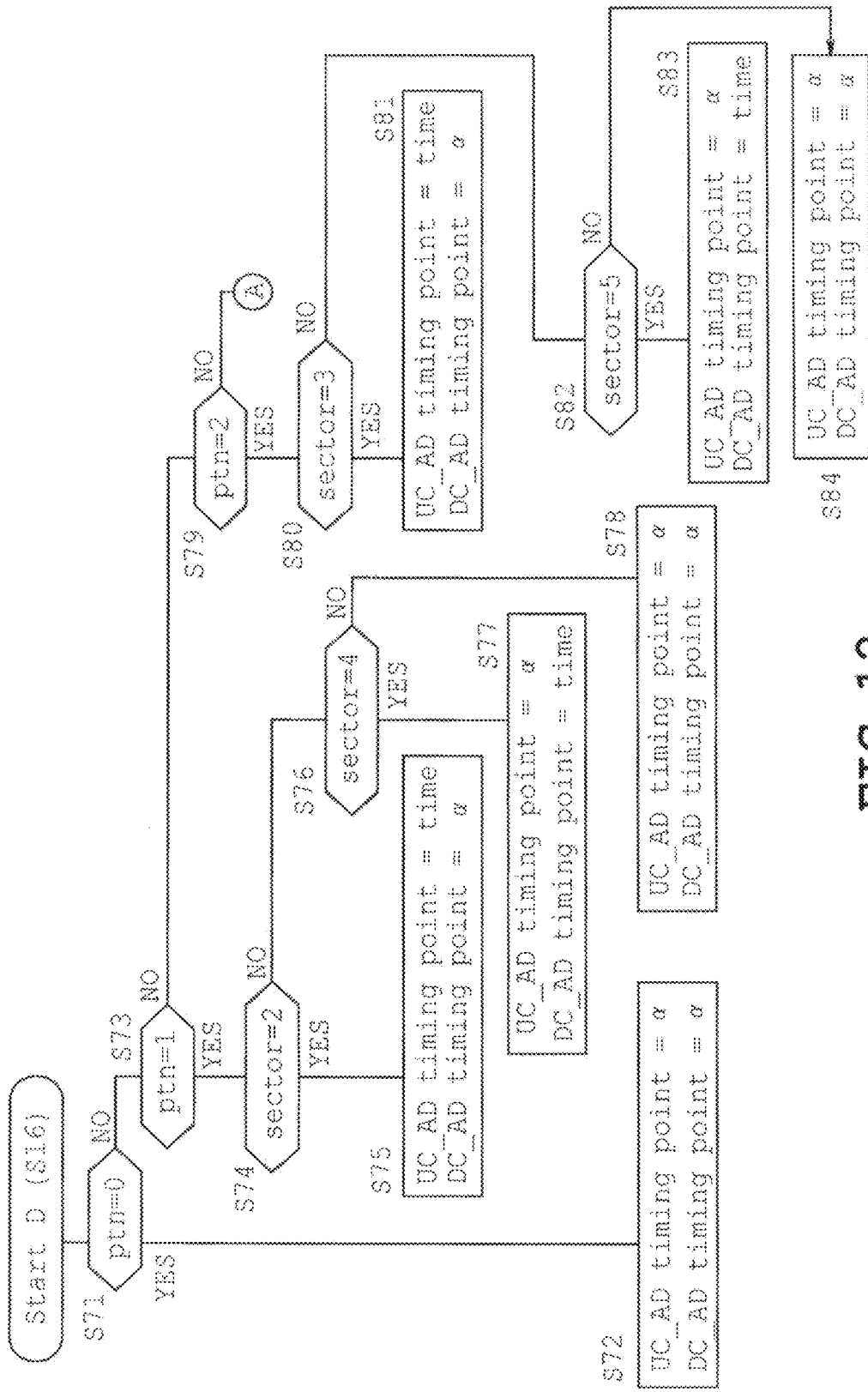
FIG. 12 is a flowchart showing contents of processing at step S16 (No. 1)
Figure 30:
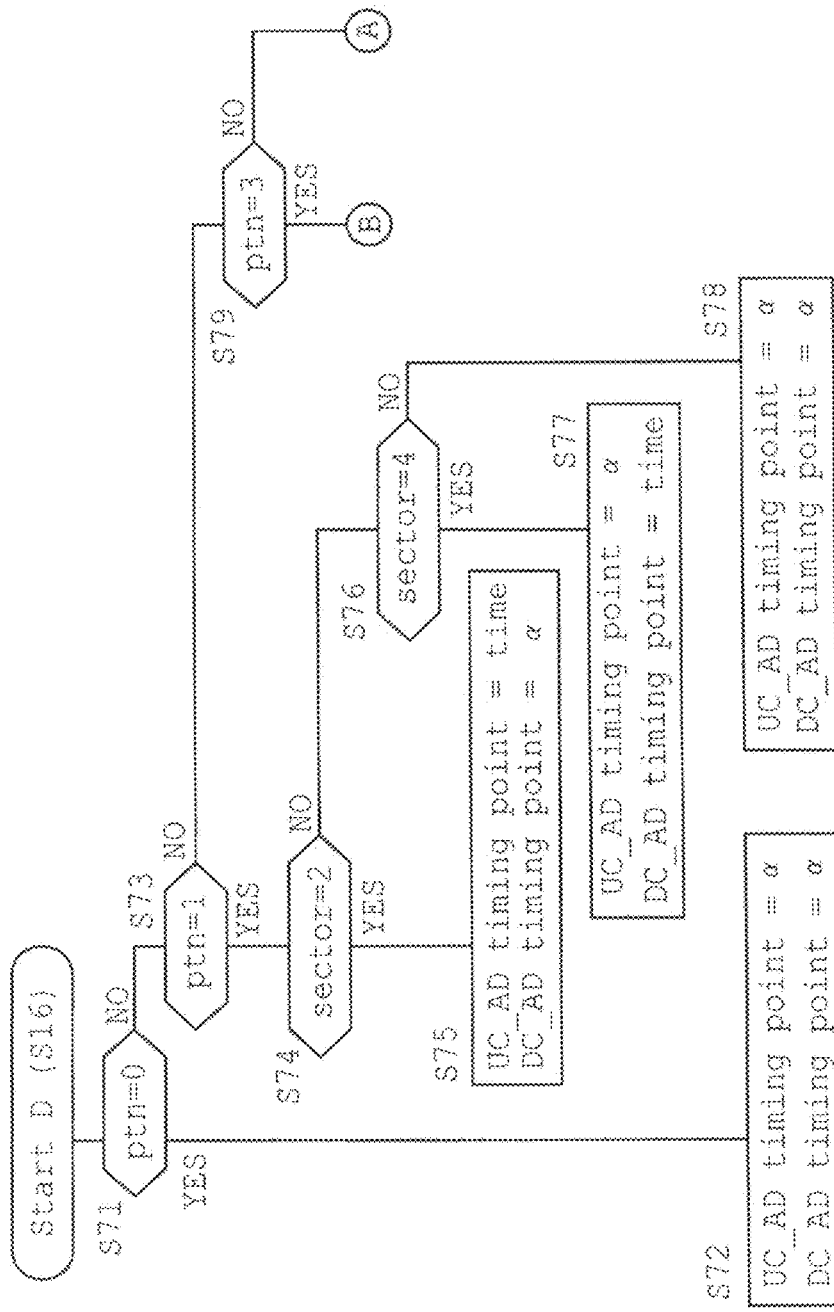
FIG. 30 is a flowchart similar to FIG. 12 (No. 1)
Figure 31:
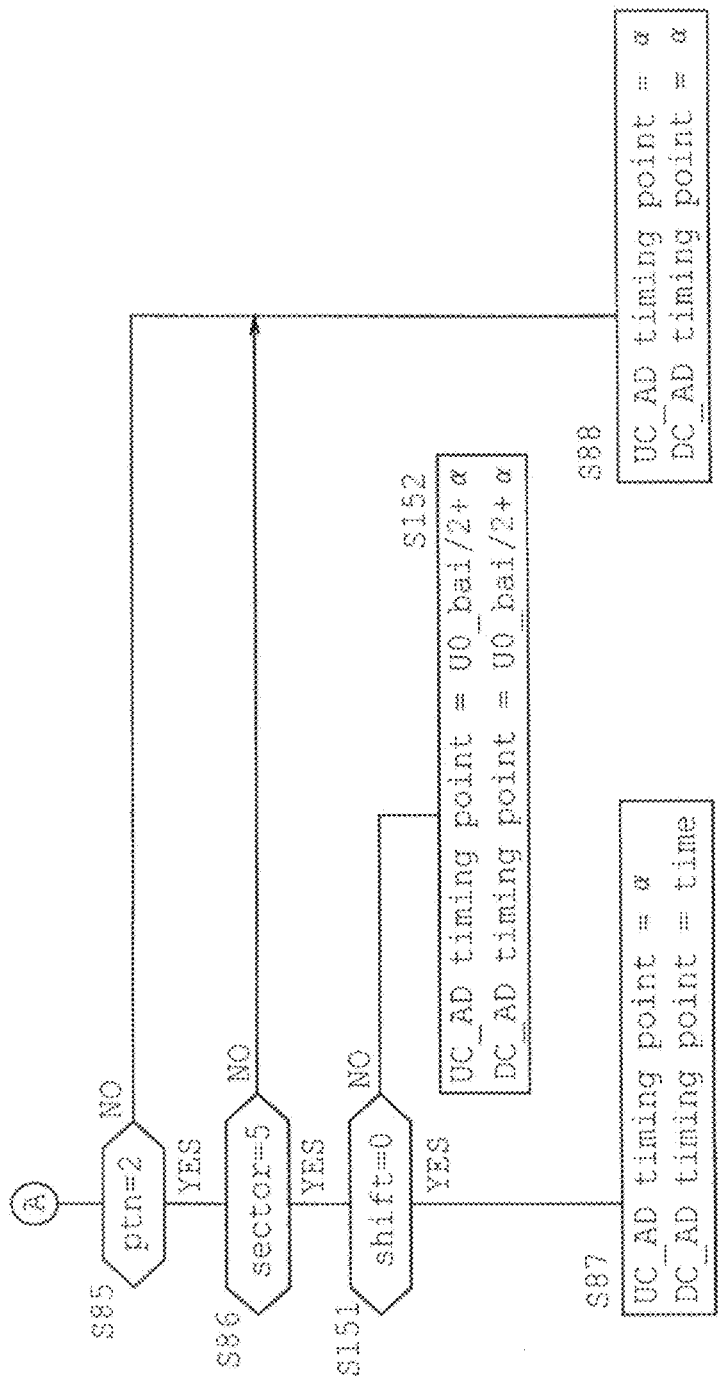
FIG. 31 is a flowchart similar to FIG. 13.

FIGS. 30 and 31 are flowcharts of start D corresponding to FIGS. 12 and 13 in the first embodiment. FIG. 30 shows only steps S71 to S79 in FIG. 12, and processing sequence proceeds to processing in FIG. 32 when determination is made in the affirmative (YES) at step S79. In FIG. 31, when the combination includes pattern (2) and sector (5) (YES at step S86), it is determined whether or not variable "shift" is "0" (S151). When variable "shift" is "0" (YES), processing at step S87 is executed. On the other hand, when variable "shift" is not "0" (NO), the first and second detection timing points are set by adding a to the U-phase duty pulse (S152).

Figure 32:
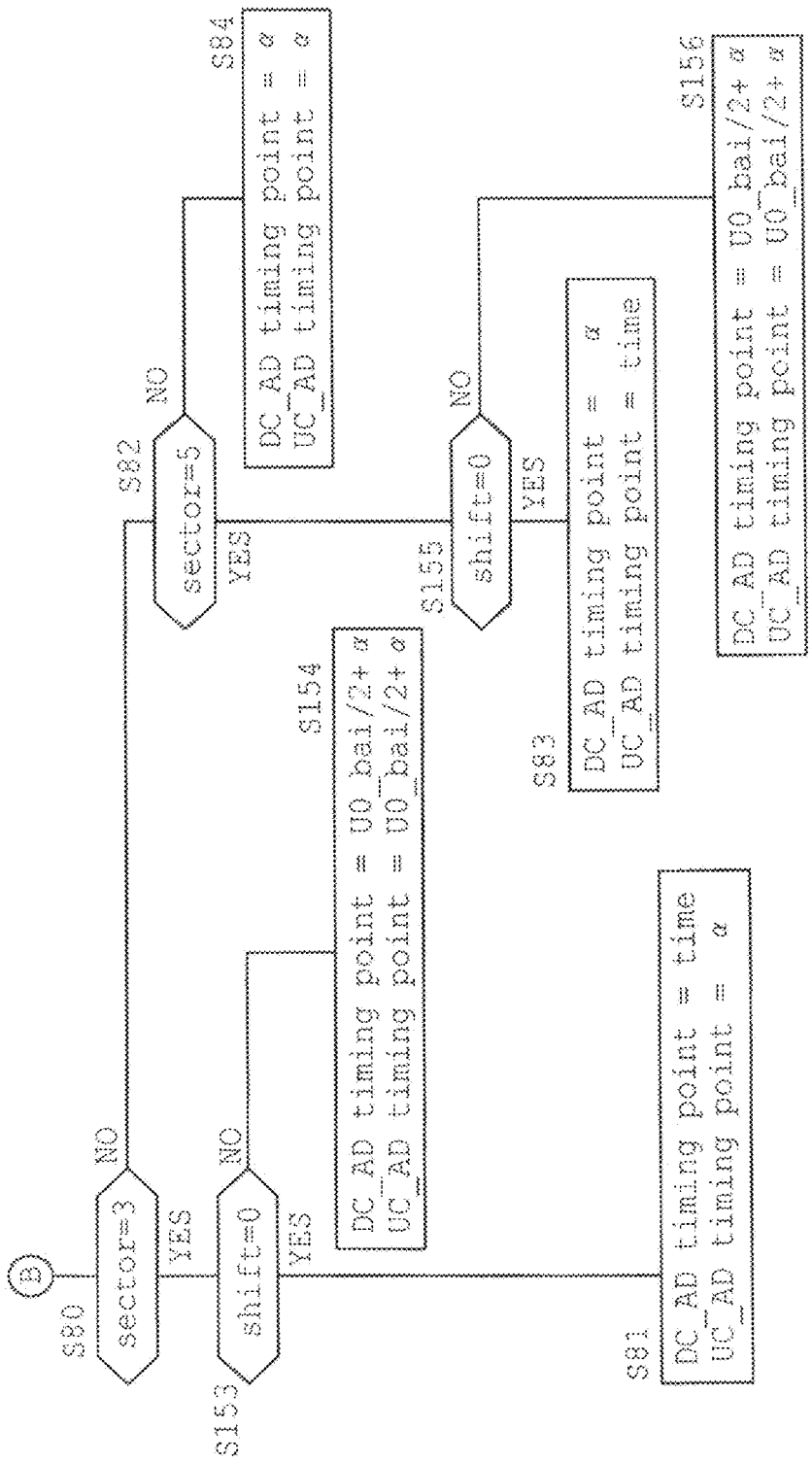
FIG. 32 is a flowchart similar to FIG. 12 (No. 2)
Figure 33:
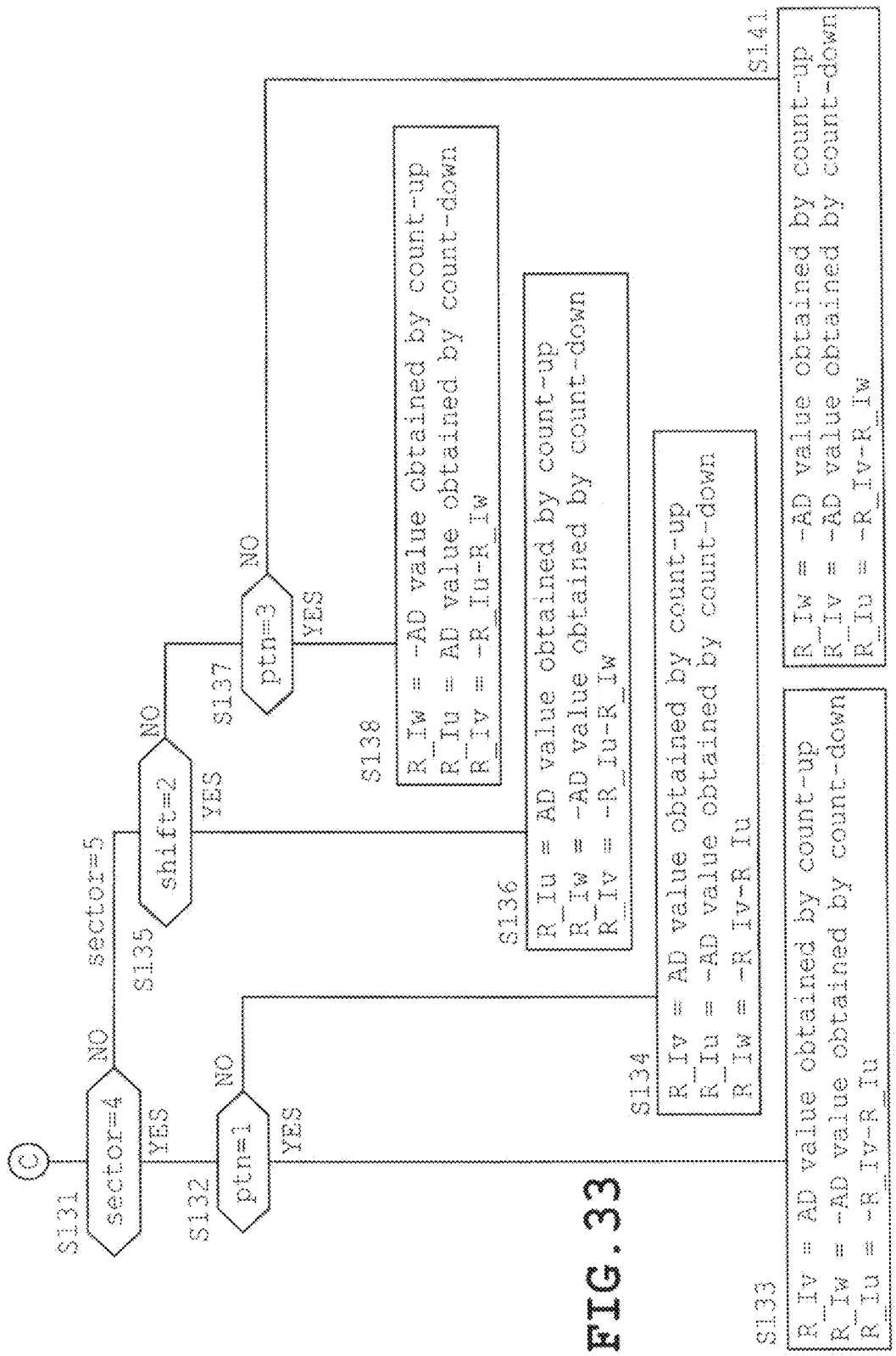
FIG. 33 is a flowchart similar to FIG. 18.
Figure 34:
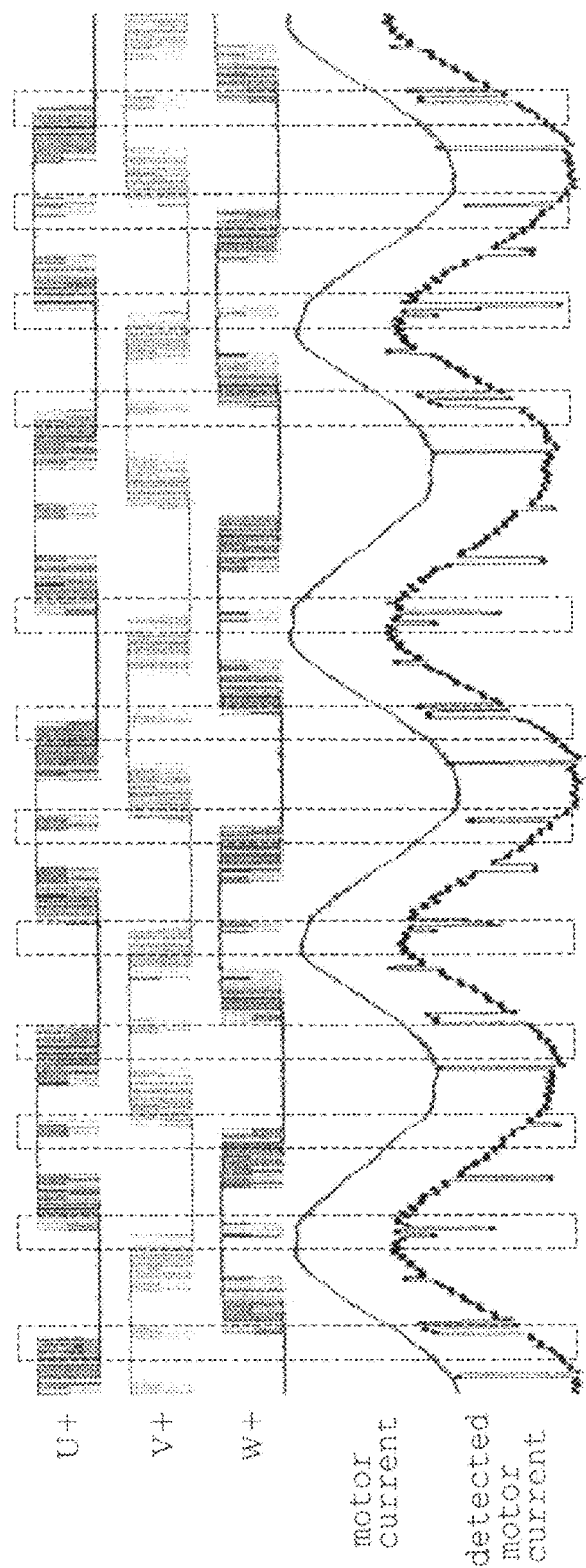
FIG. 34 shows sections in each of which current cannot be detected by the current wave form detected by the first embodiment, showing a third embodiment.

In FIG. 32, when the combination includes pattern (3) and sector (3) (YES at step S80), it is determined whether or not variable "shift" is "0" (S153). When variable "shift" is "0" (YES), processing at step S81 is executed. On the other hand, when variable "shift" is not "0" (NO), the same processing as step S152 is executed (S154). Further, when the combination includes pattern (3) and sector (5) (YES at step S82), too, it is determined whether or not variable "shift" is "0" (S157). When variable "shift" is "0" (YES), processing at step S83 is executed. On the other hand, when variable "shift" is not "0" (NO), the same processing as step S152 is executed (S156). Further, FIG. 33 is a flowchart similar to FIG. 18 and shows part of the processing of start F.

According to the second embodiment, the current detection timing point adjusting section 34 determines the variable timing point to be used for current detection regarding the aforesaid other phase. When two phases regarding which duty pulses are output within the carrier period are the V-phase and the W-phase and duty of one of the phases is decreased with the result two-phase currents are undetectable, a predetermined value of U-phase duty pulse is generated, and the V-phase and W-phase duties are increased by the predetermined value. The current detection timing point adjusting section 34 also determines the variable timing point to be used for current detection regarding the aforesaid one phase. This can improve the current detection rate.

FIGS. 34 to 45 show a third embodiment. In the first and second embodiments, as shown by broken line in FIG. 34, a section takes place in which phase current for only one phase can be detected irrespective of a rotating speed of the motor 4. In view of this section, pulse with minimum pulse which renders two-phase currents detectable is added to the U-phase, V-phase and W-phase PWM pulses so that the two-phase modulation is temporarily changed to a three-phase modulation, as shown in FIGS. 35A and 35B.

Figure 35B:
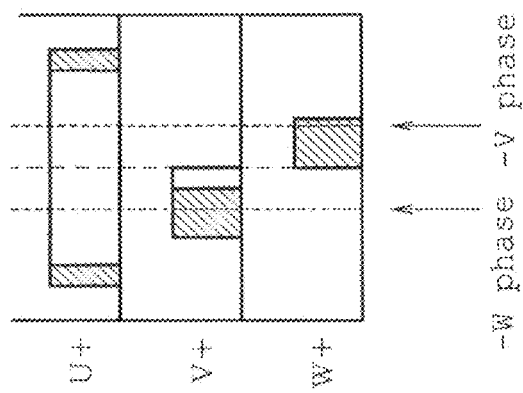
FIGS. 35A and 35B exemplify characteristic PWM signal pattern.
Figure 35A:
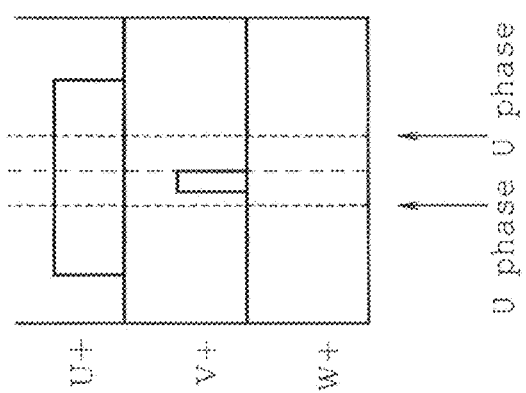

Since the V-phase duty is small in the example as shown in FIGS. 35A and 35B, the U-phase current is detected twice. On the other hand, W-phase pulse with a predetermined duty value is added, and the predetermined duty value is also added to the U-phase and V-phase pulses, whereby the two-phase modulation is changed to the three-phase modulation. As a result, the W-phase and V-phase currents (both negative) are detectable. Since voltage between two of U, V and W phases (interphase voltage) does not change in this case, output voltage to be supplied to the motor 4 remains unchanged with the result that the current detection rate can be improved.

FIGS. 36A and 36B show processing (start A+) carried out after execution of start A as shown in the flowcharts of FIGS. 6A and 6B in the first embodiment. In the processing, two-phase duty pulses are divided into patterns (0) to (5) depending upon the magnitude relationship of respective phase duty pulses in the two-phase modulated PWM signals. The pattern division is based on the following conditions.

In the current detecting section 27, a minimum width refers to a current-detectable minimum duty, and a maximum width refers to a result of subtraction of the minimum width from maximum duty (100%). For example, when the current-detectable minimum time is 10 µs and the carrier frequency is 4 kHz, the minimum width is set to 4% and the maximum width is set to 96%. Further, when duty less than the maximum width and exceeding the minimum width refers to an intermediate width, a two-phase PWM signal output pattern is divided into the following combinations of U-, V- and W-phase duties. U0bai_2, V0bai_2 and W0bai_2 are U-, V- and W-phase duty values in the two-phase modulation, which values are calculated at step S11.

(1) W0bai_2 is less than maximum width or V0bai_2 is less than maximum width and U0bai_2/2, V0bai_2 or W0bai_2 is less than minimum width and equal to or larger than 0;

(2) W0bai_2 is equal to or larger than maximum width or V0bai_2 is equal to or larger than maximum width and one half of U0bai_2/2 is equal to or larger than minimum width, and V0bai_2 is less than minimum width and equal to or larger than 0;

(3) W0bai_2 is equal to or larger than maximum width or V0bai_2 is equal to or larger than maximum width, and U0bai_2/2 is equal to or larger than minimum width and W0bai_2 is less than minimum width and equal to or larger than C;

(4) W0bai_2 or V0bai_2 is equal to or larger than maximum width and U0bai_2/2 is less than minimum width and equal to or larger than 0, and V0bai_2 is larger than W0bai_2;

(5) W0bai_2 or V0bai_2 is equal to or larger than maximum width and U0bai_2/2 is less than minimum width and equal to or larger than 0, and V0bai_2 is smaller than W0bai_2; and (0) any case other than the above-mentioned cases (1) to (5).

Variable ptn_3phs_ch is divided into patterns (0) to (5) according to the above-mentioned conditions.

Figure 37:
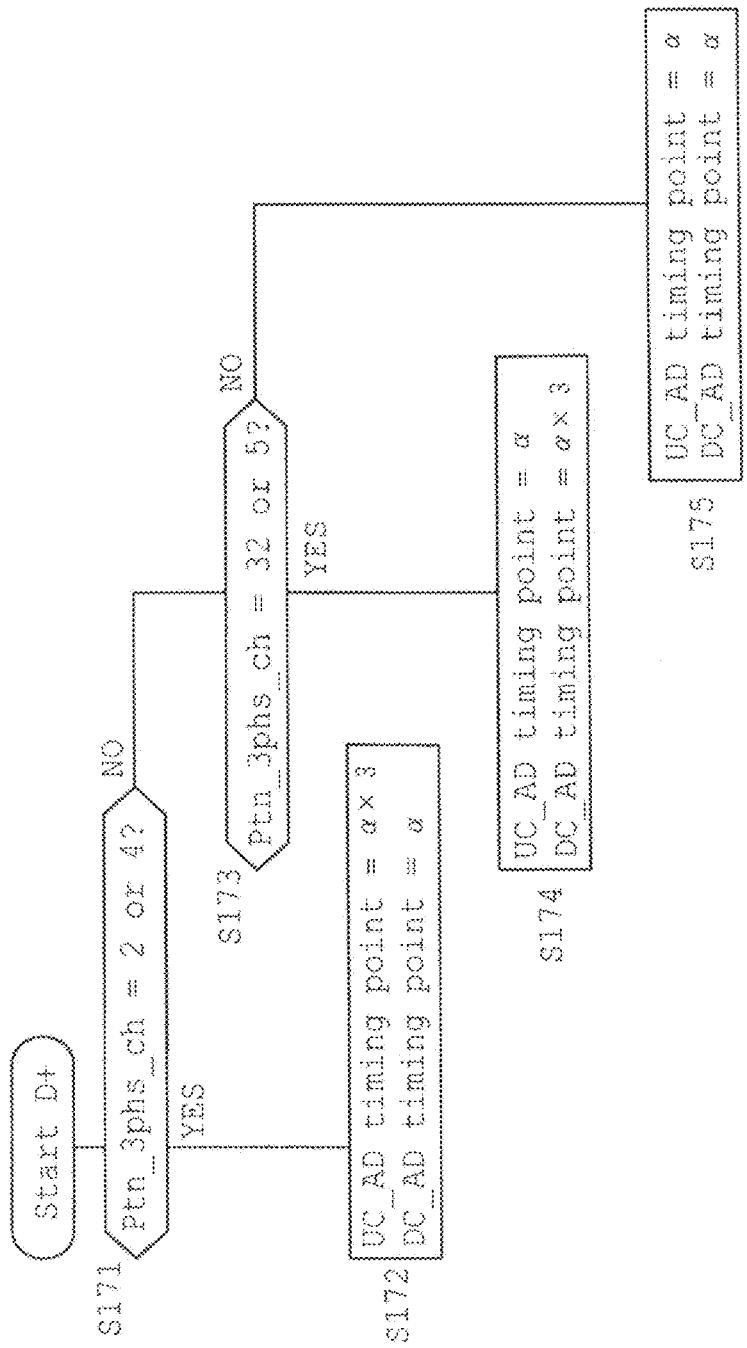
FIG. 37 is a flowchart showing processing executed subsequent to the processing as shown in FIG. 12.

FIG. 37 shows processing (start D+) to be carried out after execution of step S88 in the flowchart of start D as shown in FIGS. 12 and 13. The A/D timing points in down-count and up-count are determined according to variable ptn_3phs_ch. The current detection timing points are set to ($\alpha \times 3$) in the up-count and down-count when variable ptn_3phs_ch is set to each one of patterns (2) to (5) (steps S172 and S174). The reason for this is that current detection is carried out in synchronization with ON of one phase PWM pulses. A scale factor may be another value, for example, twofold. The fixed timing point a is used twice in each of patterns (0) and (1).

Figure 17B:
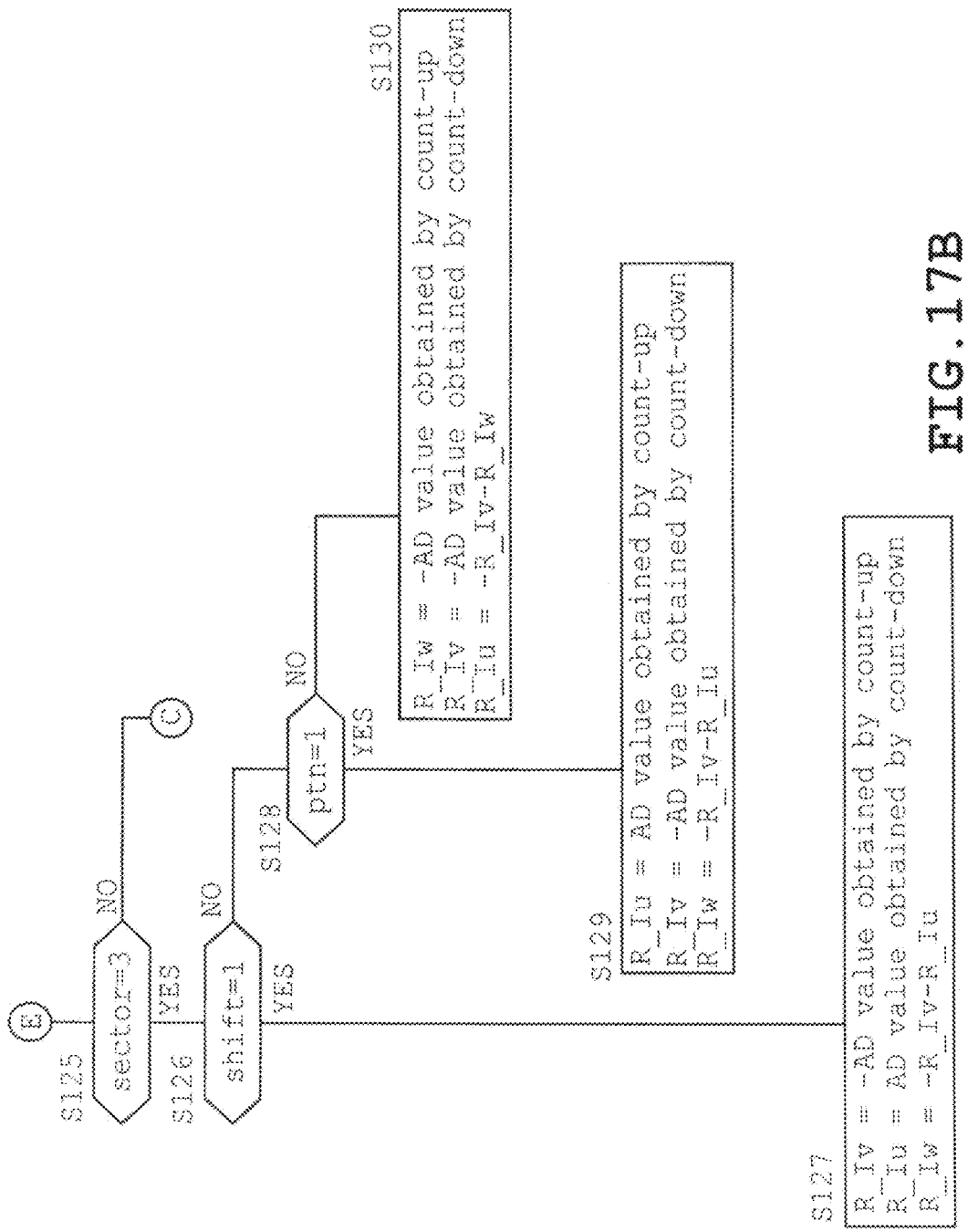
Figure 38:
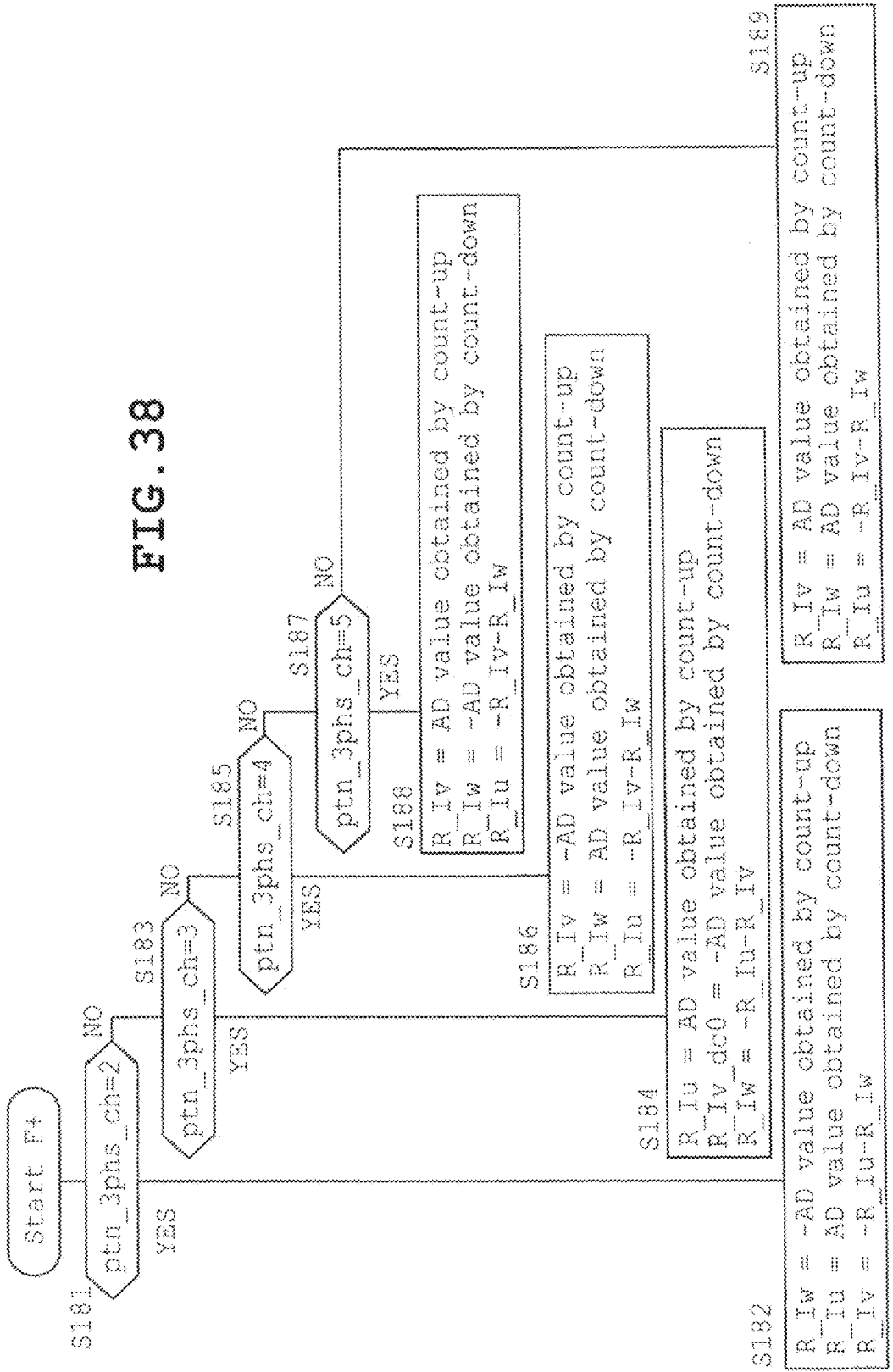
FIG. 38 is a flowchart showing processing executed subsequent to the processing as shown in FIGS. 16A and 16B.

FIG. 38 shows processing (start F+) to be carried out after execution of step S141 in the flowchart of start F as shown in FIGS. 16 to 18. Two phases regarding which currents are detected are determined according to ptn_3phs_ch.

Figure 39:
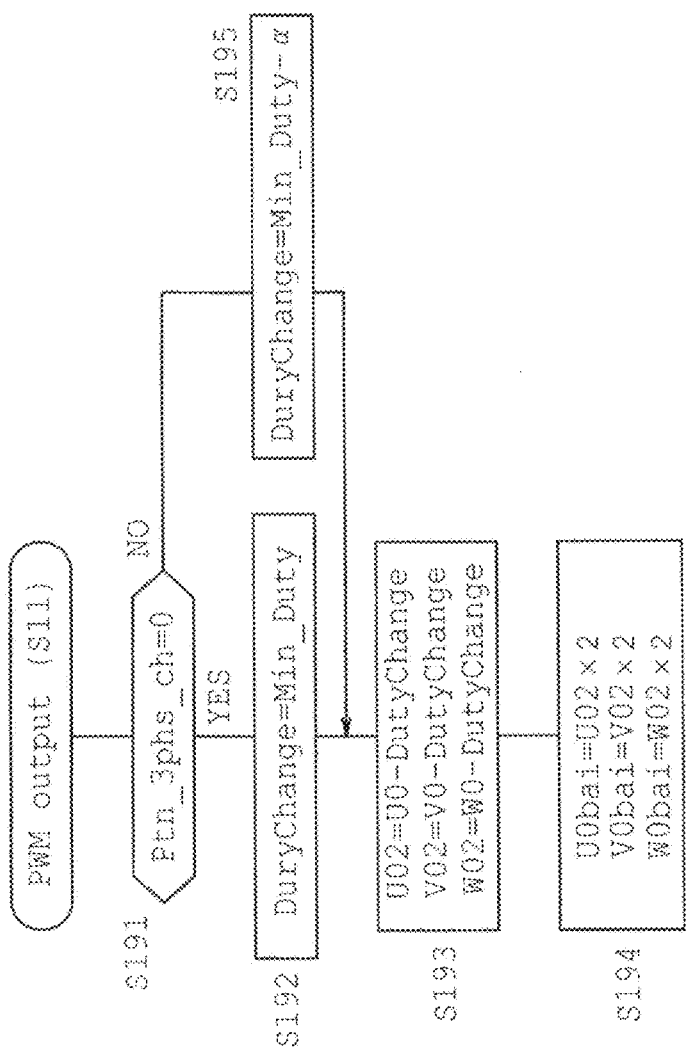
FIG. 39 is a flowchart showing part of the processing at step S11 in FIG. 3.

FIG. 39 is a flowchart showing PWM output corresponding to step S11. In the shown processing, in order that duties U02, V02 and W02 for two-phase modulation may be determined, U-, V- and W-phase minimum duty values Min_Duty are subtracted from the duty values U0, V0 and W0 calculated in the three-phase modulation when ptn_3phs_ch=0 (step S192). On the other hand, when ptn_3phs_ch≠0, a compensated duty value (dutychange) is equalized to Min_Duty−α, so that the two-phase modulation is temporarily changed to the three-phase modulation (step S195).

Figure 40A:
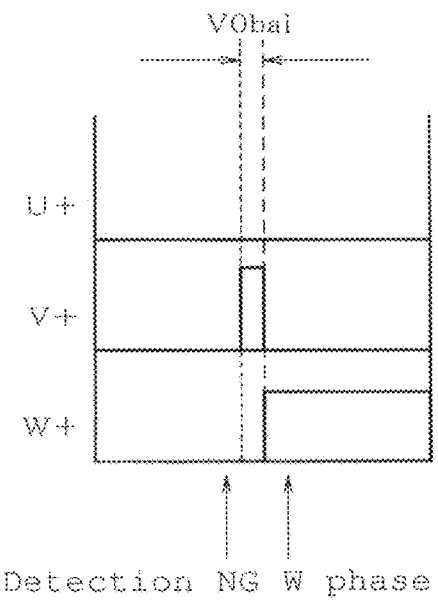
FIGS. 40A and 40B exemplify characteristic PWM signal pattern (No. 1)
Figure 40B:
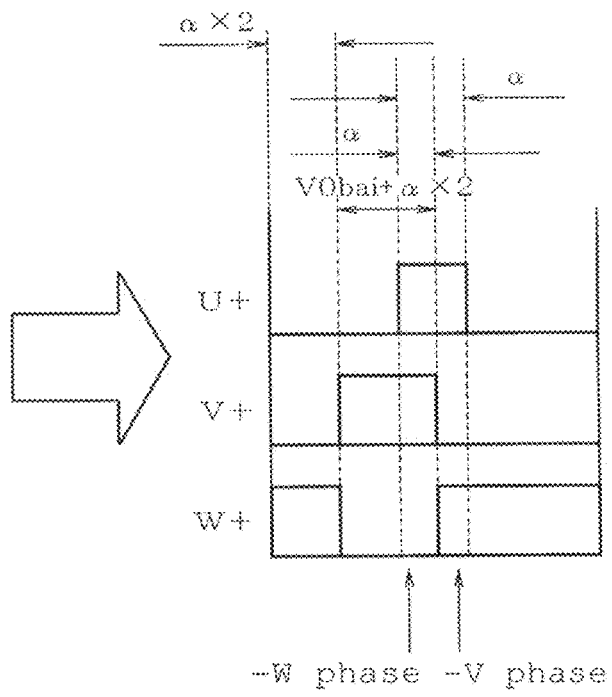

FIGS. 40A and 40B show PWM pulse waveforms obtained by three-phase modulation of PWM output in the two-phase modulation. In this example, U-phase pulse having pulse width $\alpha \times 2$ is output regarding U-phase having no pulse output in the two-phase modulation, and the pulse width $\alpha \times 2$ is also added to each of the V and W phases, whereby the two-phase modulation is temporarily changed to the three-phase modulation.

Figure 41:
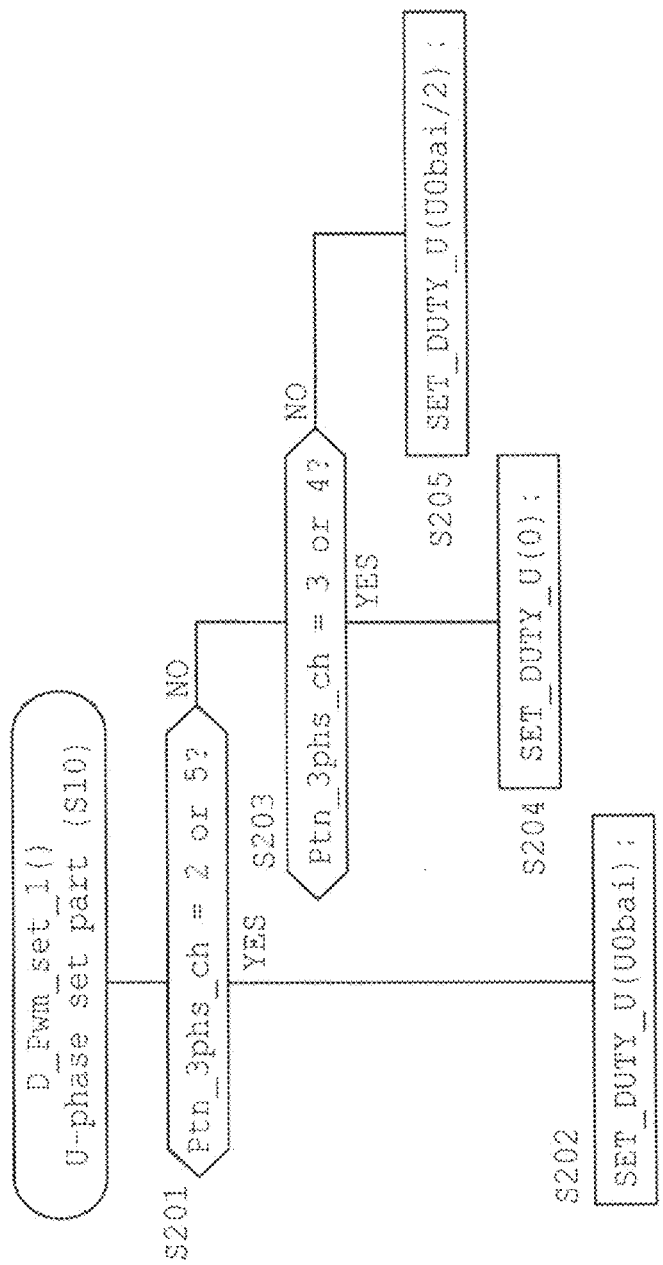
FIG. 41 is a flowchart showing part of the processing at step S10 in FIG. 3.
Figure 42:
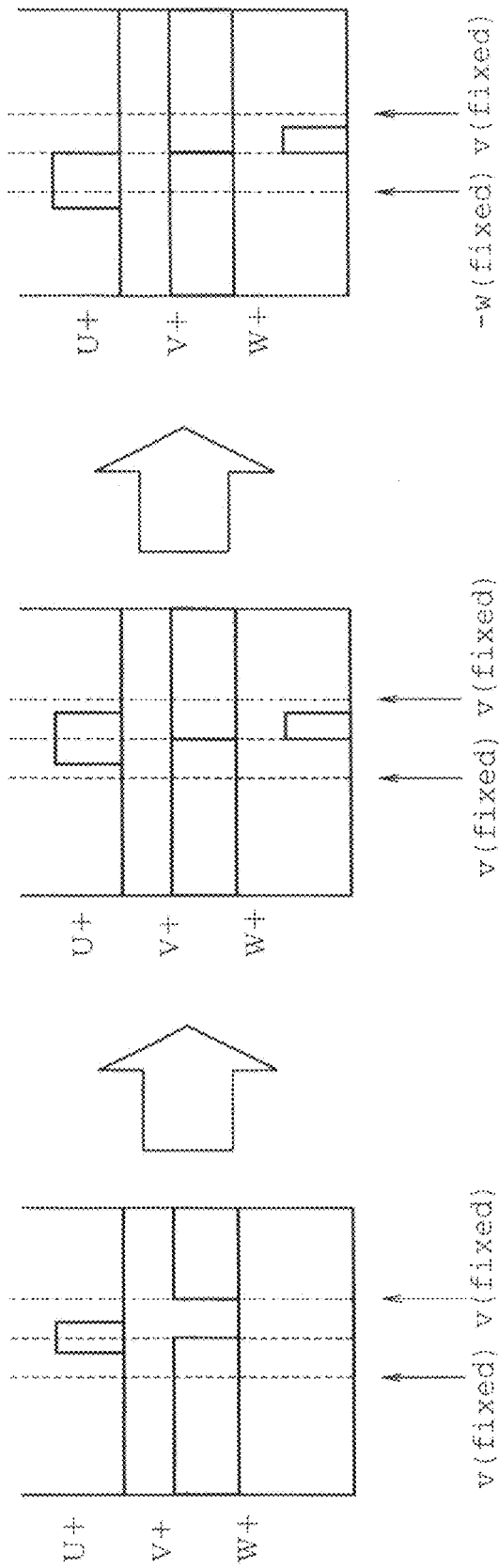
FIGS. 42A, 42B and 42C exemplify characteristic PWM signal pattern (No. 2)

FIG. 41 is a flowchart showing determination of U-phase duty value of D_Pwm_set_1( ), which determination corresponds to step S10. The output in the two-phase modulation is three-phase modulated in the third embodiment. However, for example, when ptn_3phs_ch=4, there is a case where a sufficient detection time cannot be ensured, as shown in FIG. 42. Since the V-phase pulse duty has a large value approximating 100% in the shown example, V-phase current is detected twice in the two-phase modulation. However, W-phase pulse is added so that the two-phase modulation is changed to three-phase modulation, and further, the U-phase pulse is shifted in the left direction as viewed in FIG. 42C (the pulse is generated so as to extend in the phase lead direction with the center of the carrier period serving as a base point), so that a current detection time is increased with the result that W-phase current (−) is detectable at one of the timing points.

When ptn_3phas_ch=5, the similar problem arises since the duty of W-phase pulse approximates 100%. This problem can be coped with by changing the two-phase modulation to the three-phase modulation and shifting the U-phase pulse in the right direction in FIG. 42C.

The duty value is set to U0bai when ptn_3phs_ch=2 or 5 in the case of D_pwm_set_1( ) in FIG. 41 (S202). The duty value is set to 0 when ptn_3phs_ch=3 or 4 (S204). The duty value is set to U0bai/2 when ptn_3phs_ch=0 or 1 (S205).

Figure 43:
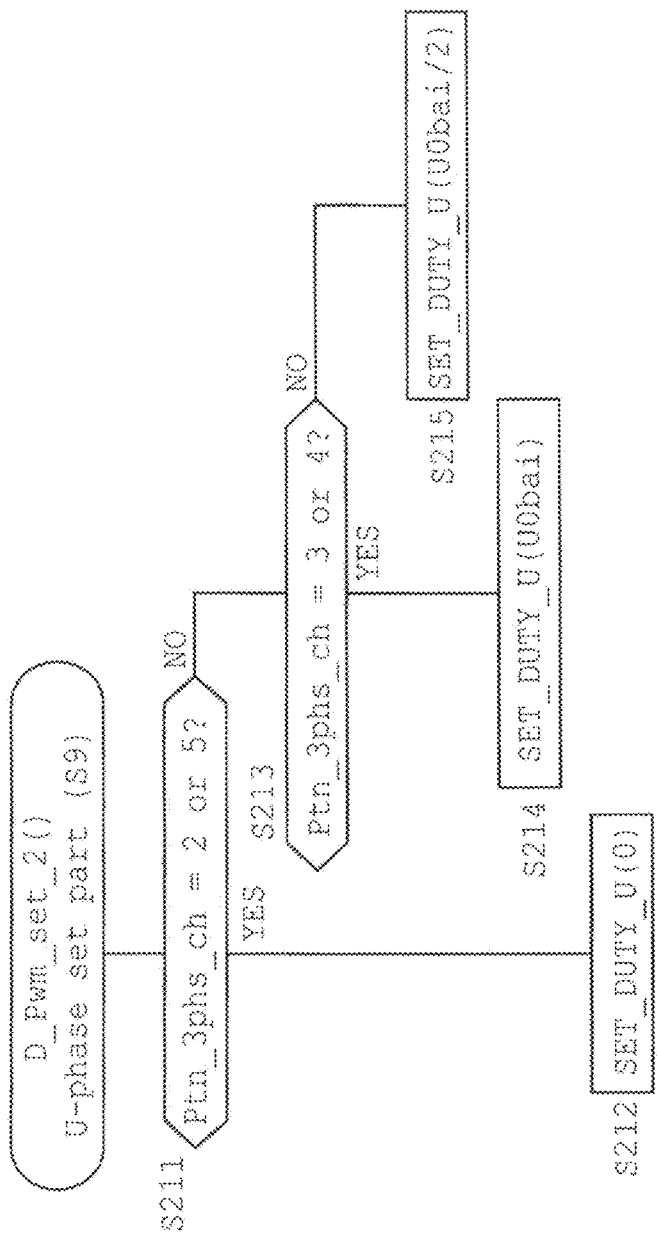
FIG. 43 is a flowchart showing part of the processing at step S9 in FIG. 3.

FIG. 43 is a flowchart showing determination of U-phase duty value of D_Pwm_set_2( ), which determination corresponds to step S9. The duty value is set to 0 when ptn_3phs_ch=2 or 5 in the case of D_pwm_set_2( ) (S212). The duty value is set to U0bai when ptn_3phs_ch=3 or 4 (S214). The duty value is set to U0bai/2 when ptn_3phs_ch=0 or 1 (S215).

Figure 44:
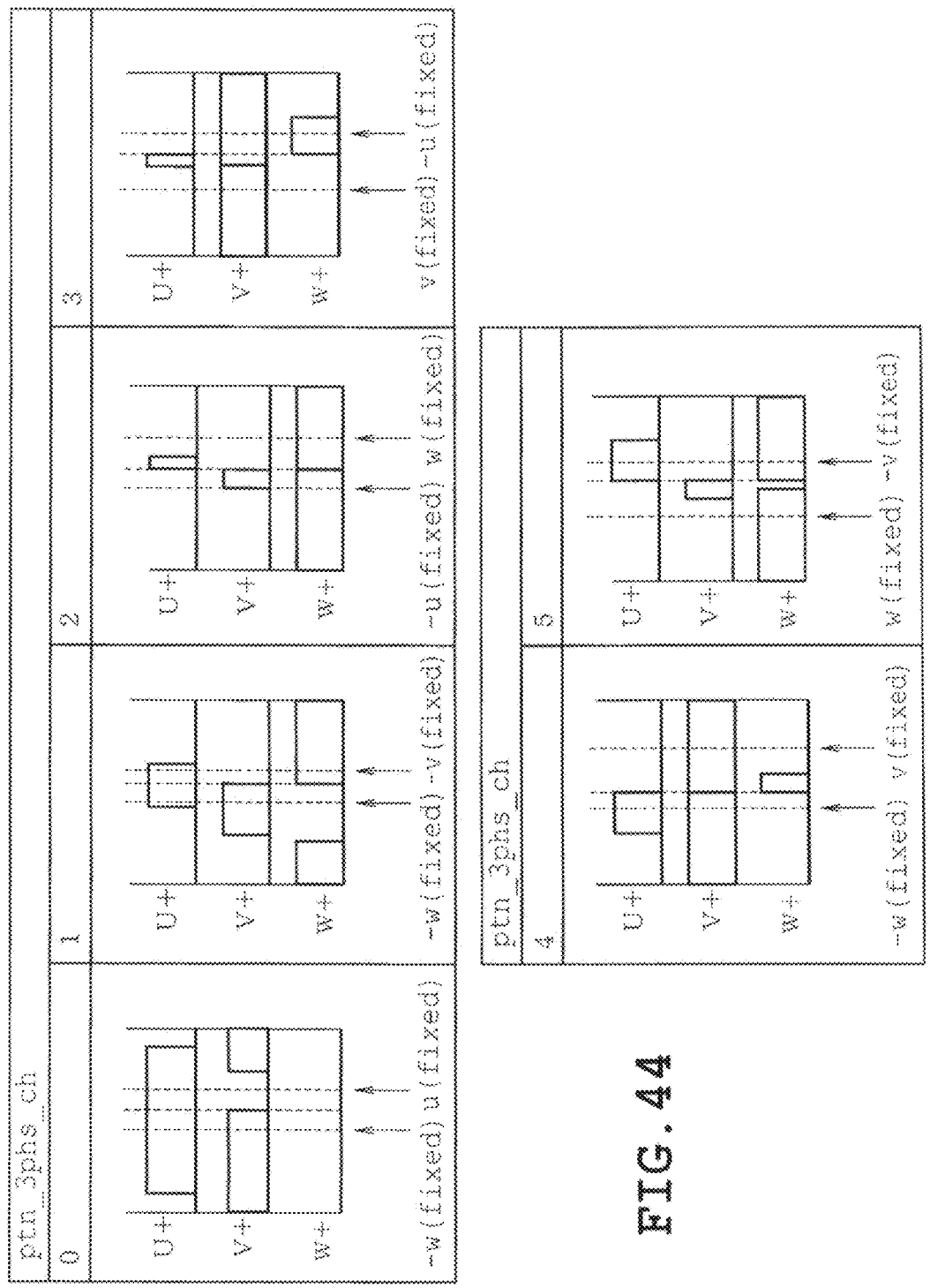
FIG. 44 exemplifies characteristic PWM signal pattern.

FIG. 44 shows a list including these processing patterns. FIGS. 45A and 45B show a waveform of motor current detected in the manner of the third embodiment. As understood from the figures, the current detection rate can be improved by the change of the two-phase modulation to the three-phase modulation with the result the current waveform is rendered more approximate to a sinusoidal wave with decreased distortion.

According to the third embodiment, when the duty of one of U and V phase pulses in the two-phase modulation is decreased such that two-phase currents are undetectable, the duty pulse of the W phase is generated by the predetermined value so that the two-phase modulation is changed to the three-phase modulation, and the duty pulses of the two phases are also increased by the predetermined value. Further, when the duty of one of the two-phase pulses approximates its maximum such that the two-phase currents are undetectable, the two-phase modulation is also changed to the three-phase modulation in the same manner as described above so that duty of the phase which will become maximum is increased, and a generation point of U-phase PWM pulse is shifted according to the magnitude of PWM pulse. This can improve the current detection rate.

The correspondence relationship between the first, second and third phases and U, V and W phases is optional.

A first, second or third embodiment disclosed in Japanese Patent No. 5178799 may be applied to the manner of determining arrangement of respective phase duty pulses.

The peak of triangular carrier may be a center of period.

The carrier period and the minimum width of PWM carrier may be suitably changed according to individual designing.

The motor control device should not be limited to the use with the air conditioner but may be applied to system, apparatus, device and the like in all of which respective motors are controlled in the two-phase modulation manner.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A motor control device comprising:
an inverter circuit including a plurality of switching elements connected into a three-phase bridge configuration, the switching elements being configured to be on-off controlled according to a predetermined PWM signal pattern so that the inverter circuit converts direct current to three-phase alternating current thereby to drive an electric motor;

a current detecting element connected to a direct current side of the inverter circuit to generate a signal corresponding to a current value;

a rotor position determination unit configured to determine a rotor position based on phase currents of the motor;

a PWM signal generation unit configured to generate a signal pattern of two of three phases so that the pattern follows the rotor position;

a current detection unit configured to detect the phase currents based on a signal generated by the current detecting element and the PWM signal pattern, wherein the PWM signal generation unit is configured to increase/decrease a duty in both directions of phase lag side and phase lead side based on any phase of the carrier-wave period regarding a first phase of the three-phase PWM signal pattern;

wherein the PWM signal generation unit is configured to increase/decrease a duty in one of the directions of phase lag side and phase lead side based on any phase of the carrier-wave period regarding a second phase of the three-phase PWM signal pattern; and wherein the PWM signal generation unit is configured to increase/decrease a duty in a direction opposite to the direction of the second phase based on any phase of the carrier-wave period regarding a third phase of the three-phase PWM signal pattern, the motor control device further comprising a timing point adjusting unit configured to adjust a detection timing so that the current detection unit detects the current at a fixed timing point with respect to one phase and the current at another fixed timing point with respect to the other phase or so that the current detection unit is capable of detecting the current in a variable timing according to a magnitude of an output voltage supplied to the inverter circuit.

2. The motor control device according to claim 1, wherein the timing point adjusting unit determines whether or not the current detection with respect to the other phase is based on a predetermined fixed timing point or a timing point obtained by changing the predetermined fixed timing point, according to the two-phase PWM signal pattern.

3. The motor control device according to claim 2, wherein when a current-detectable minimum duty is a minimum width, a maximum width is obtained by subtracting the minimum width from a maximum duty (100%) and an intermediate width is smaller than the maximum width and larger than the minimum width, the timing point adjusting unit distinguishes a two-phase PWM signal output pattern into patterns (0 to 11) of following combinations of first to third phase duties:

(1) a case where the first phase has the intermediate width and the second or third width has a width equal to or larger than the maximum width;

(2, 3) a case where either the second or the third phase has the intermediate width and the other has a width equal to or larger than the maximum width;

(4, 6) a case where the first phase and the second or third phase have respective widths equal to or larger than the maximum width;

(5) a case where both of the second and third phases have respective widths equal to or larger than the maximum width;

(7) a case where the first phase has a width equal to or larger than 0 and the second or third phase has a width smaller than the minimum width;

(8, 9) a case where either the second or third phase has a width equal to or larger than 0 and the other has a width smaller than the minimum width;

(10, 11) a case where the first phase has a width smaller than the minimum width and the second or third phase has a width equal to or larger than 0; and (0) any case other than the cases (1) to (10), wherein the timing point adjusting unit distinguishes the two-phase PWM signal output pattern into following sectors (0) to (5) based on a magnitude relationship among first to third phase duties:

(0) where the first phase is maximum and the second phase is larger the third phase;

(1) where the first phase is maximum and the second phase is smaller than the third phase;

(2) where the second phase is maximum and the first phase is larger than the third phase;

(3) where the second phase is maximum and the first phase is smaller than the third phase;

(4) where the third phase is maximum and the first phase is larger than the second phase; and (5) where the third phase is maximum and the first phase is smaller than the second phase, and wherein the timing point adjusting unit determines whether or not the current detection with respect to the other phase is based on the predetermined fixed timing point or the timing point obtained by changing the predetermined fixed timing point, according to a combination of the patterns (0) to (11) and the sectors (0) to (5).

4. The motor control device according to claim 1, wherein the timing point adjusting unit determines that the current detection with respect to the other phase is based on the predetermined fixed timing point; and wherein the timing point adjusting unit is configured to change one of the phases to be detected to the first phase when the two phases whose duty pulses are output within the carrier-wave period and a period occurs which overlaps output timing points of duty pulses of the two phases from a state where two phase currents to be detected in the respective fixed timing points are the second and third phases.

5. The motor control device according to claim 4, wherein the timing point adjusting unit is configured to change the current detection timing point within a range allowing detection of first phase when the period in which the second and third duty pulses overlap each other fluctuates after one of the pulses has been changed to the first phase.

6. The motor control device according to claim 1, wherein the timing point adjusting unit determines that the current detection with respect to the other phase is based on the predetermined fixed timing point; and wherein the timing point adjusting unit is configured to set current detection with respect to the other phase to variable timing point and to change one of the phases to be detected to the second or third phase when the two phases whose duty pulses are output within the carrier-wave period are the first phase and the second or third phase and a state where two phase currents detected in the respective fixed timing points are the first phase and the third or second phase changes to a state where the first phase current is undetectable.

7. The motor control device according to claim 6, wherein the timing point adjusting unit once changes a current detection timing with respect to the other phase, thereafter fixes the changed timing point to detect second or third phase current.

8. The motor control device according to claim 1, wherein the timing point adjusting unit determines that the current detection with respect to the other phase is based on the predetermined fixed timing point; and wherein when the two phases whose duty pulses are output within the carrier-wave period are the second and third phases and duty of one of the two phases is reduced such that the two-phase currents are undetectable, a direction in which duty of the phase having a smaller duty is changed to a direction identical with one of the other phase.

9. The motor control device according to claim 1, wherein the timing point adjusting unit determines that the current detection with respect to the other phase is based on a variable timing point; and wherein when the two phases whose duty pulses are output within the carrier-wave period are the second and third phases and duty of one of the two phases is reduced such that the two-phase currents are undetectable, a predetermined value of duty pulses of the first phase is generated and duty pulses of each of the second and third phases are increased by the predetermined value, and the timing point adjusting unit determines that the current detection with respect to said one phase is carried out in a variable timing point manner.

10. The motor control device according to claim 1, wherein when the timing point adjusting unit determines that the current detection with respect to the other phase is based on a predetermined fixed timing point and duty of one of the two phases whose duty pulses are delivered is reduced such that the two-phase currents are undetectable, a predetermined duty pulse value of the remaining phase is generated and duty pulses of each of the two phases are increased by the predetermined value; and wherein when duty of a maximum one of three phases is increased such that the two phase currents are undetectable, duty of duty pulses of the first phase is increased in one of the directions of lag side and lead side based on any phase of the carrier-wave period.

11. An air conditioner comprising:

a heat pump system including a compressor, an outdoor heat exchanger, a decompressor and an indoor heat exchanger;

an inverter circuit including a plurality of switching elements connected into a three-phase bridge configuration, the switching elements being configured to be on-off controlled according to a predetermined PWM signal pattern so that the inverter circuit converts direct current to three-phase alternating current thereby to drive an electric motor;

a current detecting element connected to a direct current side of the inverter circuit to generate a signal corresponding to a current value;

a rotor position determination unit configured to determine a rotor position based on phase currents of the motor;

a PWM signal generation unit configured to generate a signal pattern of two of three phases so that the pattern follows the rotor position;

a current detection unit configured to detect the phase currents based on a signal generated by the current detecting element and the PWM signal pattern, wherein the PWM signal generation unit is configured to increase/decrease a duty in both directions of phase lag side and phase lead side based on any phase of the carrier-wave period regarding a first phase of the three-phase PWM signal pattern;

wherein the PWM signal generation unit is configured to increase/decrease a duty in one of the directions of phase lag side and phase lead side based on any phase of the carrier-wave period regarding a second phase of the three-phase PWM signal pattern; and wherein the PWM signal generation unit is configured to increase/decrease a duty in a direction opposite to the direction of the second phase based on any phase of the carrier-wave period regarding a third phase of the three-phase PWM signal pattern, the air conditioner further comprising a timing point adjusting unit configured to adjust a detection timing so that the current detection unit detects the current at a fixed timing point with respect to one phase and the current at another fixed timing point with respect to the other phase or so that the current detection unit is capable of detecting the current in a variable timing according to a magnitude of an output voltage supplied to the inverter circuit.

* * * * *